United States Patent [19]

Arai et al.

[11] Patent Number: 6,066,709
[45] Date of Patent: *May 23, 2000

[54] ETHYLENE-AROMATIC VINYL COMPOUND COPOLYMER AND METHOD FOR ITS PRODUCTION

[75] Inventors: Toru Arai; Akihiko Nakamura; Shigeru Suzuki; Toshiaki Otsu; Akio Okamoto, all of Machida, Japan

[73] Assignee: Denki Kagaku Kogyo Kabushiki Kaisha, Tokyo, Japan

[*] Notice: This patent is subject to a terminal disclaimer.

[21] Appl. No.: 09/203,488

[22] Filed: Dec. 2, 1998

Related U.S. Application Data

[63] Continuation of application No. 08/820,082, Mar. 19, 1997, Pat. No. 5,883,213.

[30] Foreign Application Priority Data

Mar. 19, 1996 [JP] Japan ..................................... 8-63399
Mar. 19, 1996 [JP] Japan ..................................... 8-63400

[51] Int. Cl.⁷ .......................... C08F 212/04; C08F 4/642
[52] U.S. Cl. .......................... 526/347; 526/126; 526/127; 526/132; 526/133; 526/160; 526/170; 526/943
[58] Field of Search ..................................... 526/347, 160, 526/170, 126, 127, 943, 132, 133

[56] References Cited

U.S. PATENT DOCUMENTS

| 5,543,484 | 8/1996 | Chung et al. ........................ 526/347 X |
| 5,652,315 | 7/1997 | Inoue et al. ............................. 526/153 |
| 5,703,187 | 12/1997 | Timmers . |
| 5,883,213 | 3/1999 | Arai et al. ........................... 526/126 X |

FOREIGN PATENT DOCUMENTS

WO 98/09999  3/1998  WIPO .

OTHER PUBLICATIONS

Japanese Unexamined Patent Publication JP–A–4–130114.

Primary Examiner—Fred Teskin
Attorney, Agent, or Firm—Oblon, Spivak, McClelland, Maier & Neustadt, P.C.

[57] ABSTRACT

An ethylene-aromatic vinyl compound copolymer having an aromatic vinyl compound content of from 1 to less than 55% by molar fraction, prepared in the presence of a transition metal compound containing two unsubstituted or substituted indenyl groups or a transition metal compound containing one unsubstituted or substituted cyclopentadienyl group and one unsubstituted or substituted indenyl group.

29 Claims, 56 Drawing Sheets

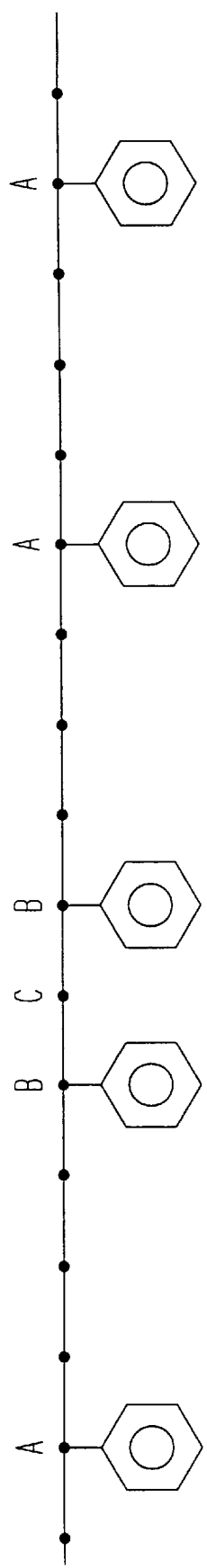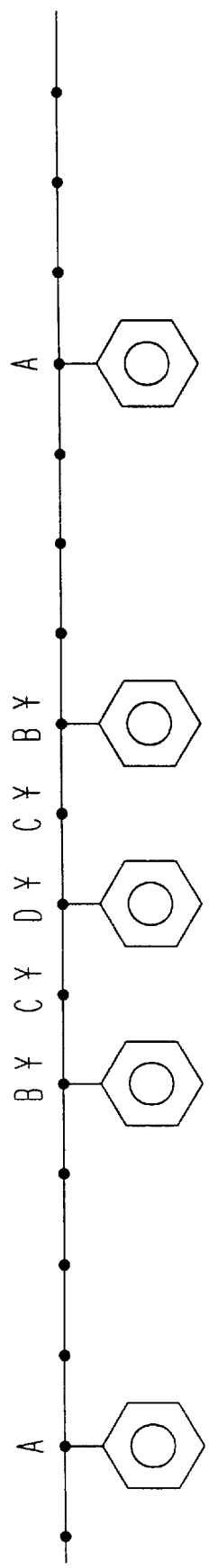
FIG. 41A  TWO STYRENE HEAD TO TAIL CHAIN UNITS IN THE ALTERNATING STRUCTURE
FIG. 41B  THREE STYRENE HEAD TO TAIL CHAIN UNITS IN THE ALTERNATING STRUCTURE

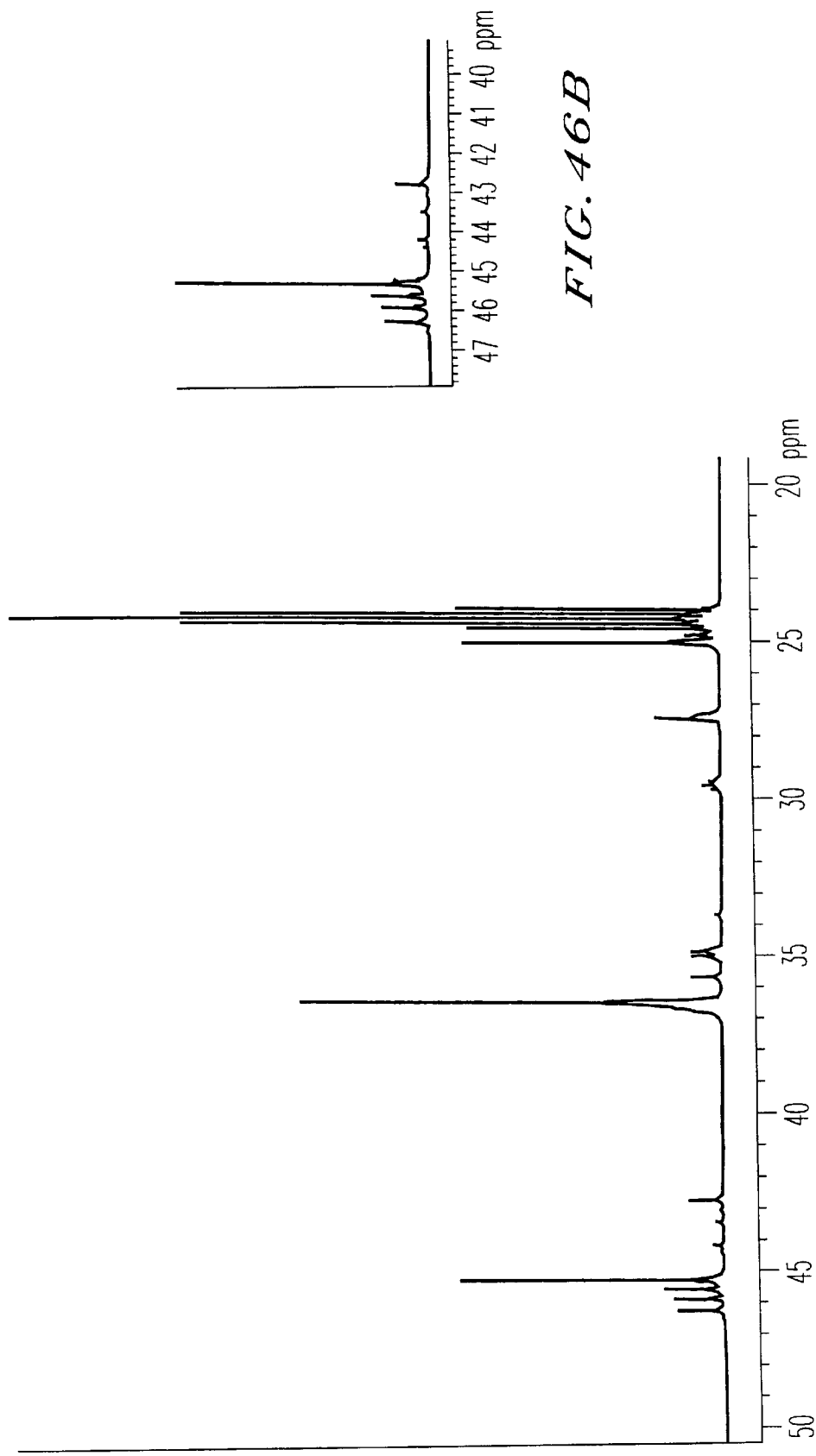

+ EXAMPLE 9
  DIPPING IN HEXANE
○ EXAMPLE 9
  DIPPING IN ACETONE
▲ EXAMPLE 9
  PRESSING, FOLLOWED BY RAPID
  COOLING WITH LIQUID NITROGEN

ETHYLENE-AROMATIC VINYL COMPOUND COPOLYMER AND METHOD FOR ITS PRODUCTION

This application is a Continuation of application Ser. No. 08/820,082 Filed on Mar. 19, 1997, now U.S. Pat. No. 5,883,213, issued Mar. 16, 1999.

BACKGROUND OF THE INVENTION

1. Field of the Invention

The present invention relates to a novel ethylene-aromatic vinyl compound copolymer and a method for its production.

2. Discussion of Background

For the production of a copolymer of ethylene with an aromatic vinyl compound such as styrene, studies have been conducted primarily by using so-called heterogeneous Ziegler-Natta catalysts (e.g. Polymer Bulletin 20, 237–241 (1988)). However, conventional heterogeneous Ziegler-Natta catalyst systems are not so practical, since the catalytic activities are low, the styrene content in the product is low, or the product does not have a uniform regular copolymer structure or contains a substantial amount of homopolymers.

Further, some ethylene-styrene copolymers obtainable by using so-called homogeneous Ziegler-Natta catalyst systems comprising a catalyst of a transition metal compound and an organoaluminum compound, and methods for their production have been known.

JP-A-3-163088 and JP-A-7-53618 disclose styrene-ethylene copolymers wherein no normal styrene chain is present i.e. so-called pseudo random copolymers, obtained by using a complex having a so-called constrained geometrical structure. Here, a normal styrene chain is meant for a head-to-tail bond chain.

However, phenyl groups in the alternating structure of ethylene-styrene present in such pseudo random copolymers, have no stereoregularity.

Hereinafter, styrene and cyclopentadienyl may sometimes be represented by St and Cp, respectively.

JP-A-6-49132 and Polymer Preprints, Japan 42, 2292 (1993) disclose methods for producing similar styrene-ethylene copolymers wherein no normal St chain is present, i.e. so-called pseudo random copolymers, by using a catalyst comprising a bridged Cp type Zr complex and a cocatalyst.

However, according to Polymer Preprints, Japan 42, 2292 (1993), phenyl groups in the alternating structure of ethylene-styrene present in such pseudo random copolymers, have no substantial stereoregularity.

On the other hand, a styrene-ethylene alternating copolymer obtainable by using a Ti complex having a substituted phenol type ligand, is known (JP-A-3-250007 and Stud. Surf. Sci. Catal. 517 (1990)). This copolymer has a feature that it consists essentially of an alternating structure of ethylene-styrene and contains substantially no other structure such as an ethylene chain, styrene chain, a structure comprising an ethylene chain and styrene, a structure of e.g. a head to head or tail to tail bond of styrene. The alternating degree (value $\lambda$ in the present specification) of the copolymer is at least 70, substantially at least 90.

Namely, the resulting copolymer is a copolymer having a very high degree of alternation and consisting substantially solely of the alternating structure, whereby it is substantially difficult to change the compositional ratio of the copolymer consisting of 50% of ethylene and 50% of styrene by molar fraction.

Further, the stereoregularity of phenyl groups of which copolymer is isotactic, but the isotactic diad index m is about 0.92.

Further, the weight average molecular weight of this copolymer is low at a level of 20,000, which is inadequate to provide practically useful physical properties. It should also be added that the catalytic activities are very low, and the copolymer can hardly be regarded as practically useful, since it is obtained as a mixture with e.g. syndiotactic polystyrene.

Further, Macromol. Chem., 191, 2387 (1990) has reported a styrene-ethylene copolymer prepared by using $CpTiCl_3$ as a transition metal compound and methyl alumoxane as a cocatalyst. It is disclosed that at a certain specific transition metal compound/cocatalyst ratio, a pseudo random copolymer free from a styrene chain can be obtained although the catalytic activities are very low, but no disclose is given with respect to the stereoregularity of the ethylene-styrene alternating structure of the resulting copolymer.

In Eur. Polym. J., 31, 79 (1995), copolymerization of ethylene and styrene is carried out under various conditions using the same catalyst. However, it is disclosed that obtained are syndiotactic polystyrene and polyethylene only, and no copolymer is obtainable.

Macromolecules, 29, 1158 (1996) discloses that copolymerization of ethylene and styrene is carried out by means of $CpTiCl_3$ and a boron type cocatalyst to obtain a copolymer having a high degree of alternation together with syndiotactic polystyrene and polyethylene. However, no stereoregularity is observed in the ethylene-styrene alternating structure.

SUMMARY OF THE INVENTION

It is an object of the present invention to provide an ethylene-aromatic vinyl compound copolymer containing an aromatic vinyl compound in an amount of from 1 to less than 55% by molar fraction, wherein the stereoregularity of phenyl groups in the alternating structure of ethylene and an aromatic vinyl compound contained in a proportion not higher than a certain level, is an isotactic structure, and a method for its production.

The present invention provides an ethylene-aromatic vinyl compound copolymer having an aromatic vinyl compound content of from 1 to less than 55% by molar fraction ("% by molar fraction" will hereinafter be represented by "mol %"), wherein the stereoregularity of phenyl groups in the alternating structure of ethylene and an aromatic vinyl compound represented by the following formula (1) contained in its structure, is represented by an isotactic diad index m of more than 0.75, and the alternating structure index $\lambda$ represented by the following formula (i) is smaller than 70 and larger than 1:

$$\lambda = A3/A2 \times 100 \qquad (i)$$

where A3 is the sum of areas of three peaks a, b and c attributable to an ethylene-aromatic vinyl compound alternating structure represented by the following formula (1'), obtained by 13C-NMR, and A2 is the sum of areas of peaks attributable to the main chain methylene and methine carbon, as observed within a range of from 0 to 50 ppm by 13C-NMR using TMS as standard,

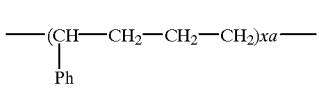

where Ph is an aromatic group such as a phenyl group, and xa is an integer of at least 2 representing the number of repeating units,

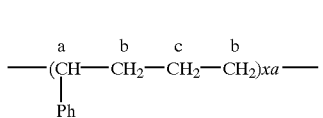

(1')

wherein Ph is an aromatic group such as a phenyl group, and xa is an integer of at least 2 representing the number of repeating units.

Further, the present invention provides a method for producing the ethylene-aromatic vinyl compound copolymer as defined above, wherein polymerization is carried out by means of a transition metal compound containing two unsubstituted or substituted indenyl groups or a transition metal compound containing one unsubstituted or substituted cyclopentadienyl group and one unsubstituted or substituted indenyl group, and a cocatalyst.

BRIEF DESCRIPTION OF THE DRAWINGS

FIG. 41 is model structures used for peak shift prediction by 13C-NMR data base STN SPECINFO.

FIG. 46 is a 13C-NMR spectrum of a cold MEK insoluble fraction of the copolymer obtained in Example 11.

DETAILED DESCRIPTION OF THE PREFERRED EMBODIMENTS

Figure 1:
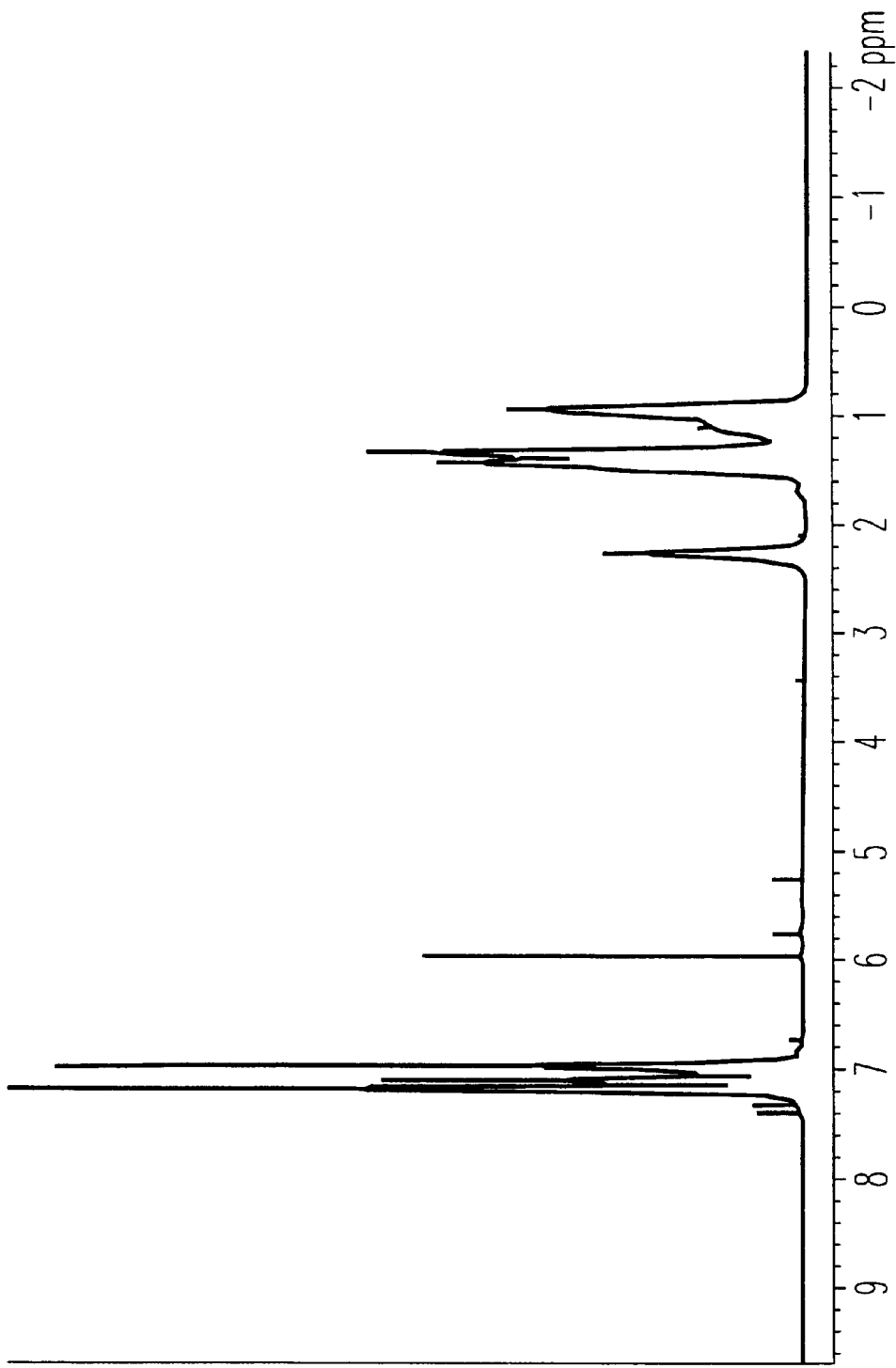
FIG. 1 is a 1H-NMR chart of the polymer obtained in Example 10.
Figure 2:
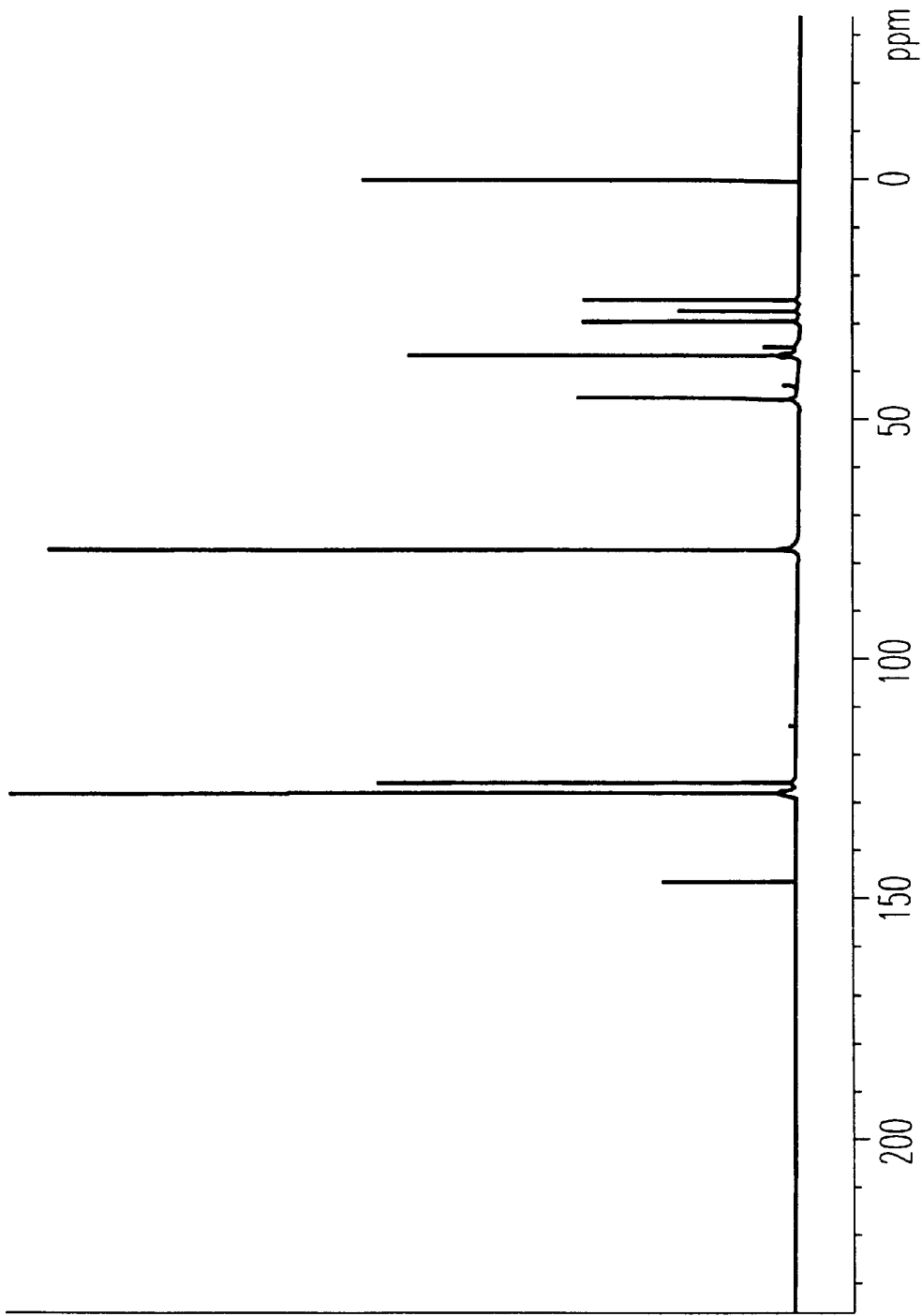
FIG. 2 is a 13C-NMR spectrum of the polymer obtained in Example 1, measured by using chloroform-d as a solvent. Entire spectrum.
Figure 3:
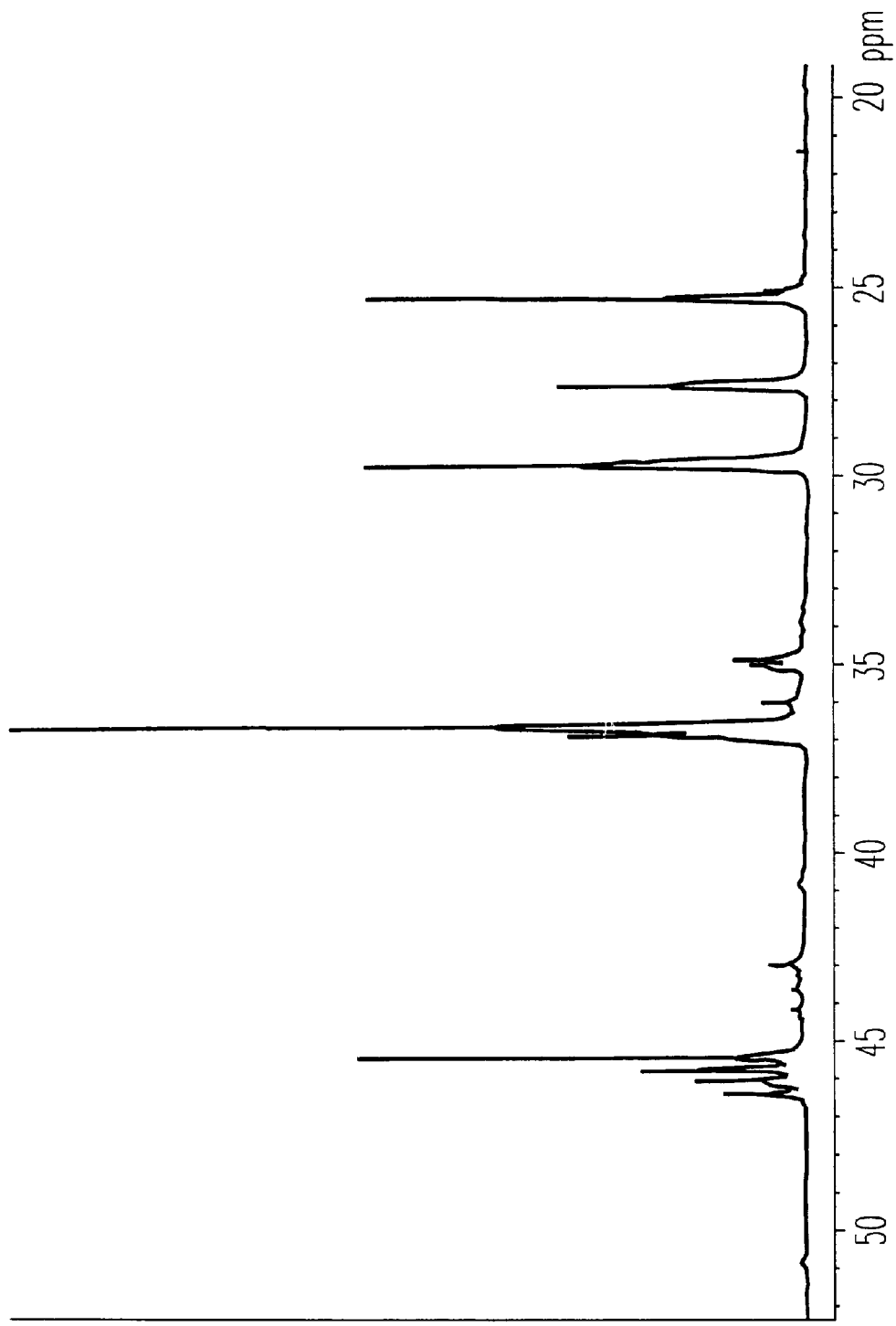
FIG. 3 is a 13C-NMR spectrum of the polymer obtained in Example 1, measured by using chloroform-d as a solvent. Methine-methylene region.
Figure 4:
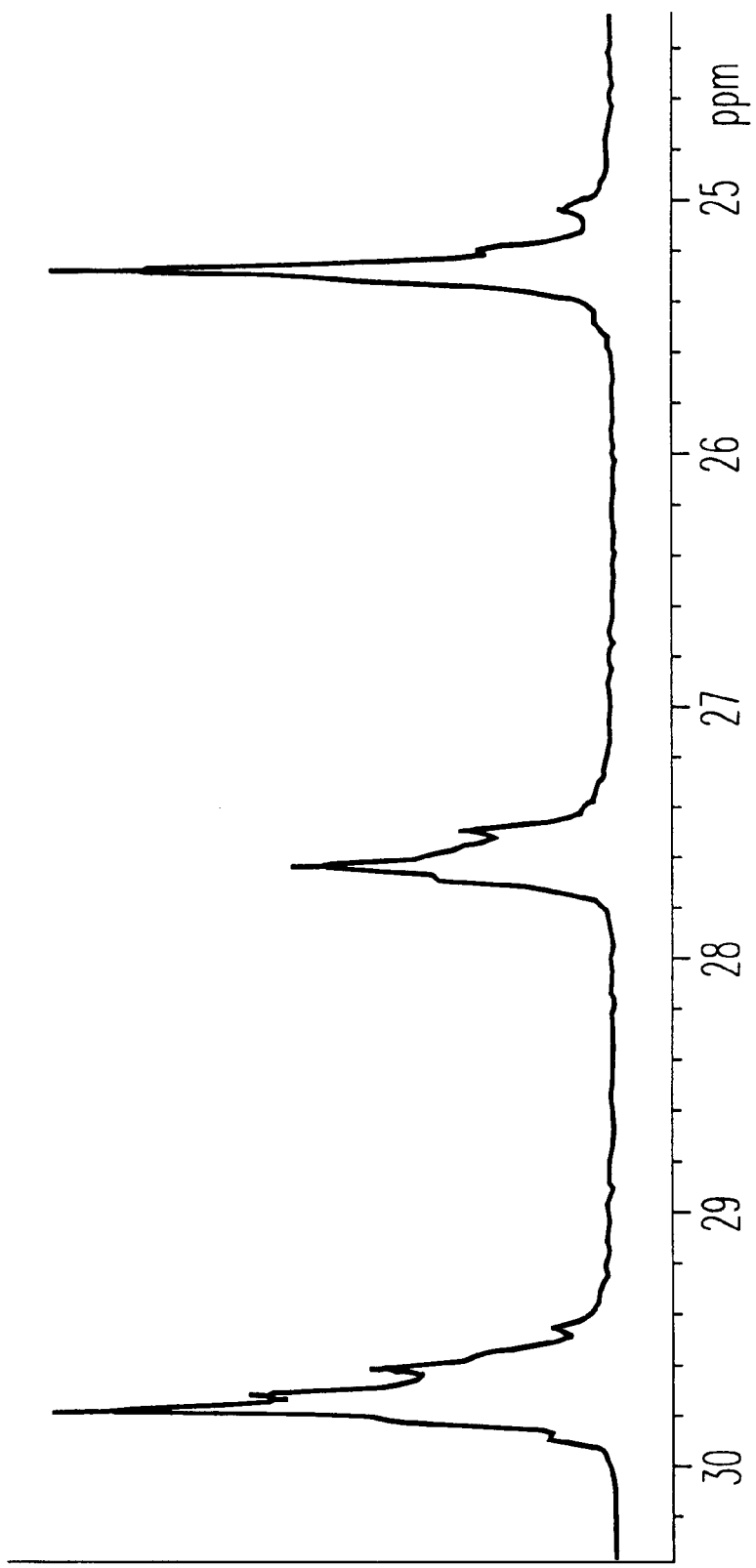
FIG. 4 is a 13C-NMR spectrum of the polymer obtained in Example 1, measured by using chloroform-d as a solvent. In the vicinity of 25 ppm.
Figure 5:
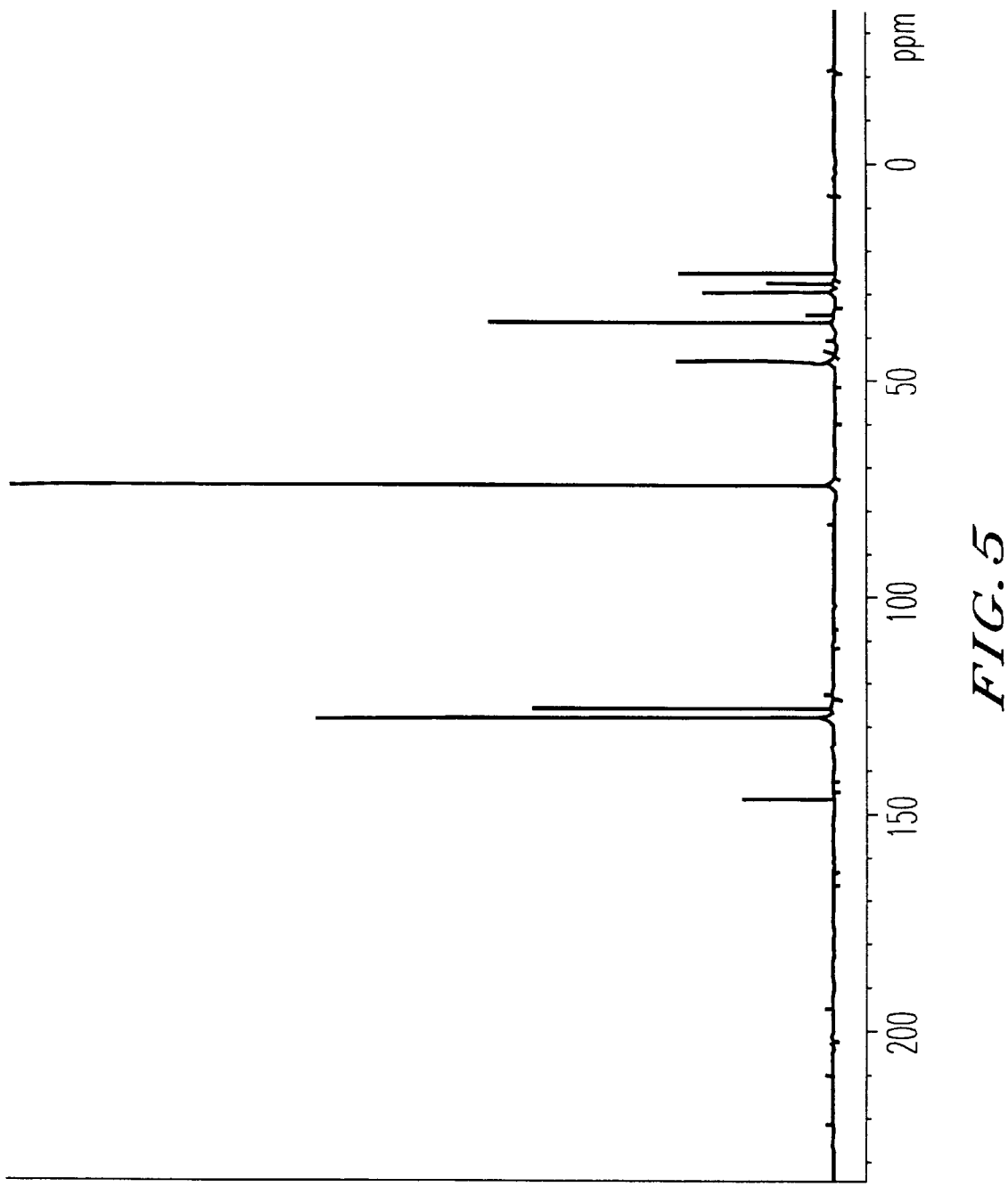
FIG. 5 is a 13C-NMR spectrum of the polymer obtained in Example 1, measured by using 1,1,2,2-tetrachloroethane-d2 as a solvent. Entire spectrum.
Figure 6:
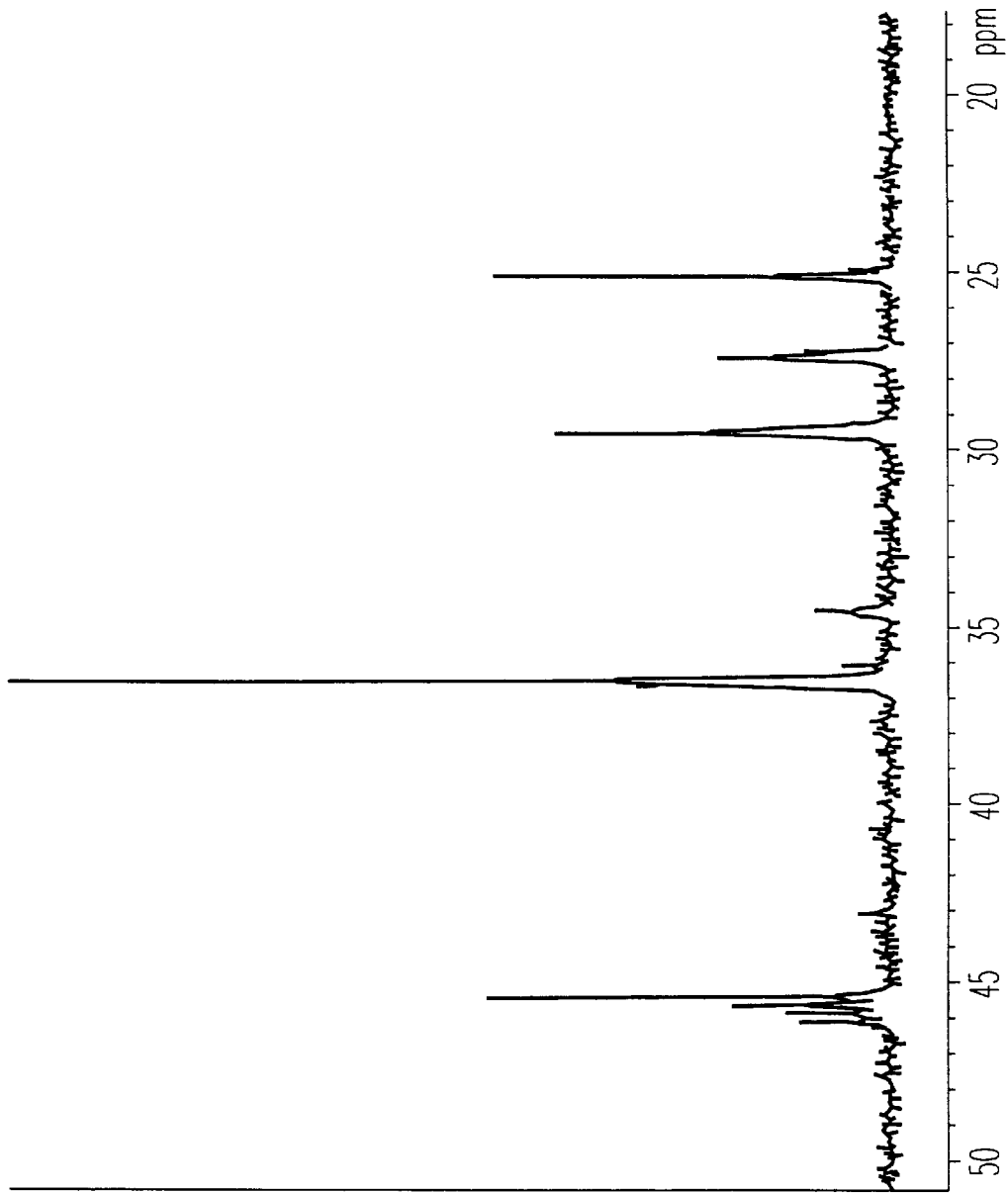
FIG. 6 is a 13C-NMR spectrum of the polymer obtained in Example 1, measured by using 1,1,2,2 -tetrachloroethane-d2 as a solvent. Methine-methylene region.
Figure 7:
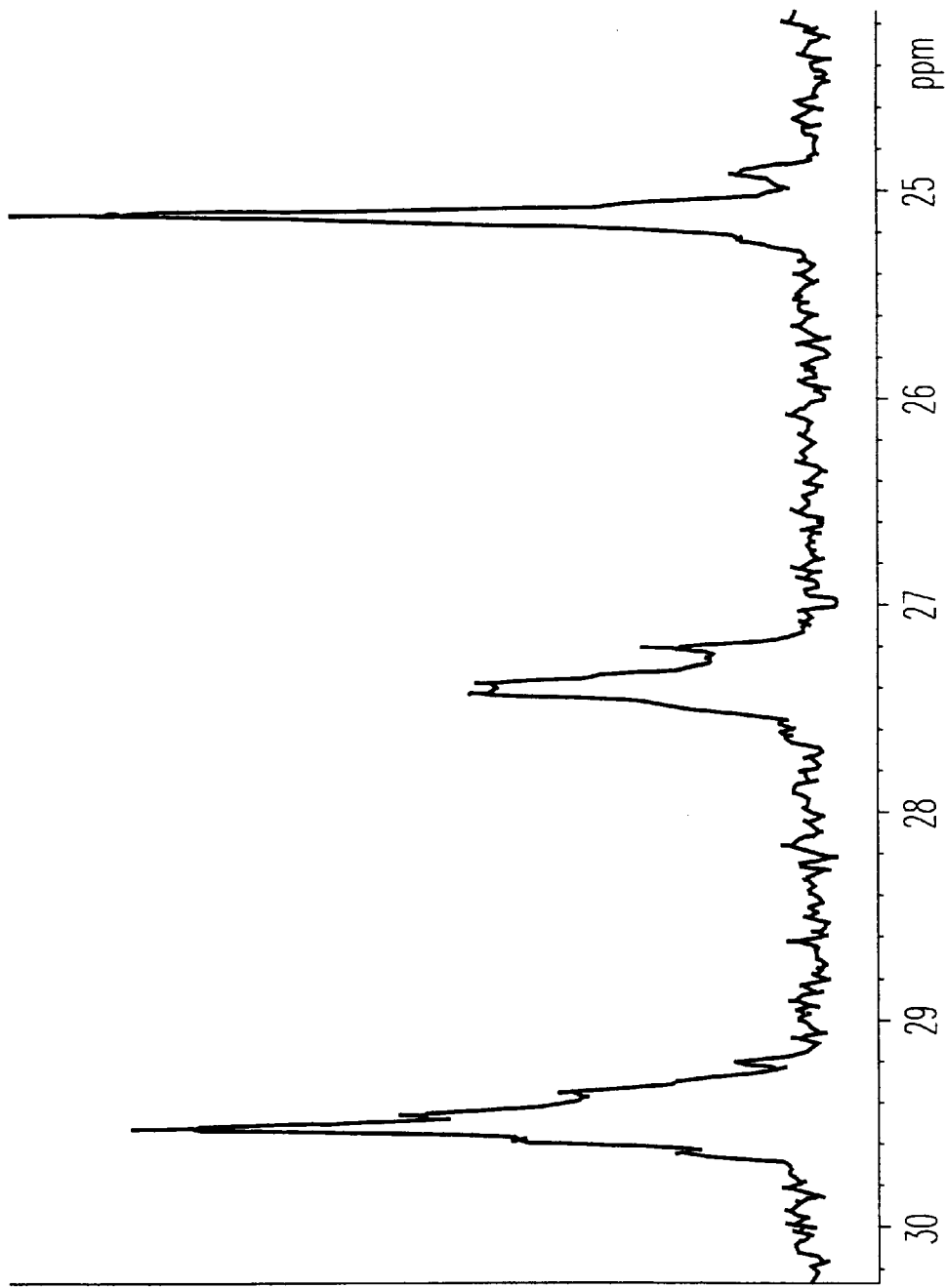
FIG. 7 is a 13C-NMR spectrum of the polymer obtained in Example 1, measured by using 1,1,2,2-tetrachloroethane-d2 as a solvent. In the vicinity of 25 ppm.
Figure 8:
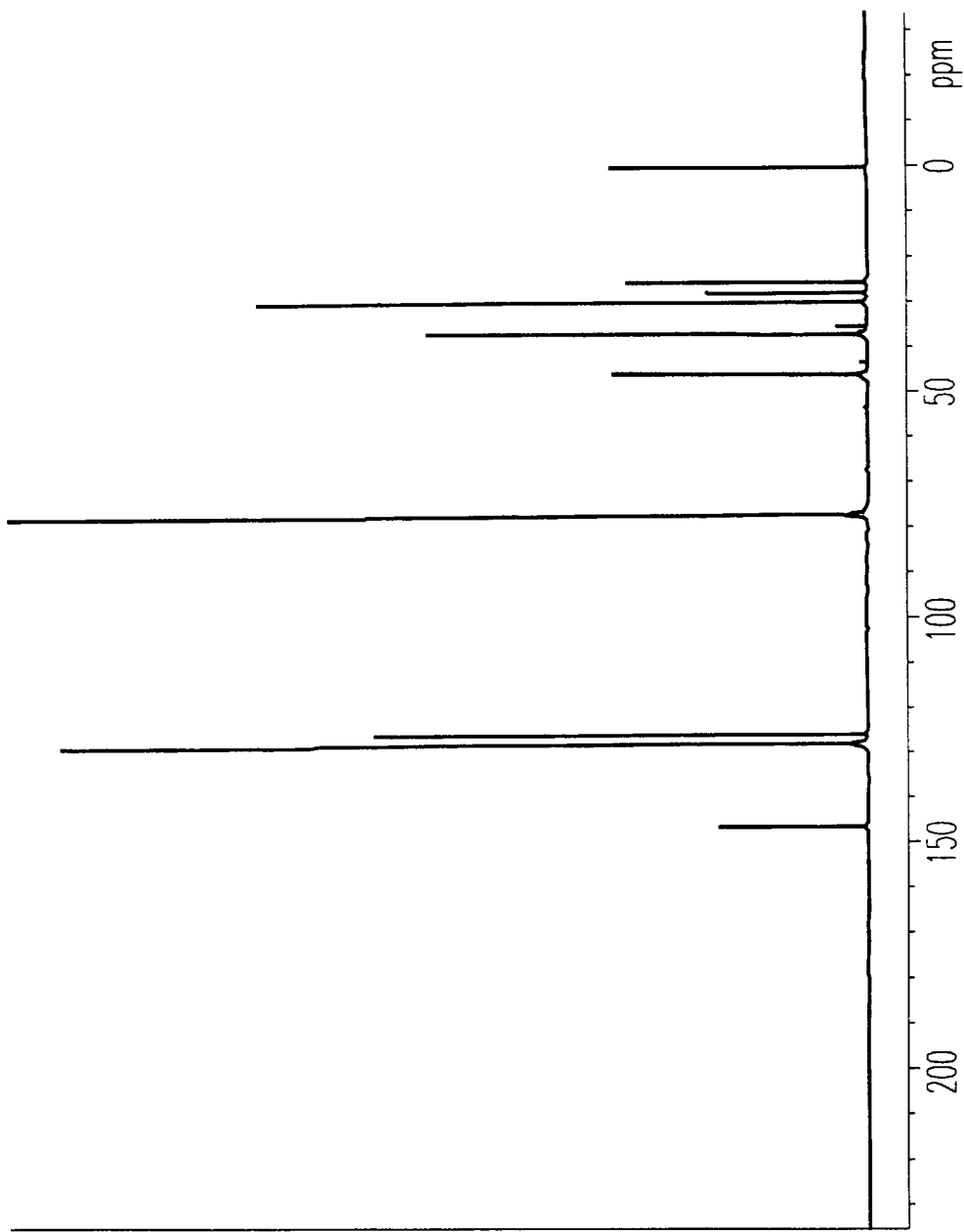
FIG. 8 is a 13C-NMR spectrum of the polymer obtained in Example 2, measured by using chloroform-d as a solvent. Entire spectrum.
Figure 9:
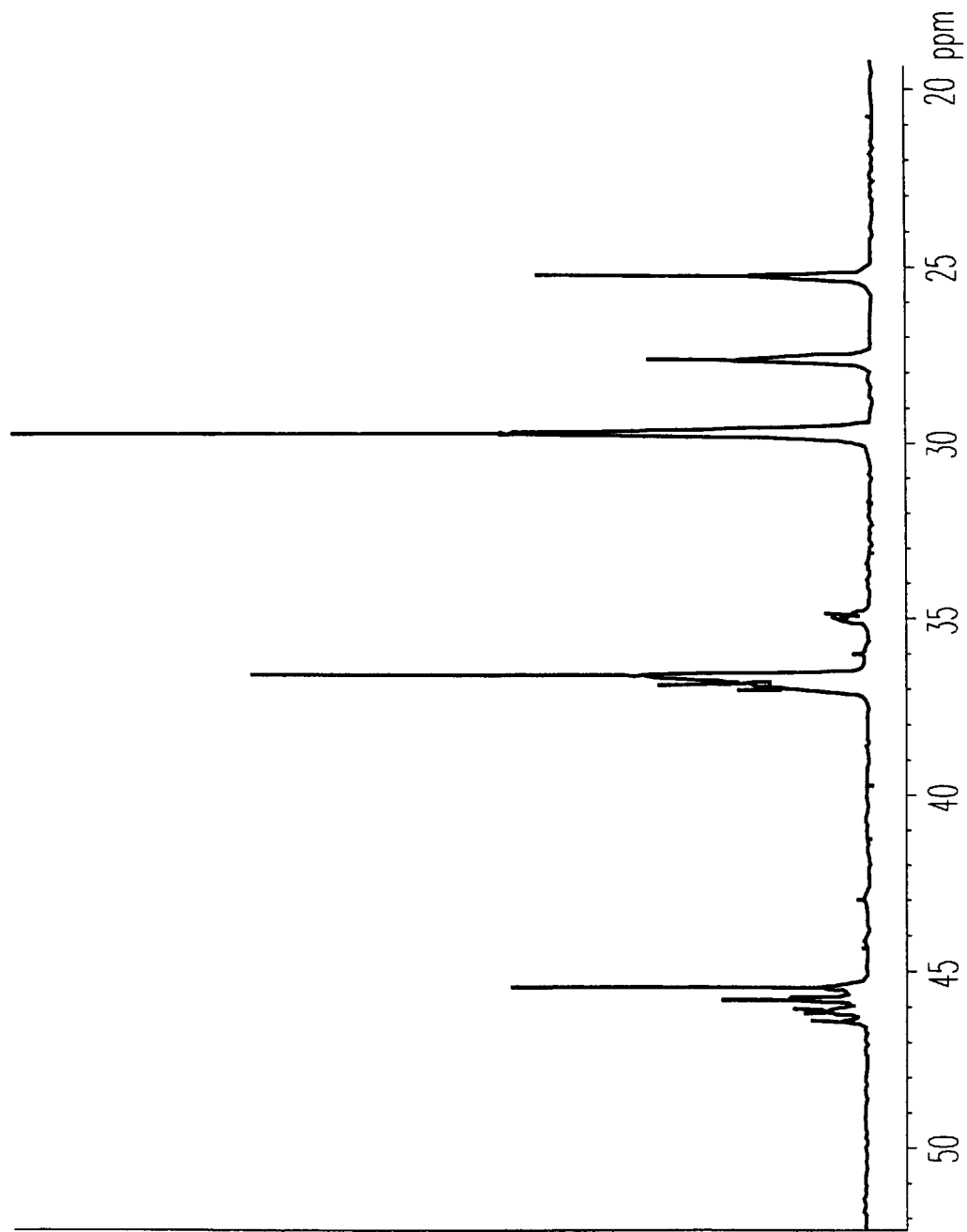
FIG. 9 is a 13C-NMR spectrum of the polymer obtained in Example 2, measured by using chloroform-d as a solvent. Methine-methylene region.
Figure 10:
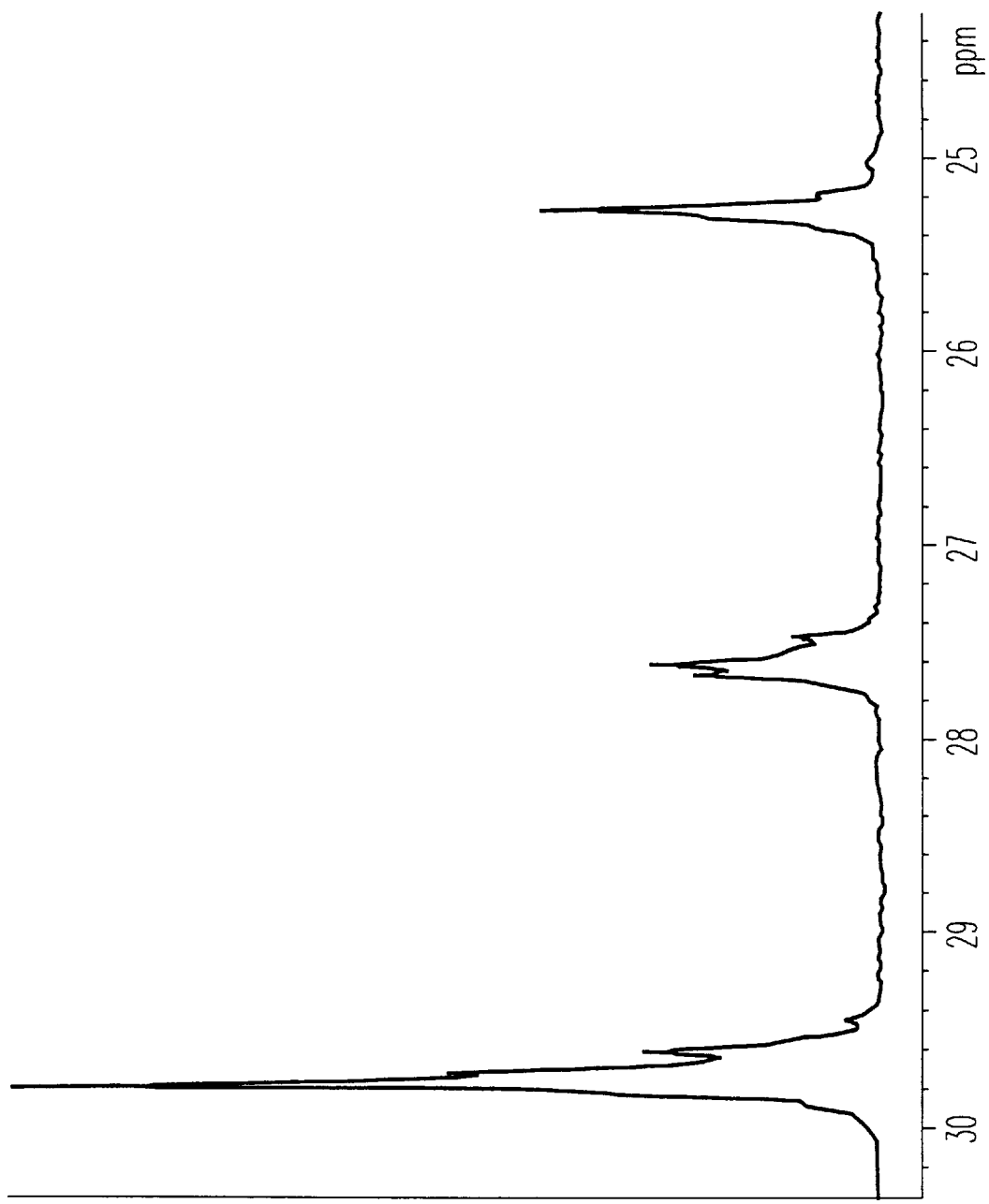
FIG. 10 is a 13C-NMR spectrum of the polymer obtained in Example 2, measured by using chloroform-d as a solvent. In the vicinity of 25 ppm.
Figure 11:
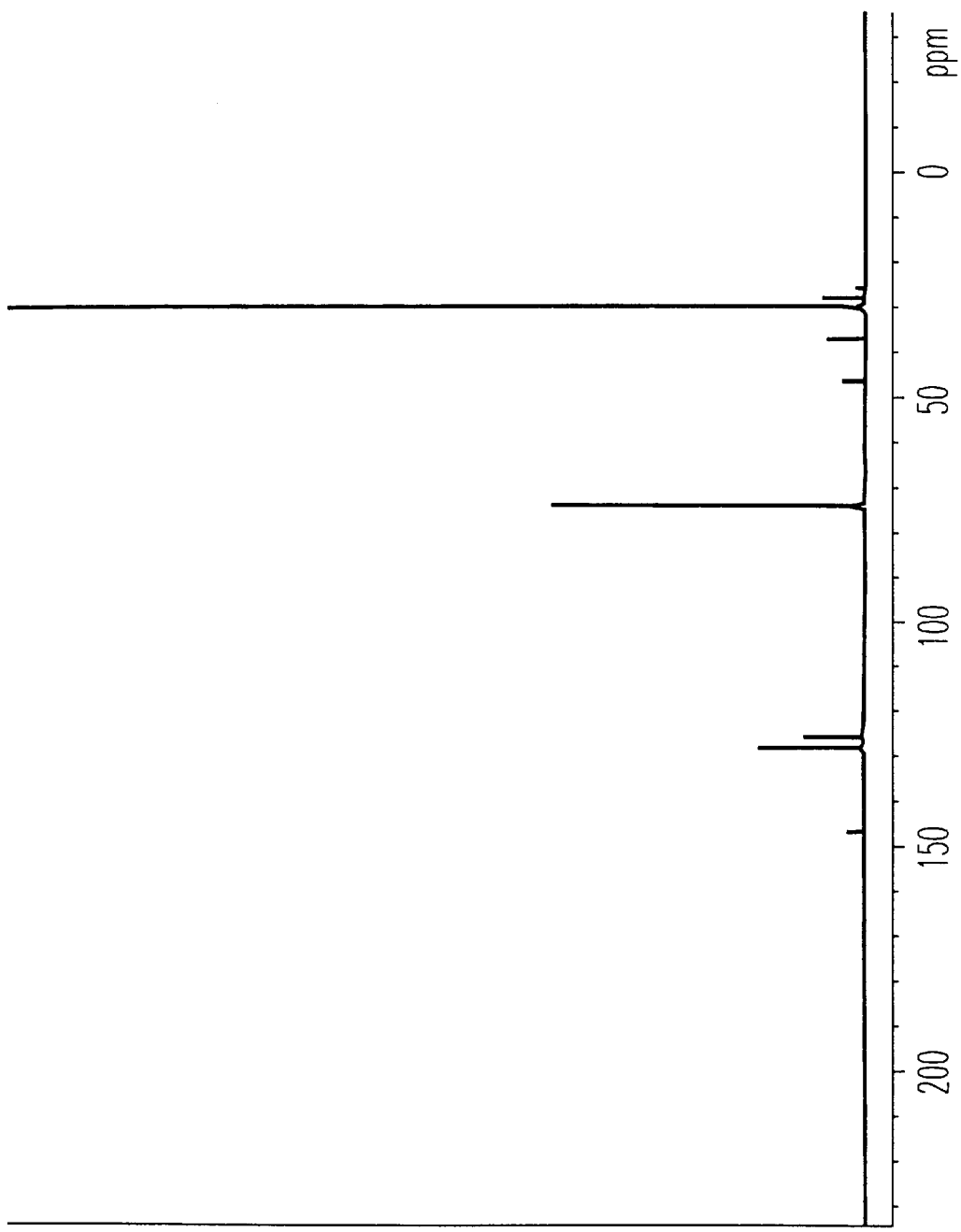
FIG. 11 is a 13C-NMR spectrum of the polymer obtained in Example 3, measured by using 1,1,2,2-tetrachloroethane-d2 as a solvent. Entire spectrum.
Figure 12:
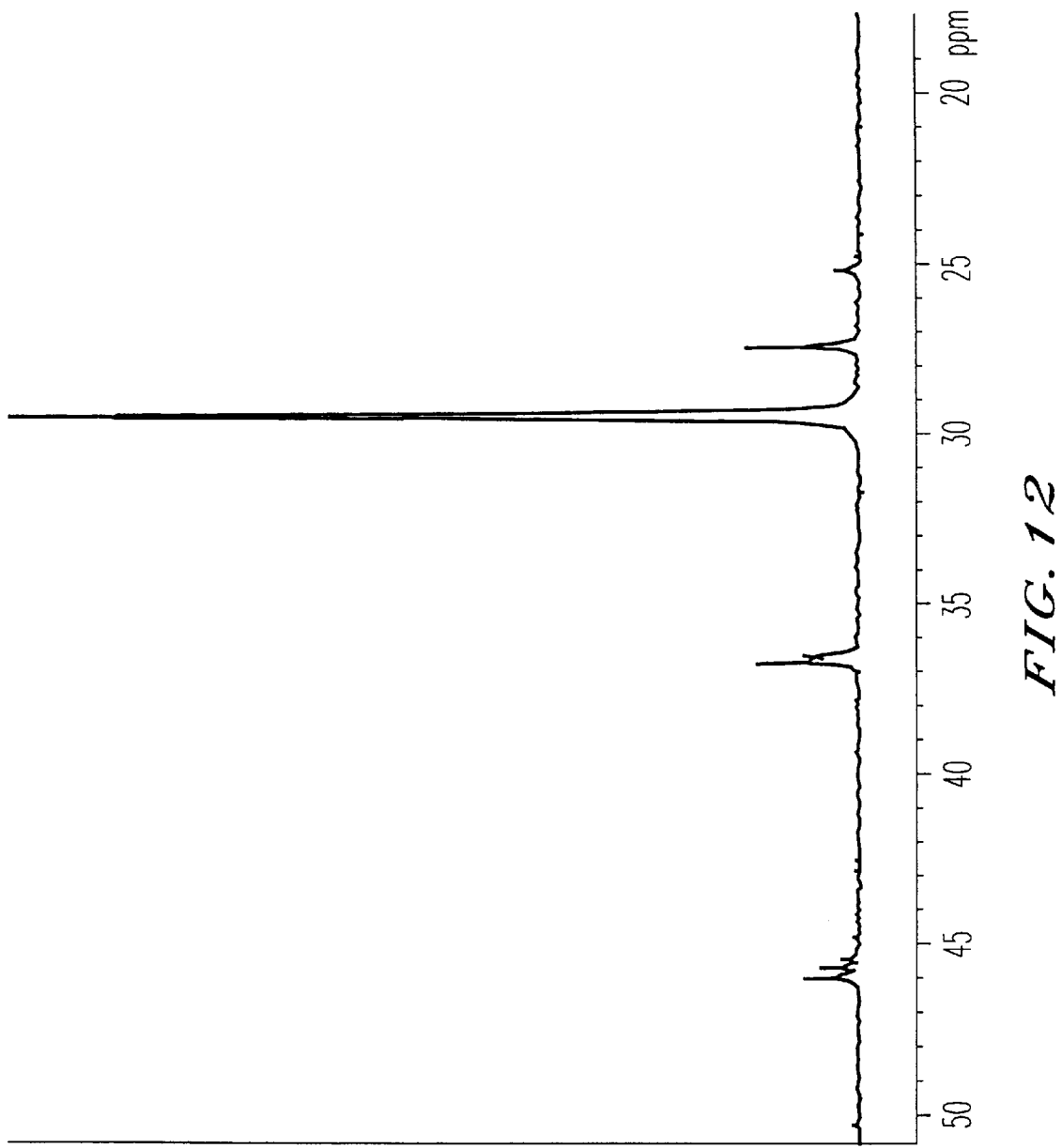
FIG. 12 is a 13C-NMR spectrum of the polymer obtained in Example 3, measured by using 1,1,2,2-tetrachloroethane-d2 as a solvent. Methine-methylene region.
Figure 13:
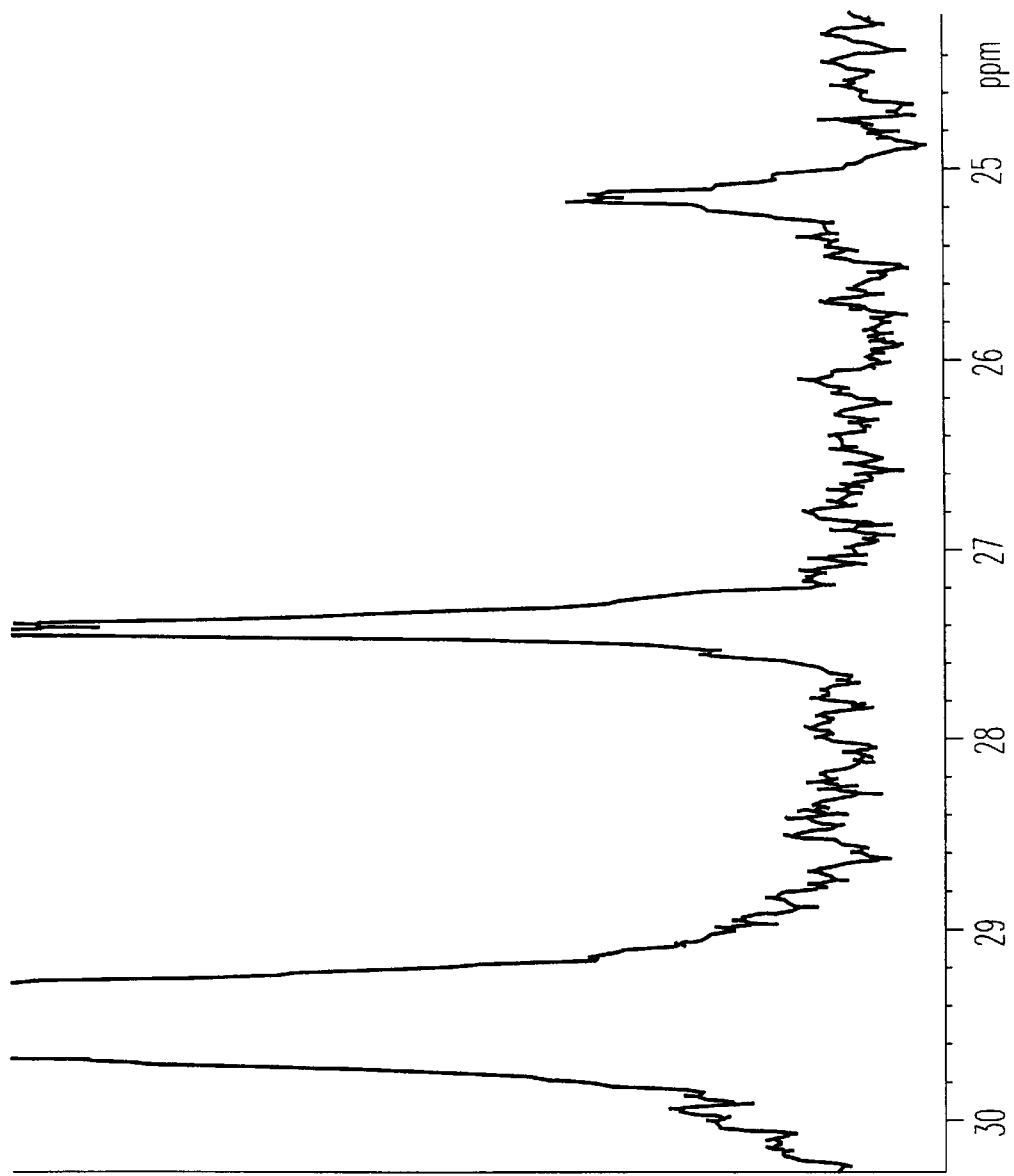
FIG. 13 is a 13C-NMR spectrum of the polymer obtained in Example 3, measured by using 1,1,2,2-tetrachloroethane-d2 as a solvent. In the vicinity of 25 ppm.
Figure 14:
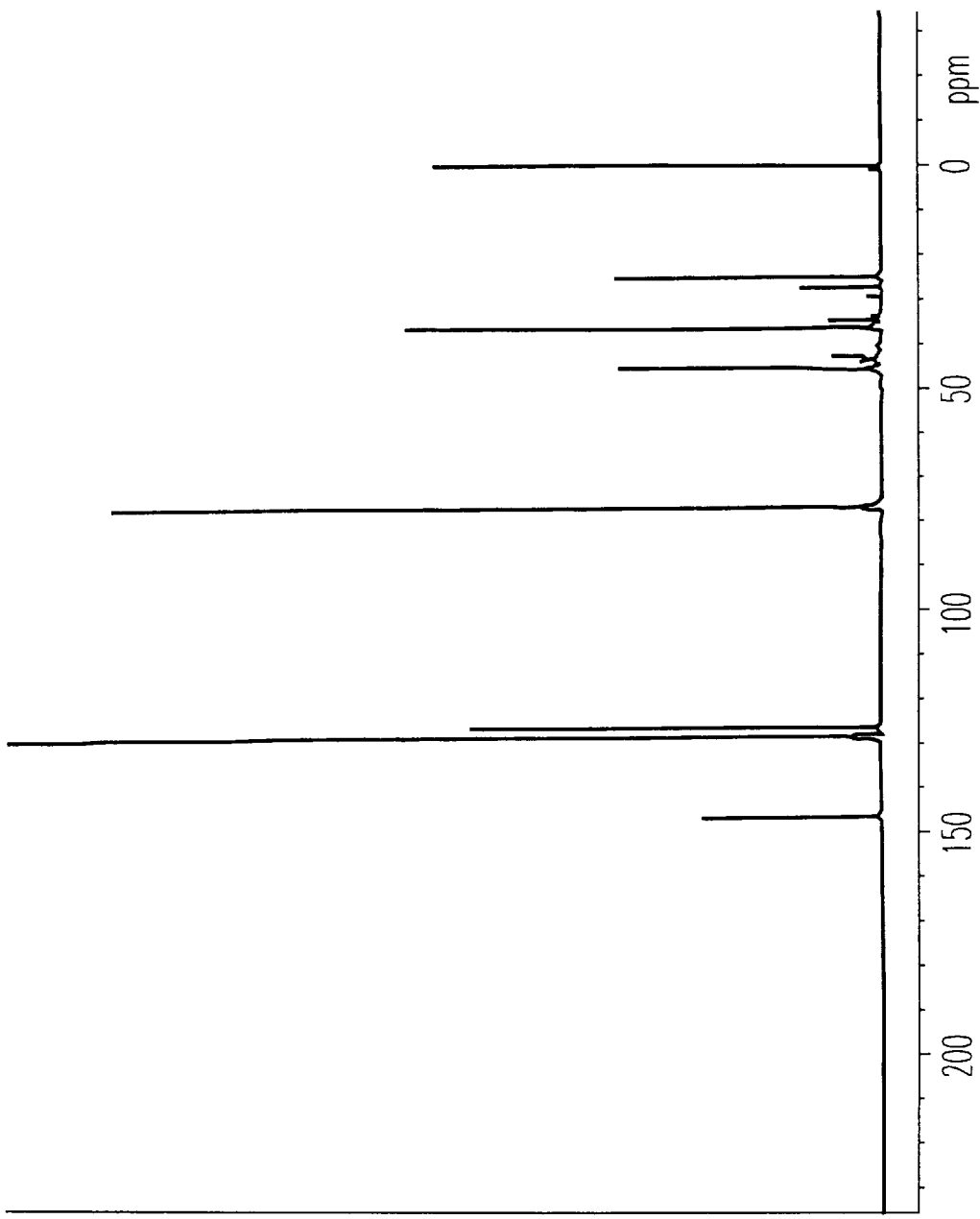
FIG. 14 is a 13C-NMR spectrum of the polymer obtained in Example 4, measured by using chloroform-d as a solvent. Entire spectrum.
Figure 15:
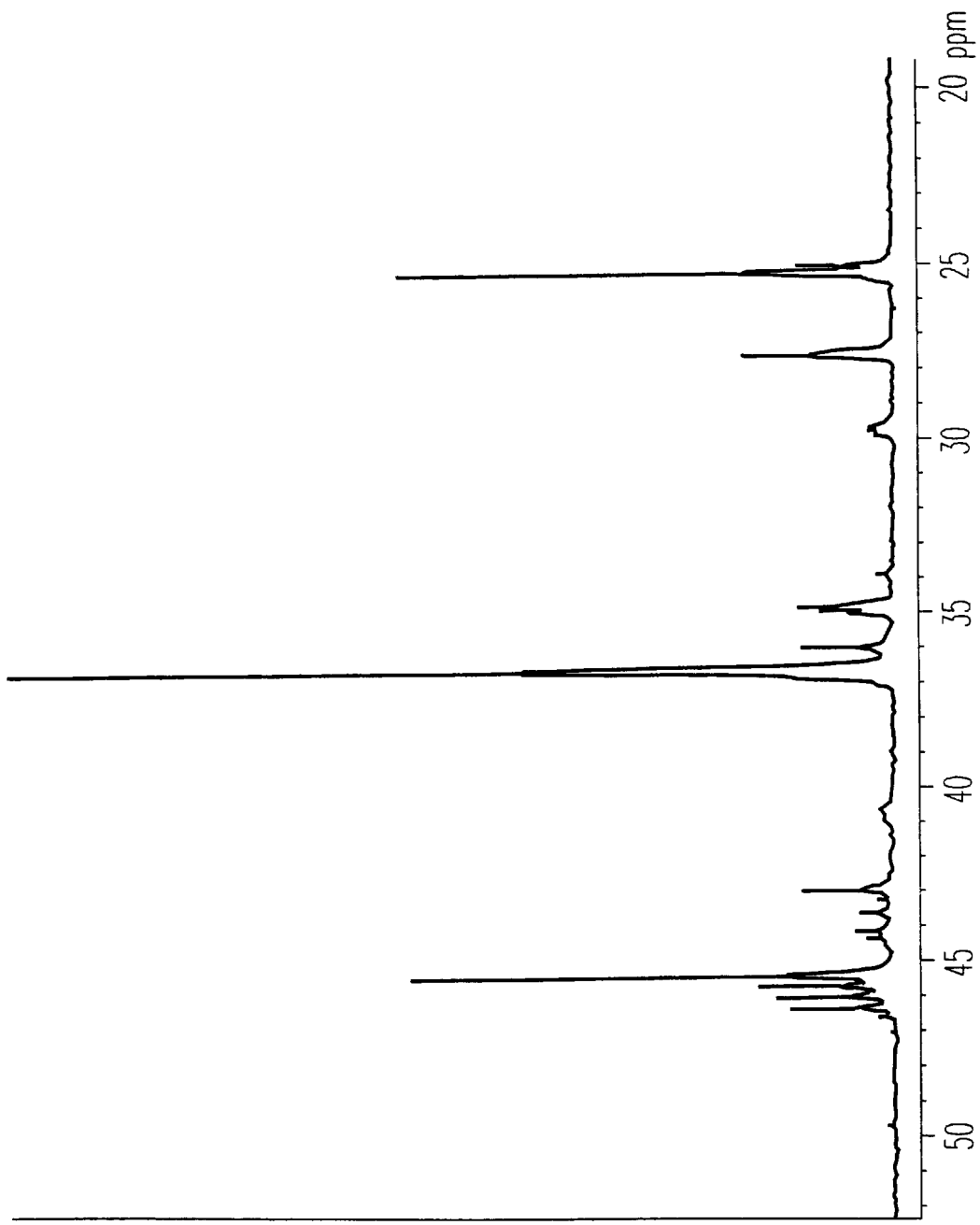
FIG. 15 is a 13C-NMR spectrum of the polymer obtained in Example 4, measured by using chloroform-d as a solvent. Methine-methylene region.
Figure 16:
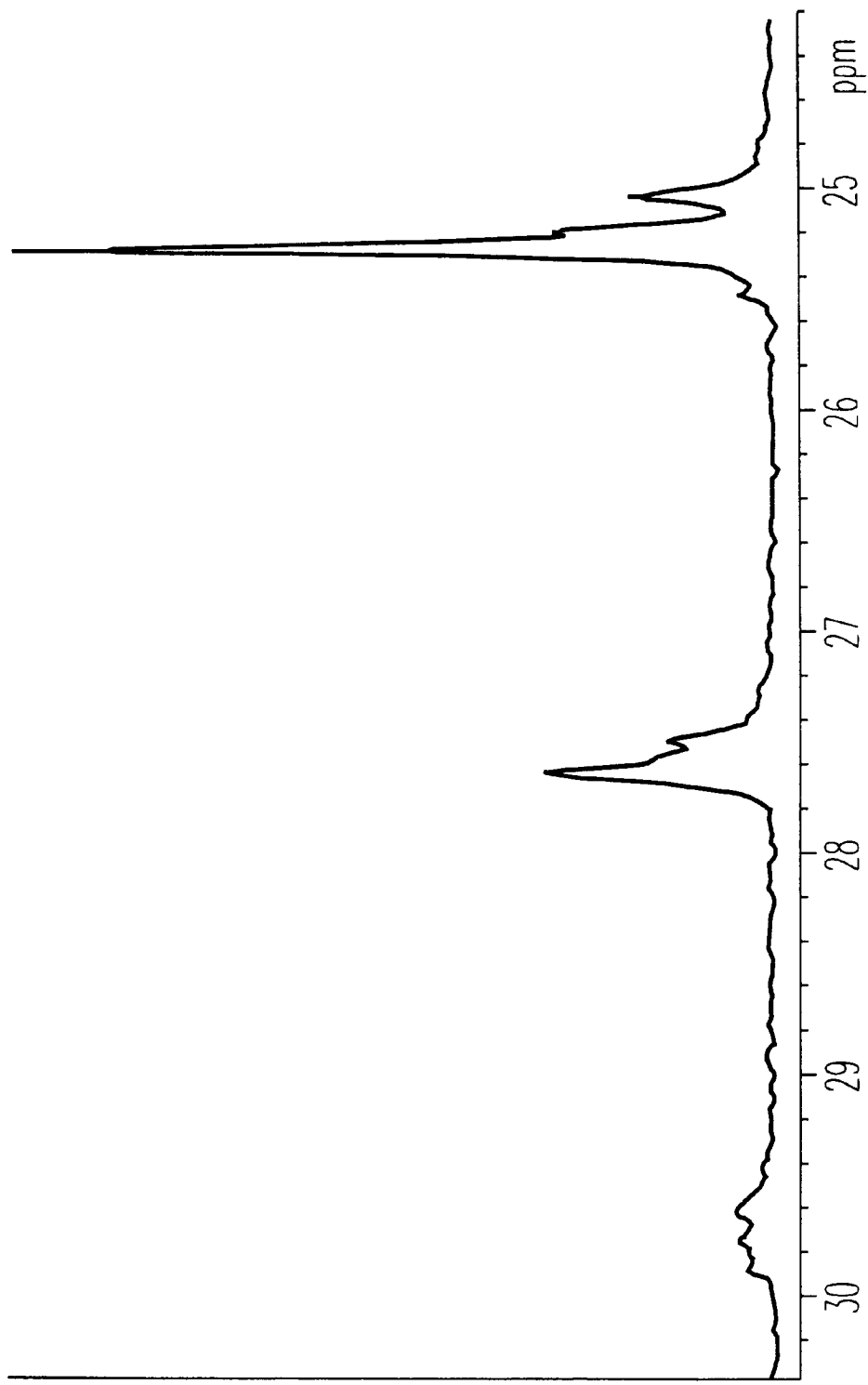
FIG. 16 is a 13C-NMR spectrum of the polymer obtained in Example 4, measured by using chloroform-d as a solvent. In the vicinity of 25 ppm.
Figure 17:
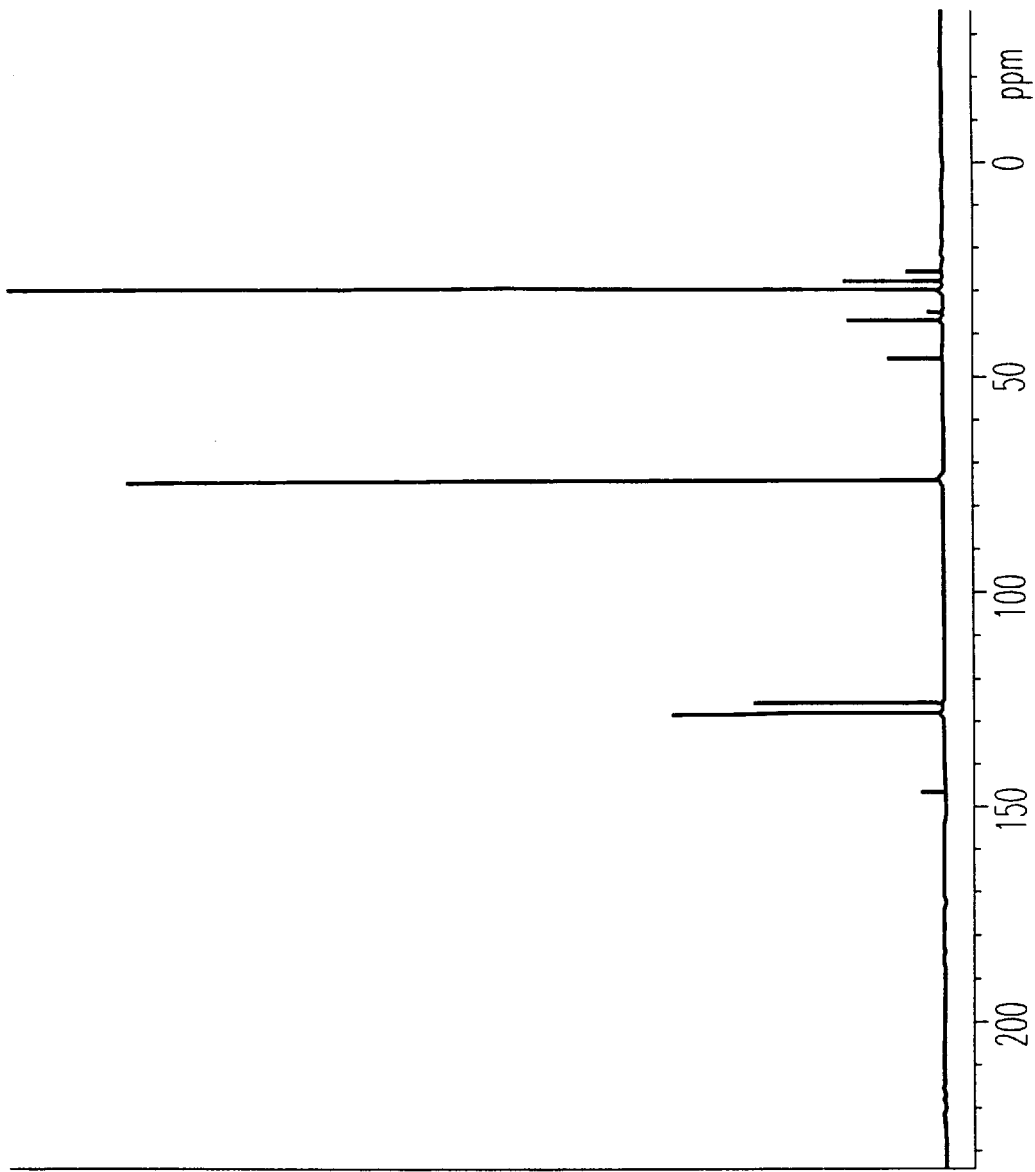
FIG. 17 is a 13C-NMR spectrum of the polymer obtained in Example 6, measured by using 1,1,2,2-tetrachloroethane-d2 as a solvent. Entire spectrum.
Figure 18:
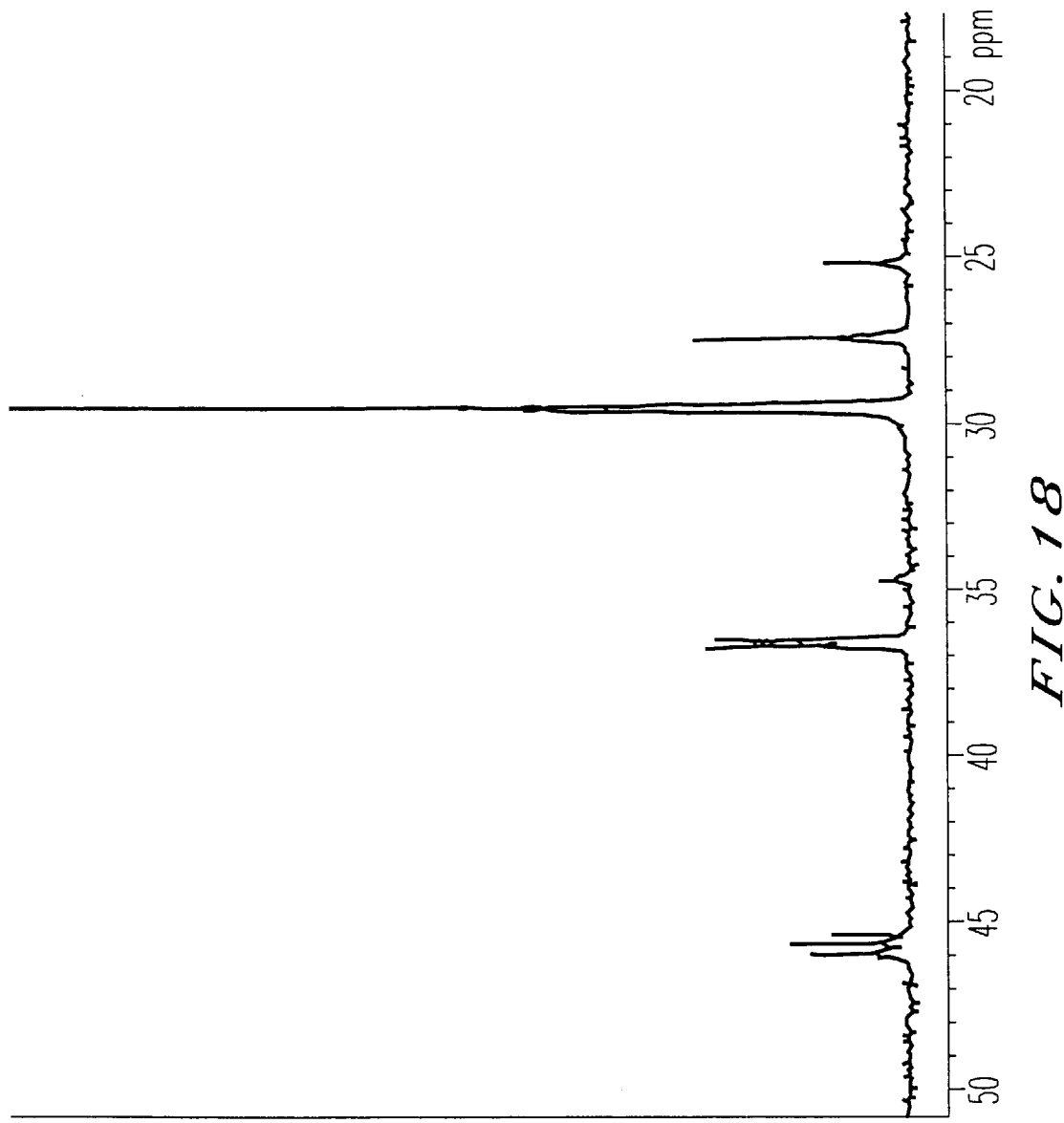
FIG. 18 is a 13C-NMR spectrum of the polymer obtained in Example 6, measured by using 1,1,2,2-tetrachloroethane-d2 as a solvent. Methine-methylene region.
Figure 19:
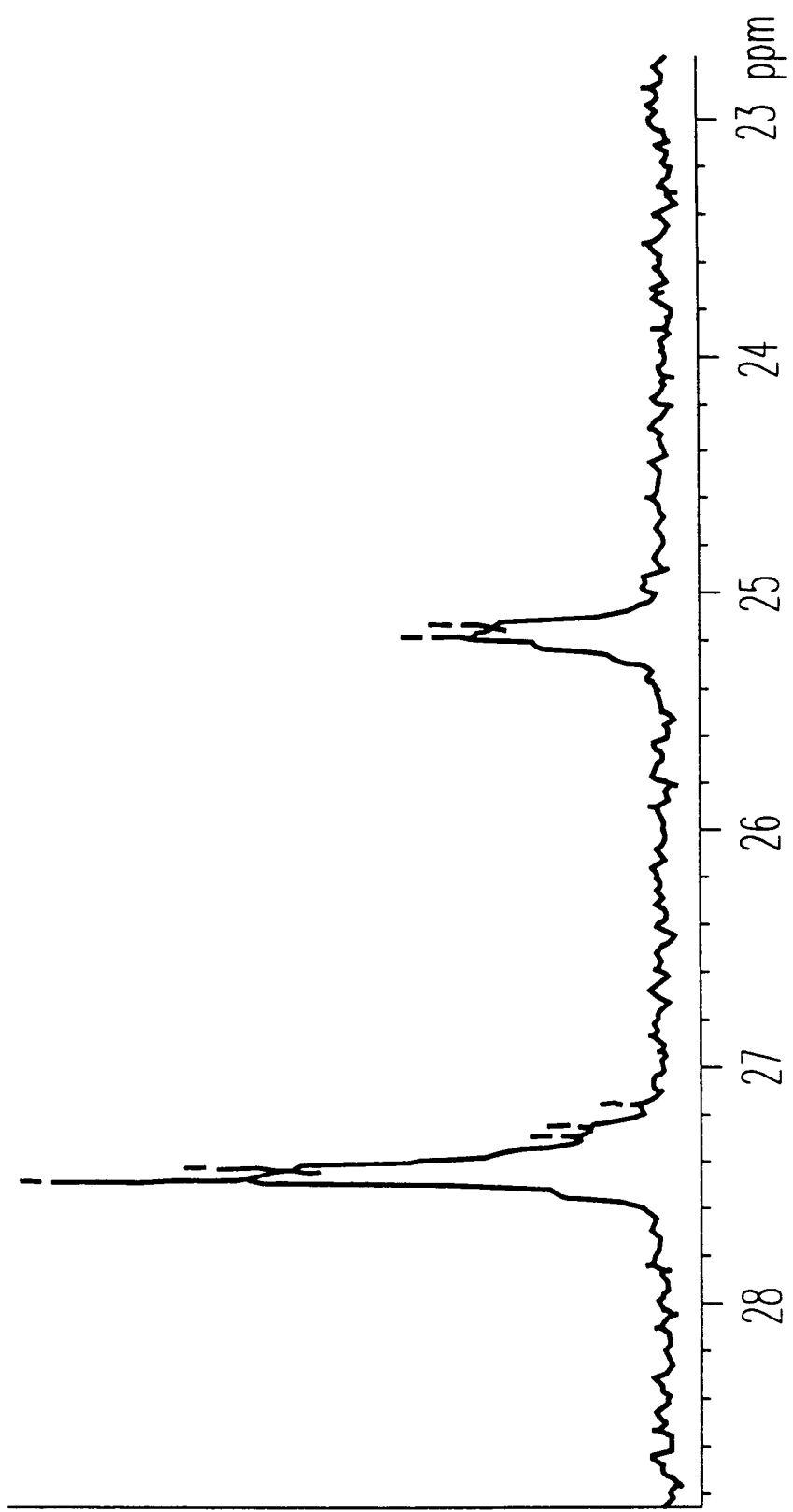
FIG. 19 is a 13C-NMR spectrum of the polymer obtained in Example 6, measured by using 1,1,2,2-tetrachloroethane-d2 as a solvent. In the vicinity of 25 ppm.
Figure 20:
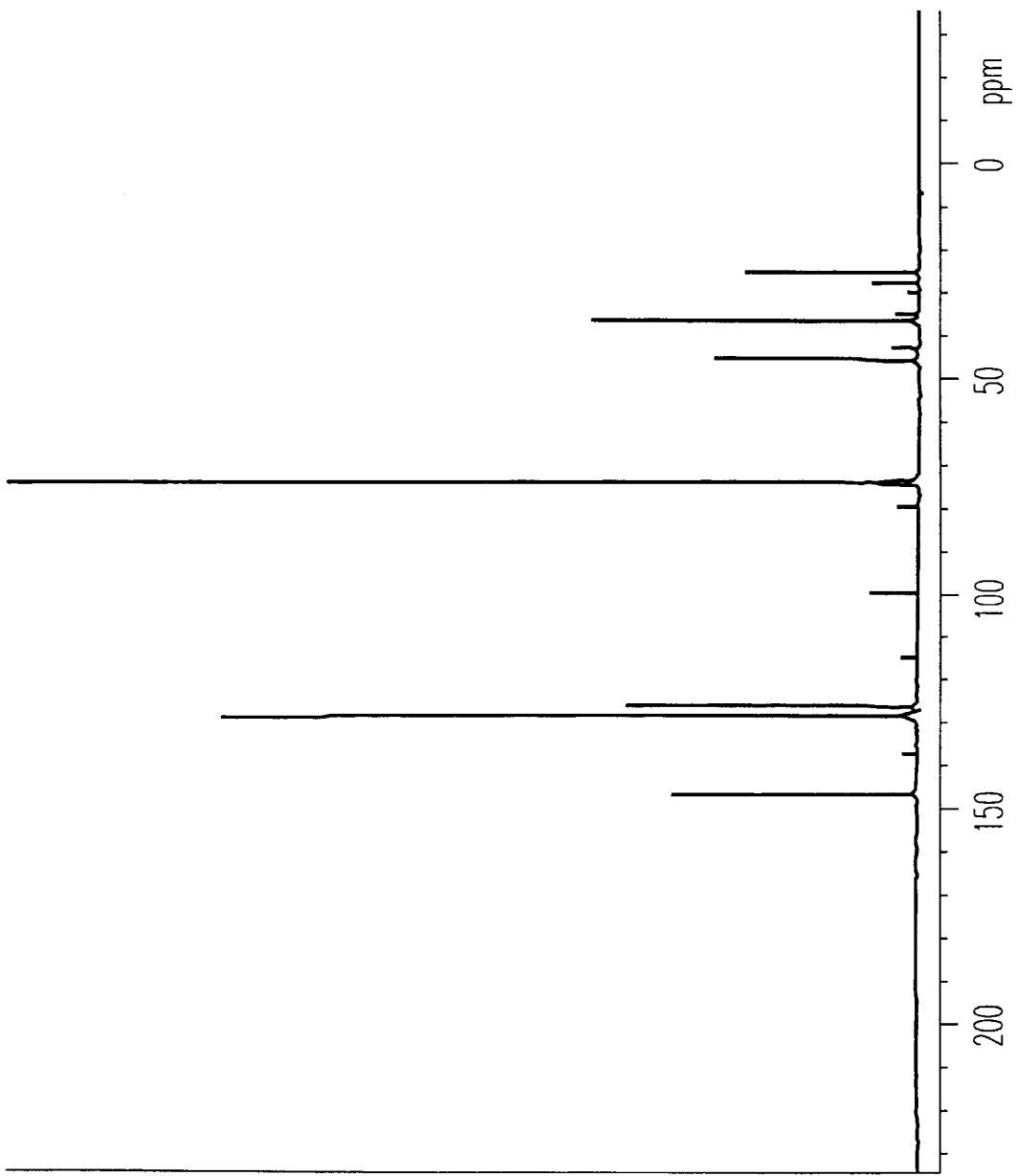
FIG. 20 is a 13C-NMR spectrum of the polymer obtained in Example 11, measured by using 1,1,2,2-tetrachloroethane-d2 as a solvent. Entire spectrum.
Figure 21:
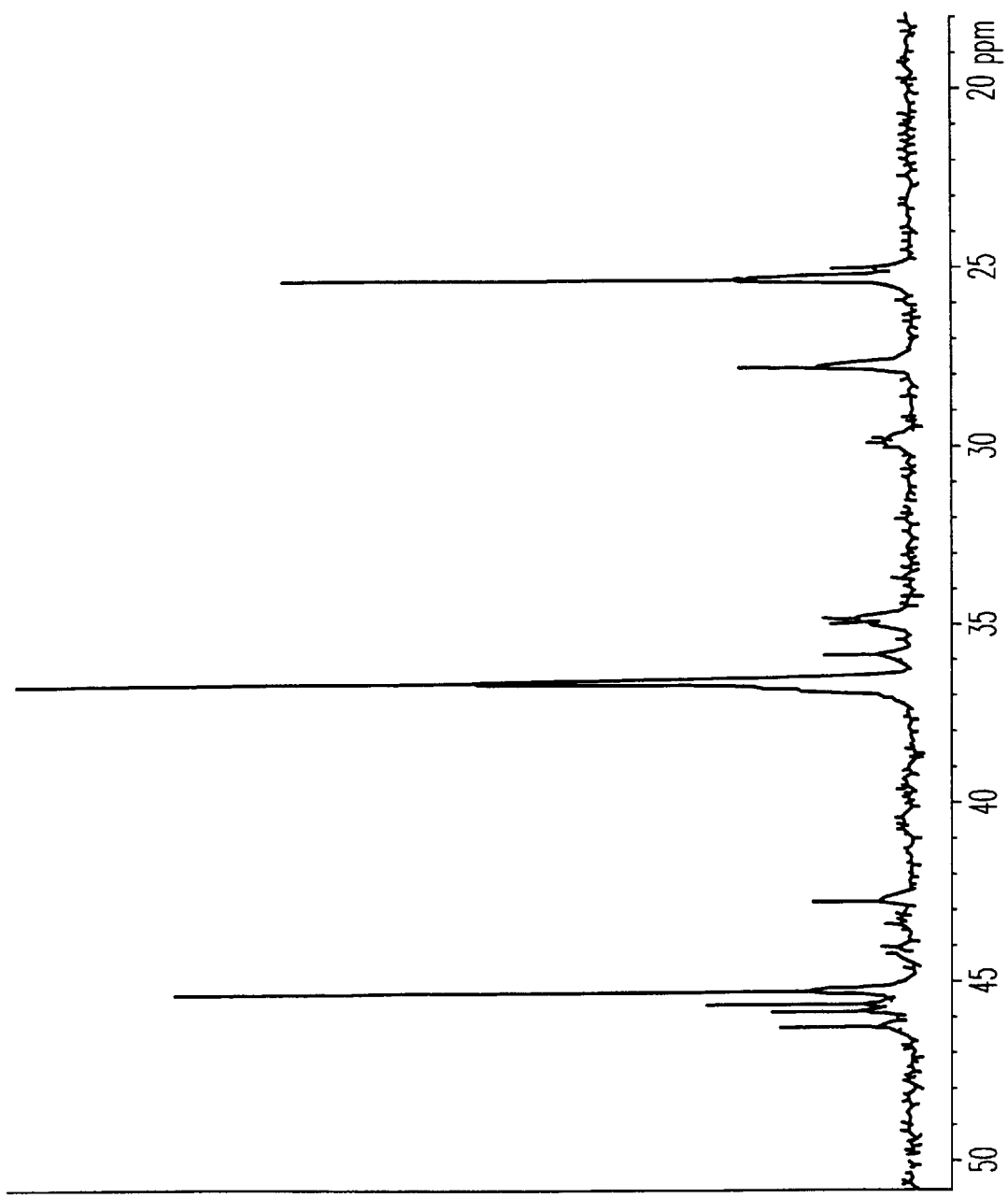
FIG. 21 is a 13C-NMR spectrum of the polymer obtained in Example 11, measured by using 1,1,2,2-tetrachloroethane-d2 as a solvent. Methine-methylene region.
Figure 22:
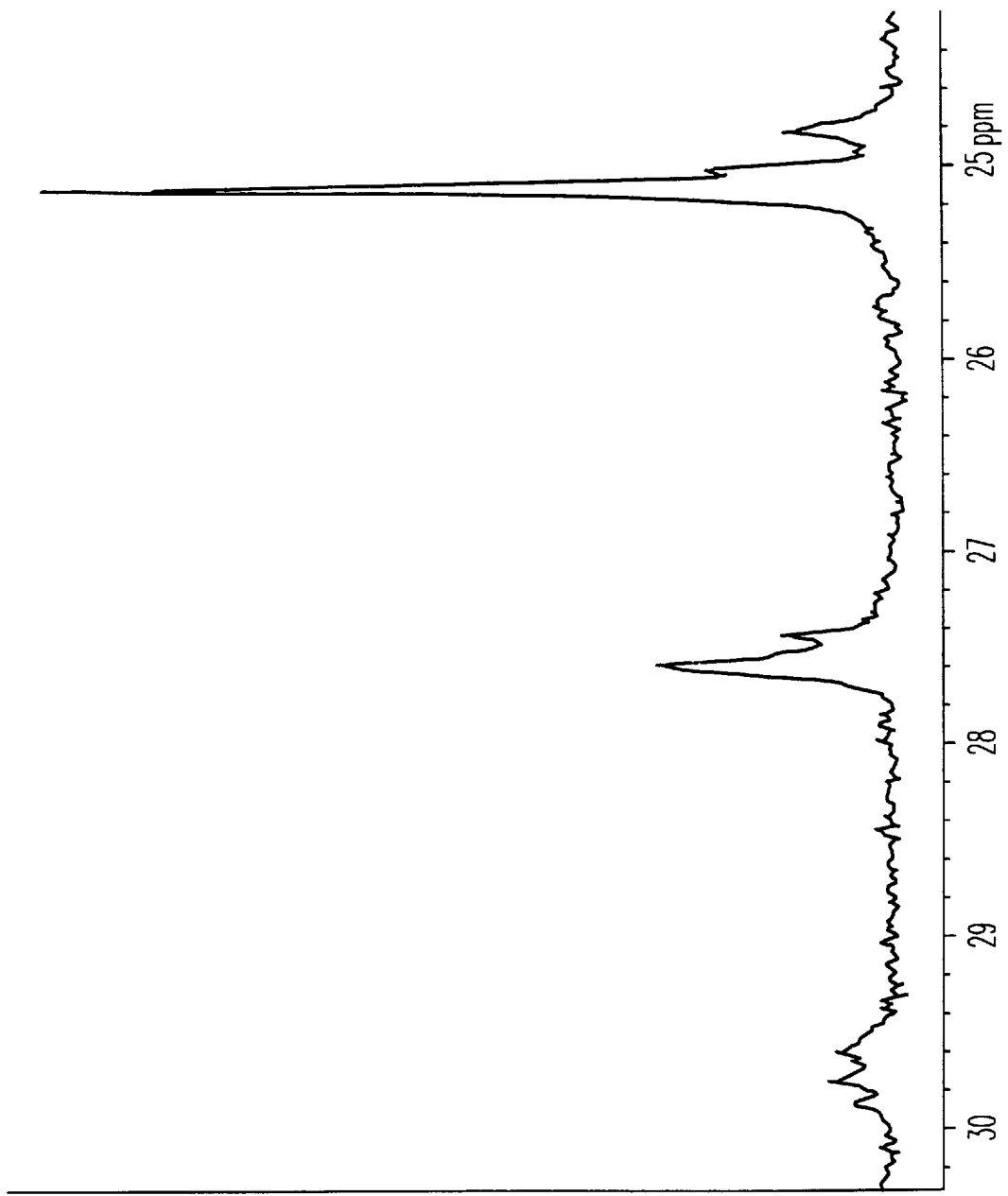
FIG. 22 is a 13C-NMR spectrum of the polymer obtained in Example 11, measured by using 1,1,2,2-tetrachloroethane-d2 as a solvent. In the vicinity of 25 ppm.
Figure 23:
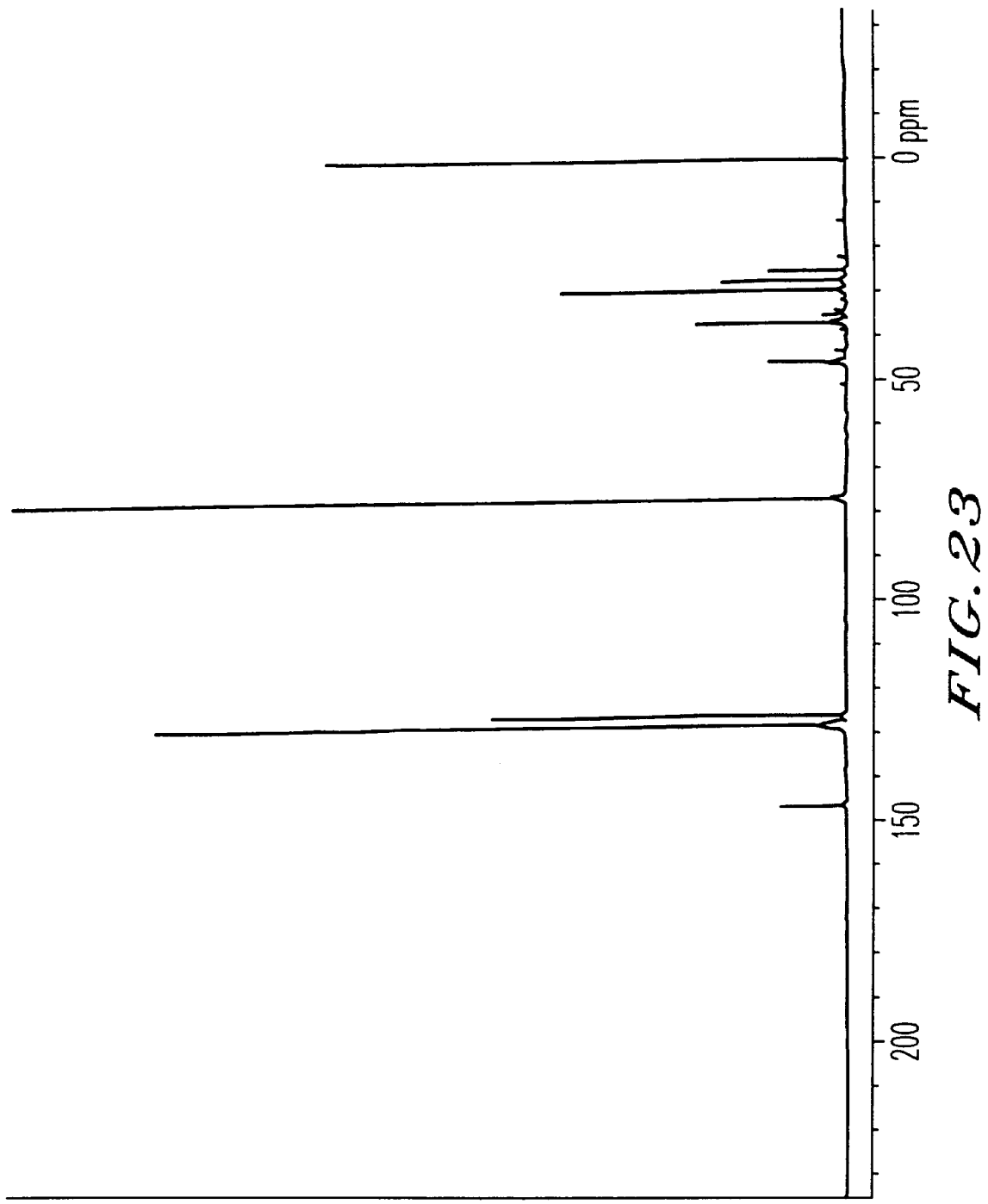
FIG. 23 is a 13C-NMR spectrum of the polymer obtained in Example 12, measured by using chloroform-d as a solvent. Entire spectrum.
Figure 24:
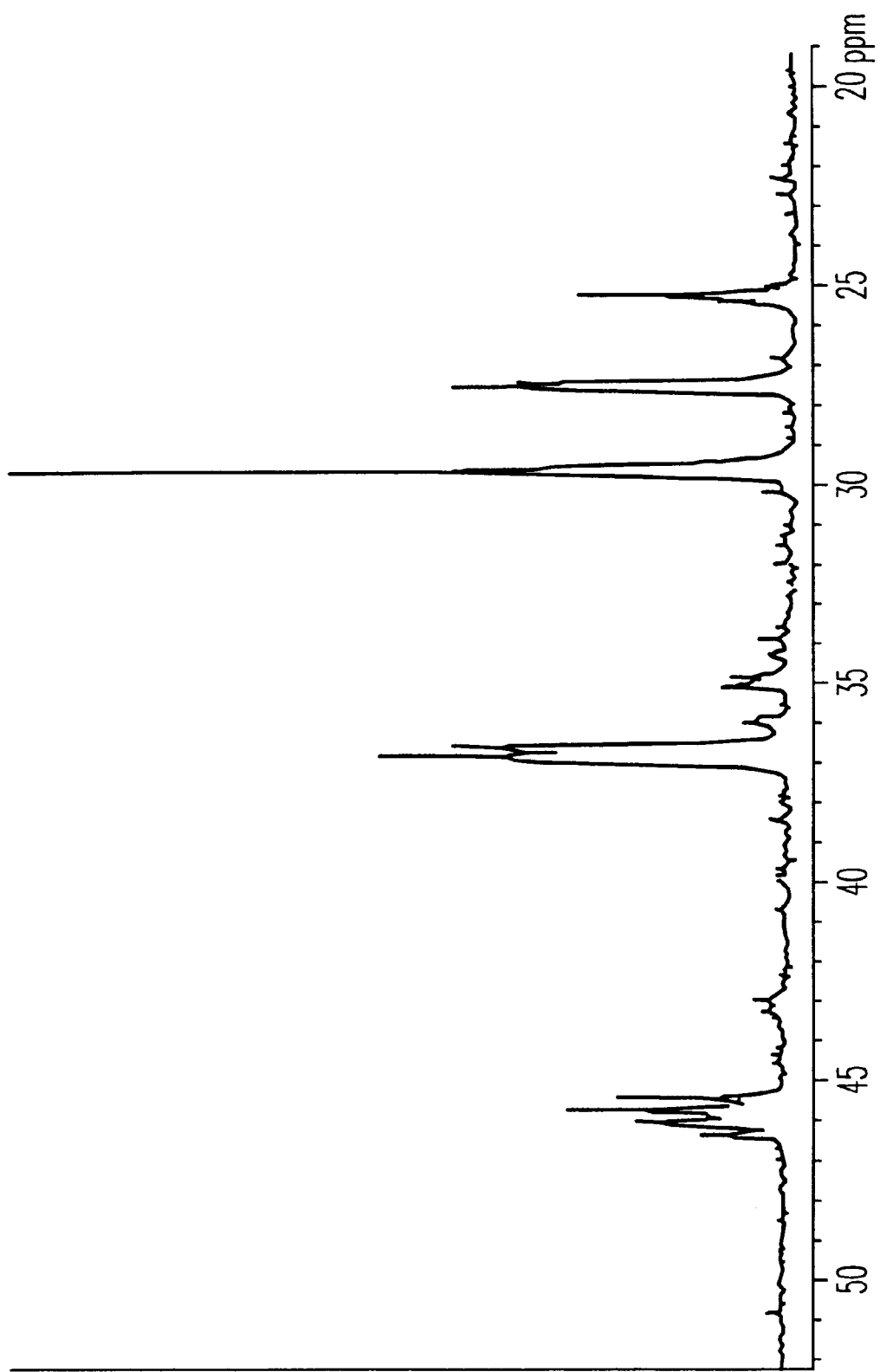
FIG. 24 is a 13C-NMR spectrum of the polymer obtained in Example 12, measured by using chloroform-d as a solvent. Methine-methylene region.
Figure 25:
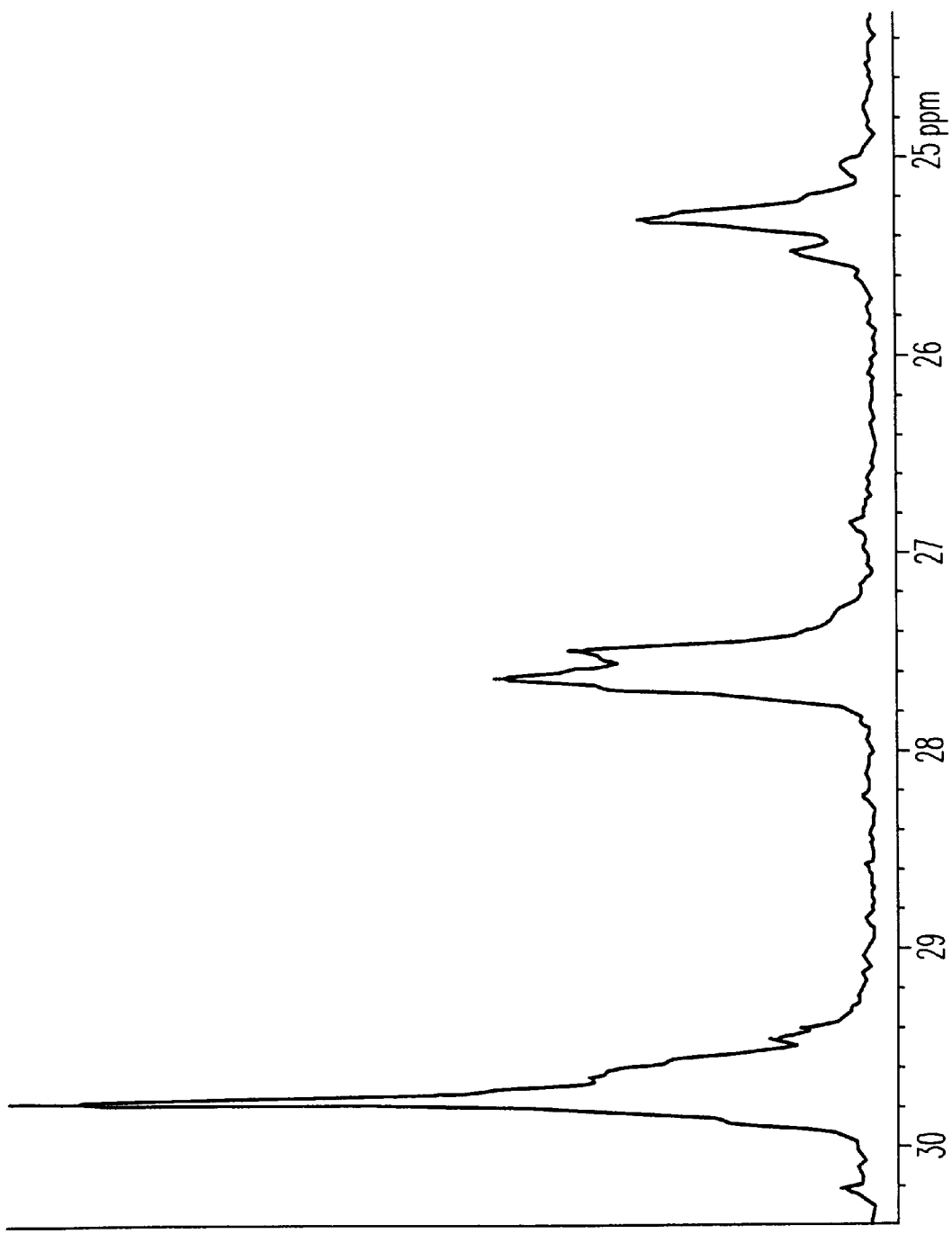
FIG. 25 is a 13C-NMR spectrum of the polymer obtained in Example 12, measured by using chloroform-d as a solvent. In the vicinity of 25 ppm.
Figure 26:
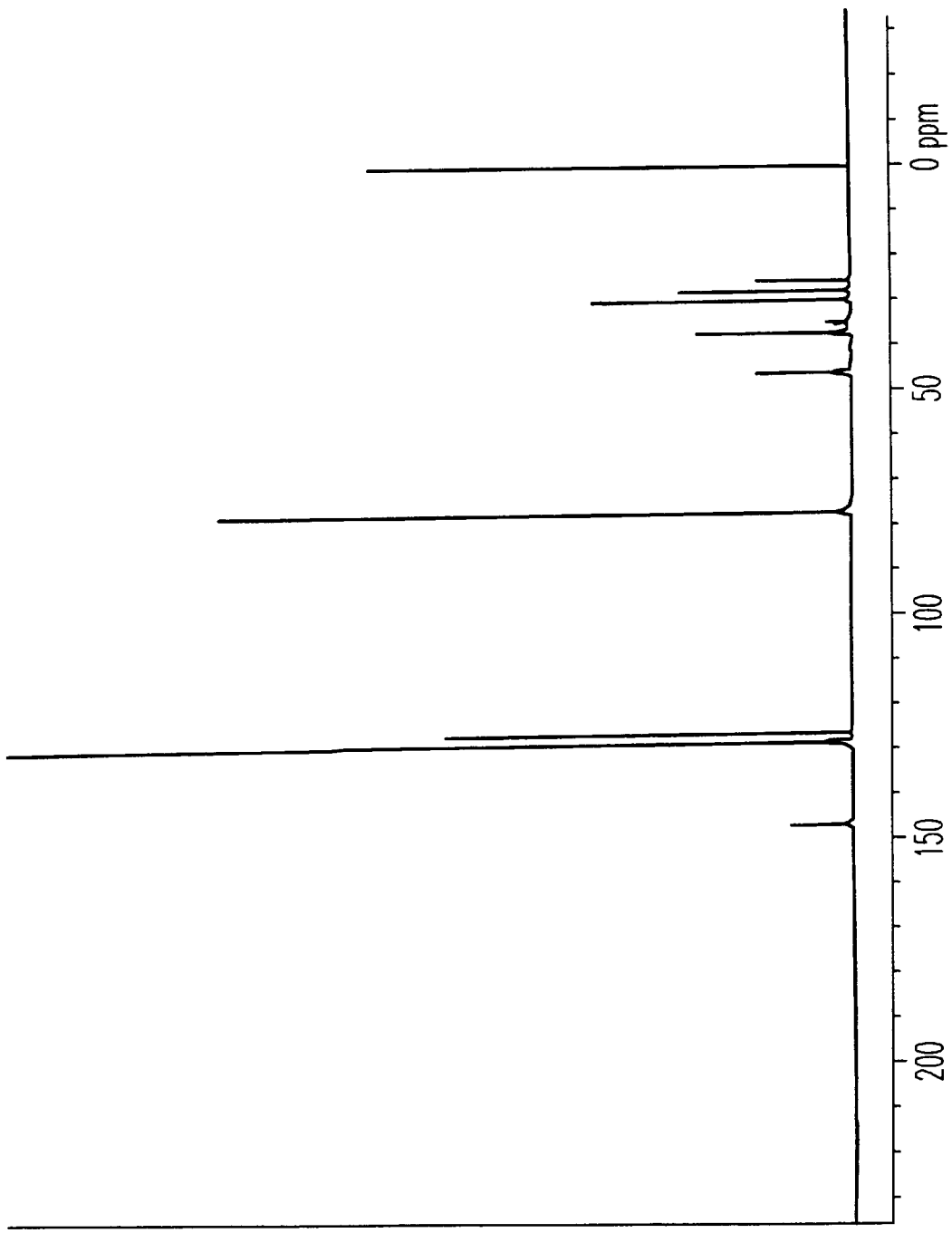
FIG. 26 is a 13C-NMR spectrum of the polymer obtained in Comparative Example 1, measured by using chloroform-d as a solvent. Entire spectrum.
Figure 27:
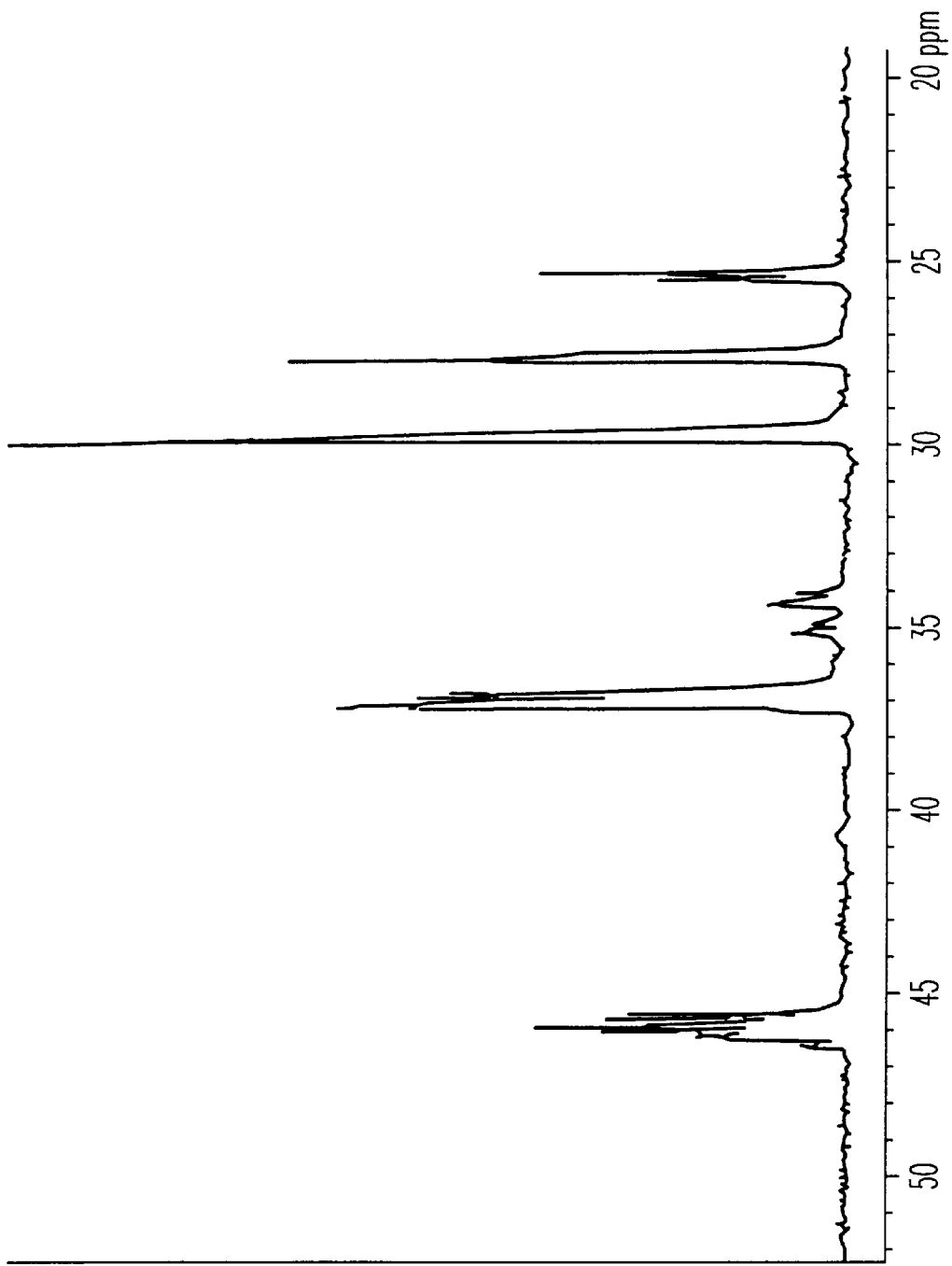
FIG. 27 is a 13C-NMR spectrum of the polymer obtained in Comparative Example 1, measured by using chloroform-d as a solvent. Methine-methylene region.
Figure 28:
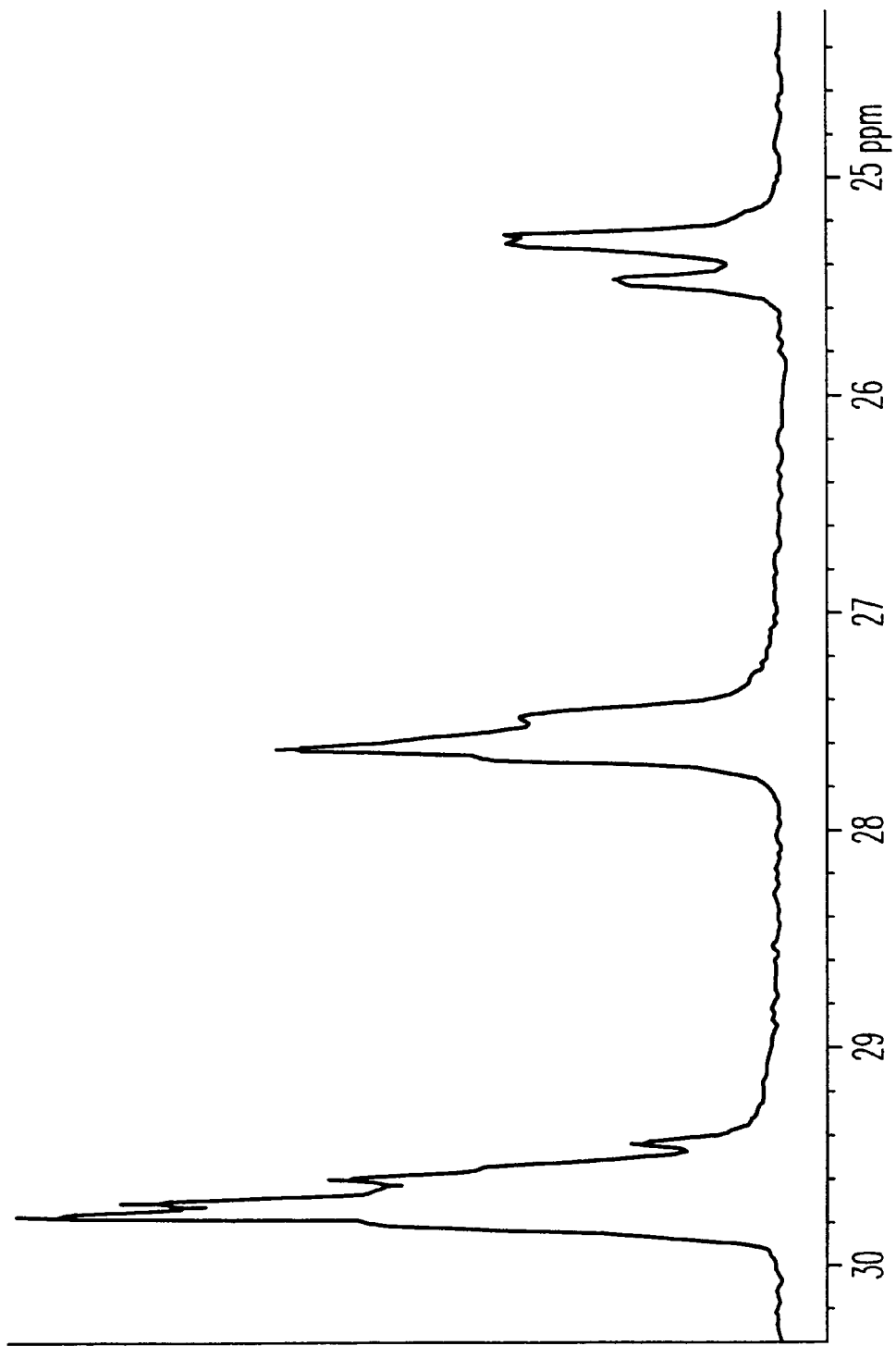
FIG. 28 is a 13C-NMR spectrum of the polymer obtained in Comparative Example 1, measured by using chloroform-d as a solvent. In the vicinity of 25 ppm.
Figure 29:
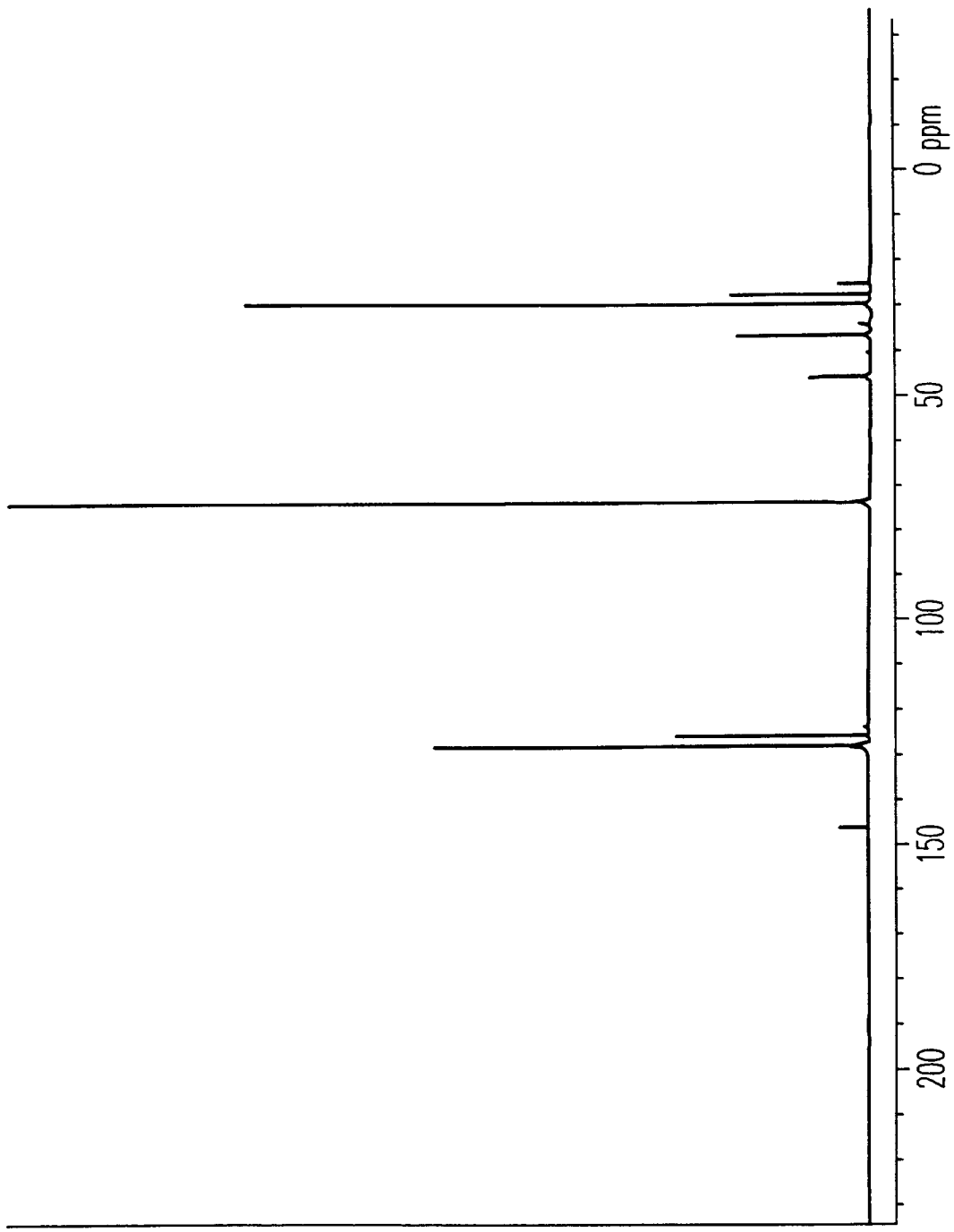
FIG. 29 is a 13C-NMR spectrum of the polymer obtained in Comparative Example 2, measured by using 1,1,2,2-tetrachloroethane-d2 as a solvent. Entire spectrum.
Figure 30:
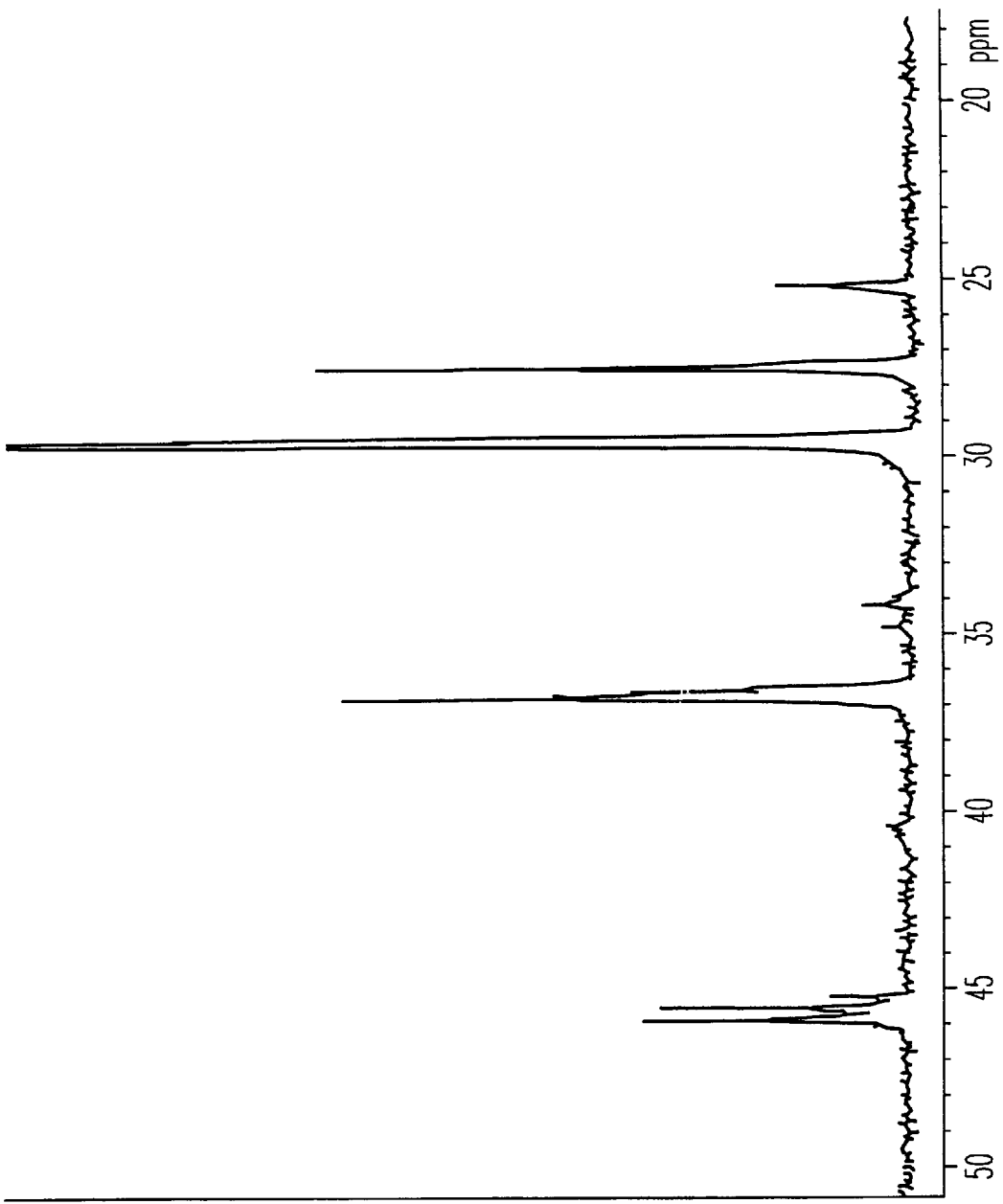
FIG. 30 is a 13C-NMR spectrum of the polymer obtained in Comparative Example 2, measured by using 1,1,2,2-tetrachloroethane-d2 as a solvent. Methine-methylene region.
Figure 31:
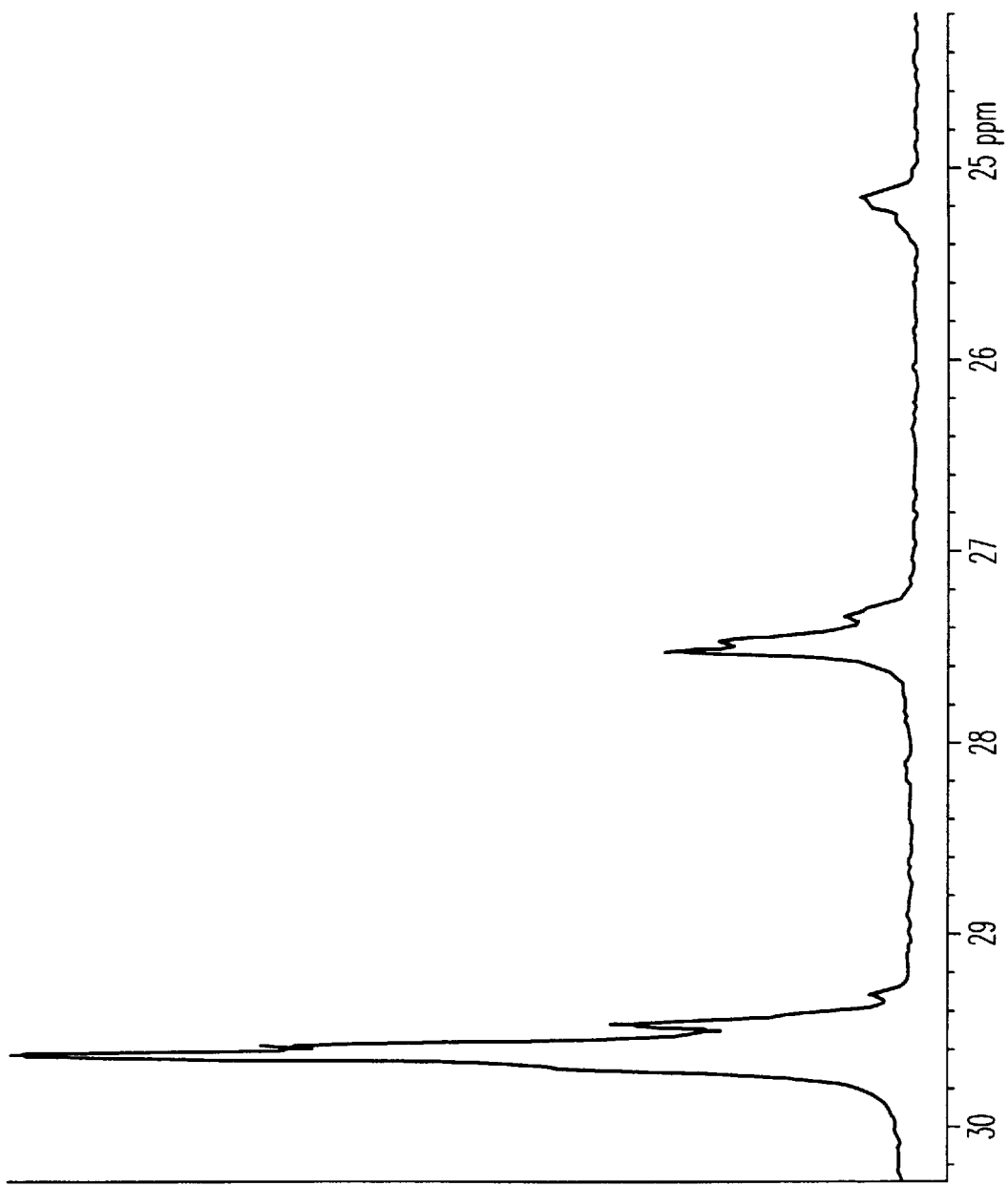
FIG. 31 is a 13C-NMR spectrum of the polymer obtained in Comparative Example 2, measured by using 1,1,2,2-tetrachloroethane-d2 as a solvent. In the vicinity of 25 ppm.
Figure 32:
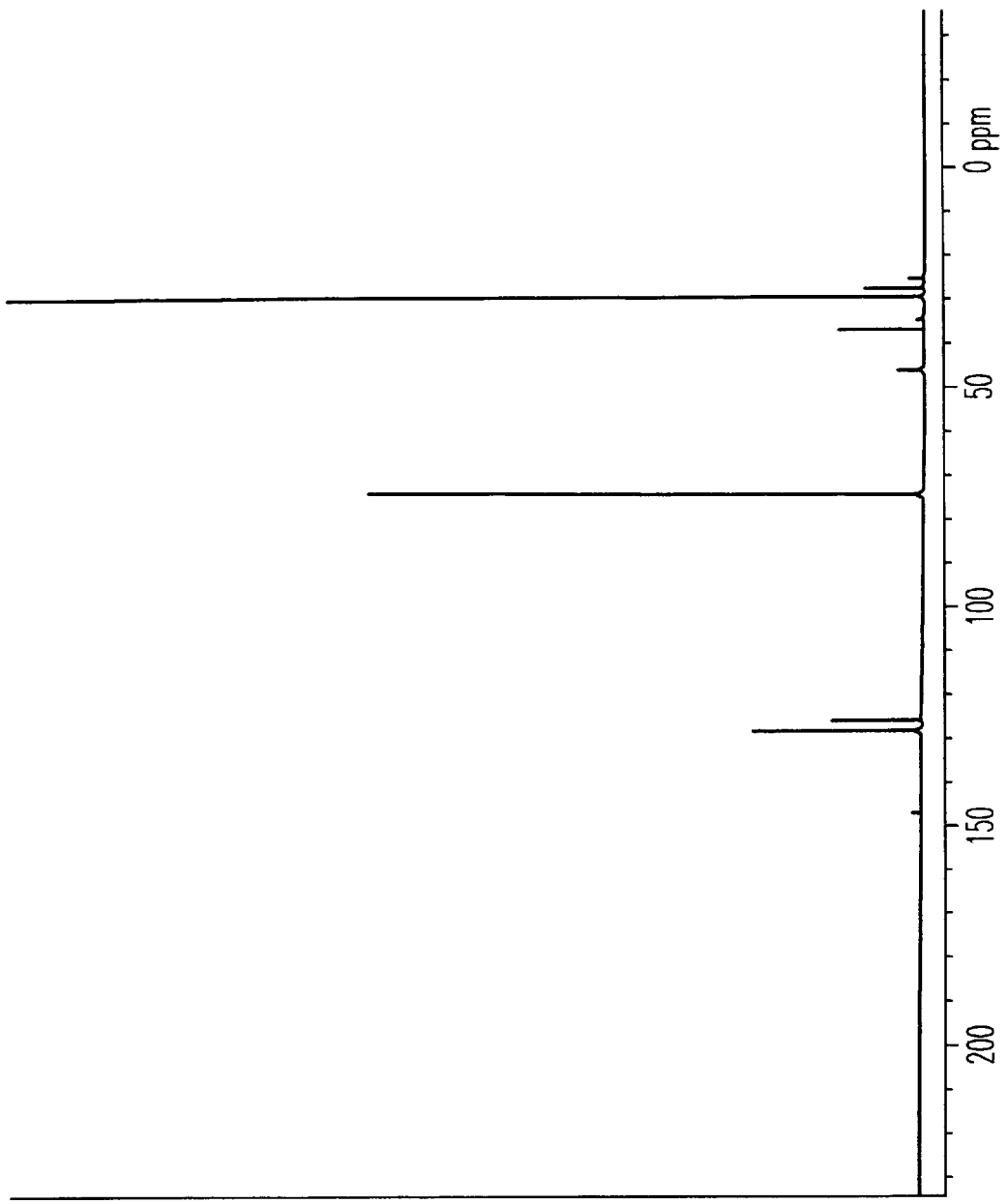
FIG. 32 is a 13C-NMR spectrum of the polymer obtained in Comparative Example 3, measured by using 1,1,2,2-tetrachloroethane-d2 as a solvent. Entire spectrum.
Figure 33:
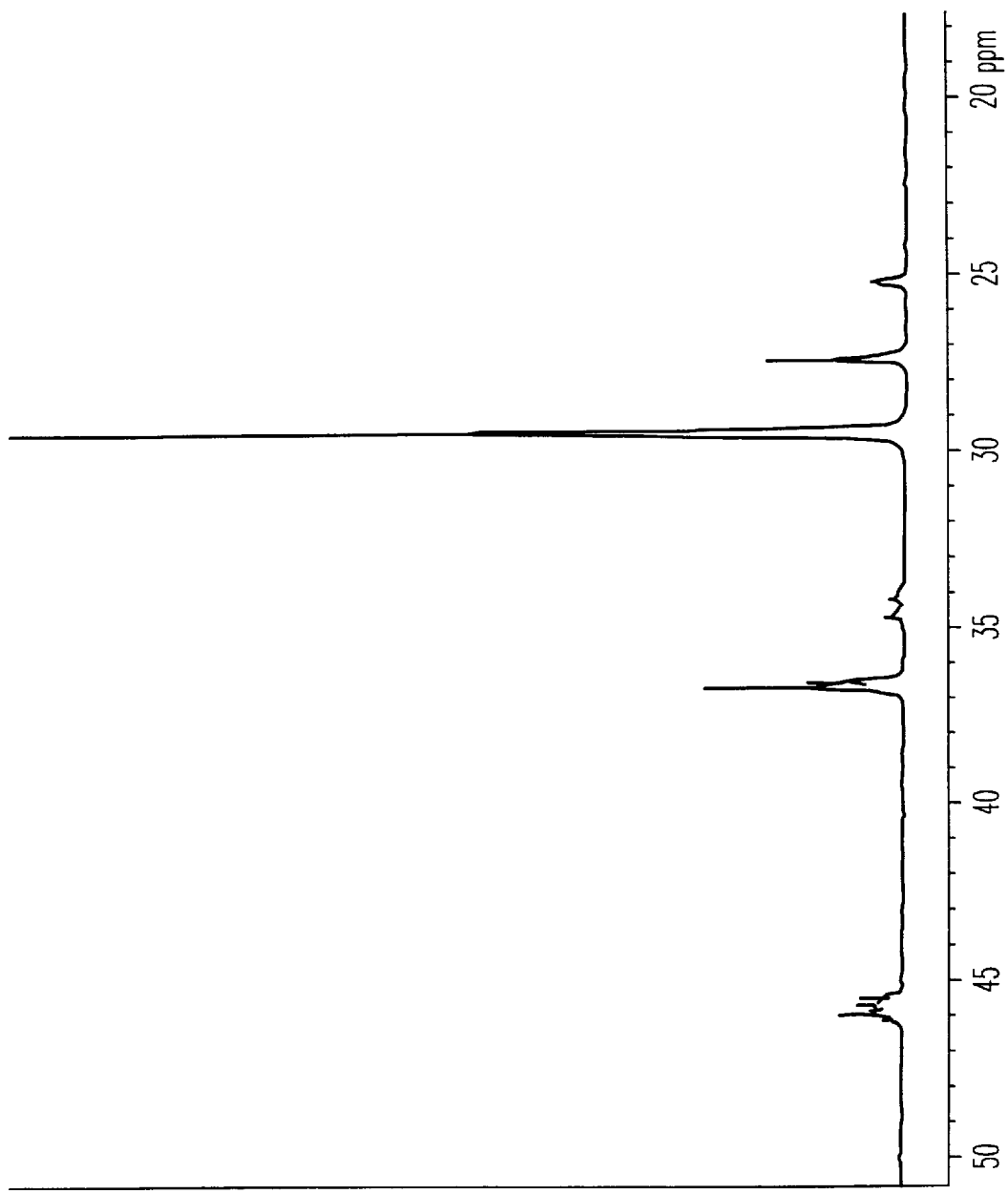
FIG. 33 is a 13C-NMR spectrum of the polymer obtained in Comparative Example 3, measured by using 1,1,2,2-tetrachloroethane-d2 as a solvent. Methine-methylene region.
Figure 34:
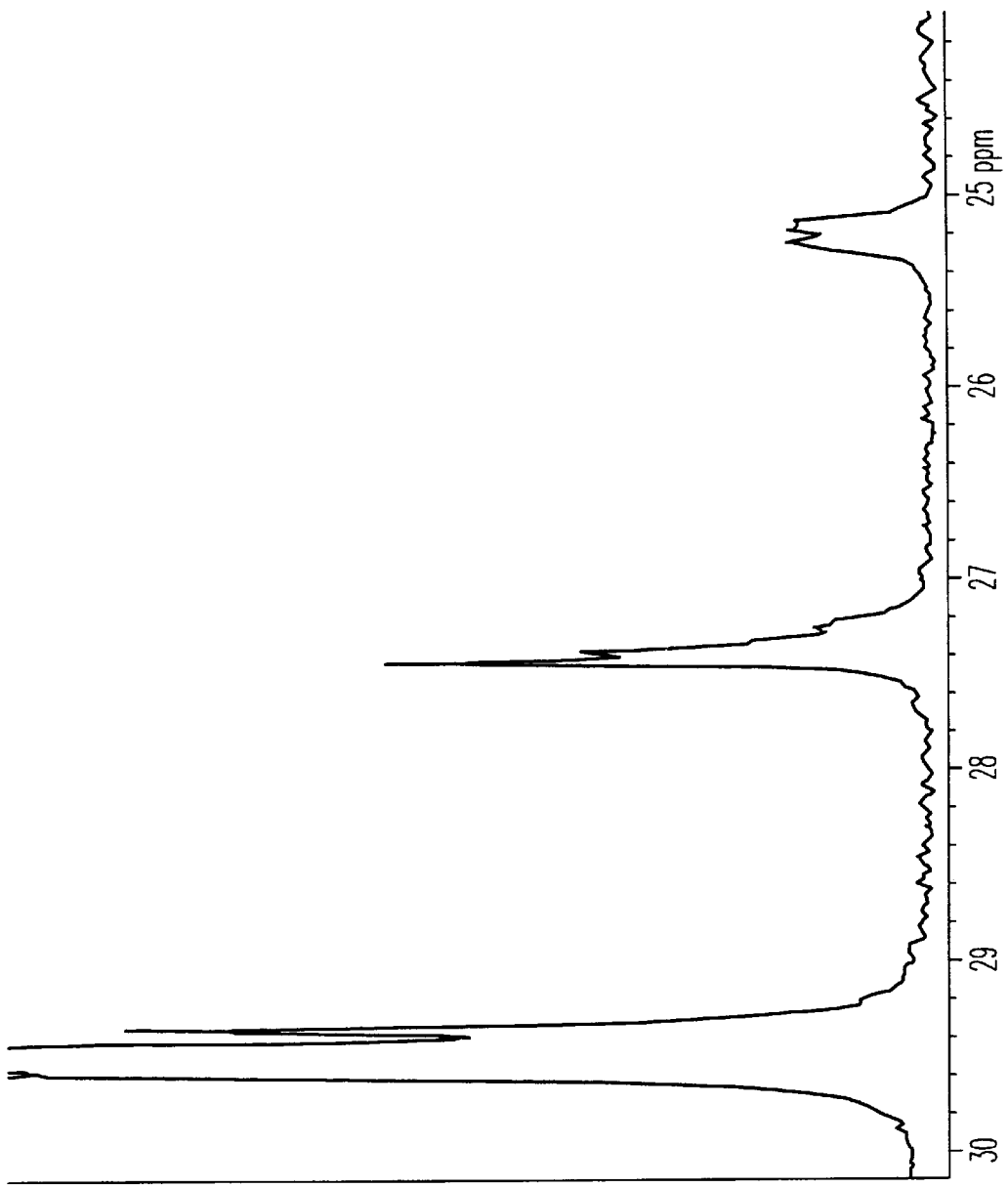
FIG. 34 is a 13C-NMR spectrum of the polymer obtained in Comparative Example 3, measured by using 1,1,2,2-tetrachloroethane-d2 as a solvent. In the vicinity of 25 ppm.
Figure 35:
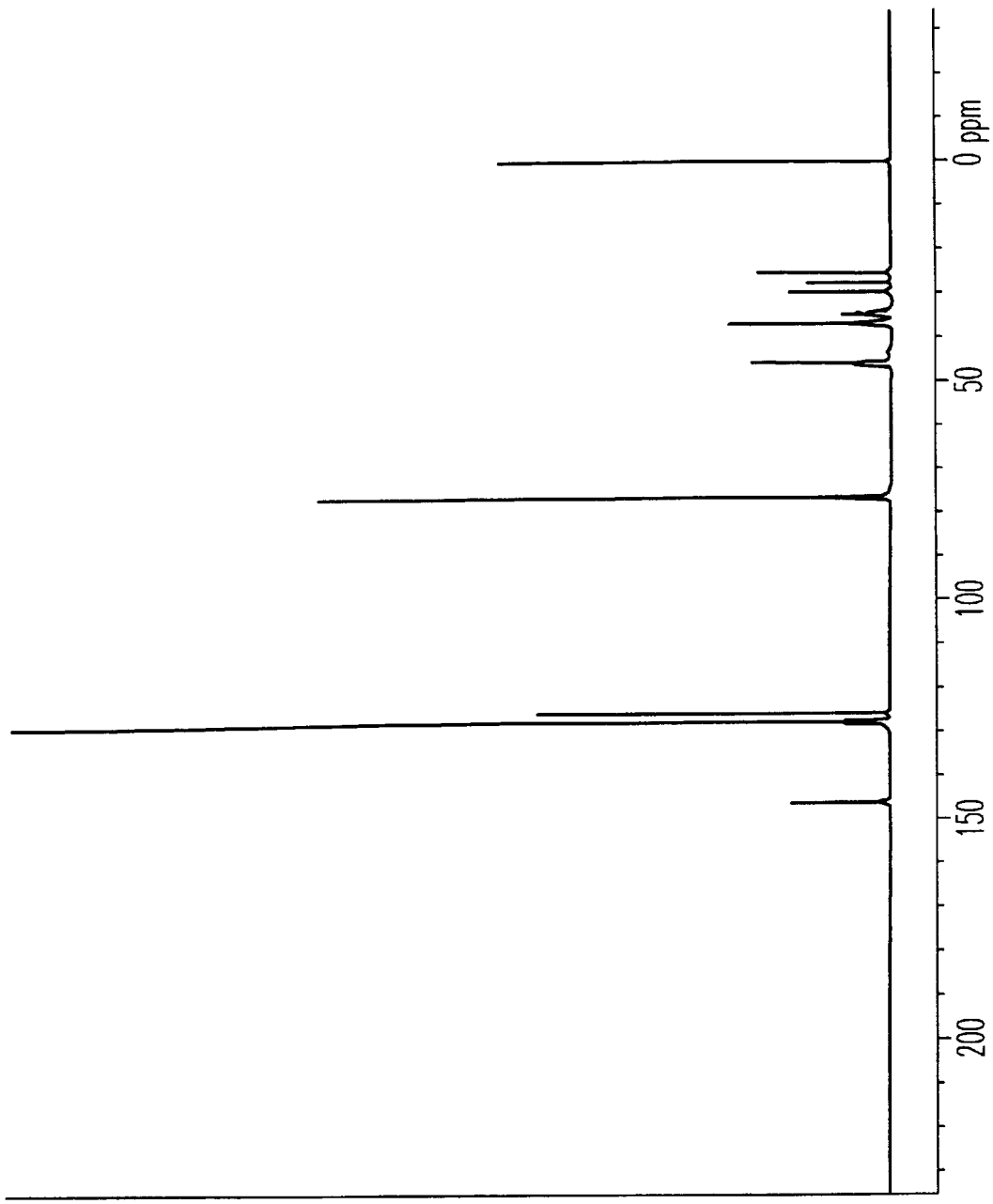
FIG. 35 is a 13C-NMR spectrum of the polymer (boiling THF soluble fraction) obtained in Comparative Example 4, measured by using chloroform-d as a solvent. Entire spectrum.
Figure 36:
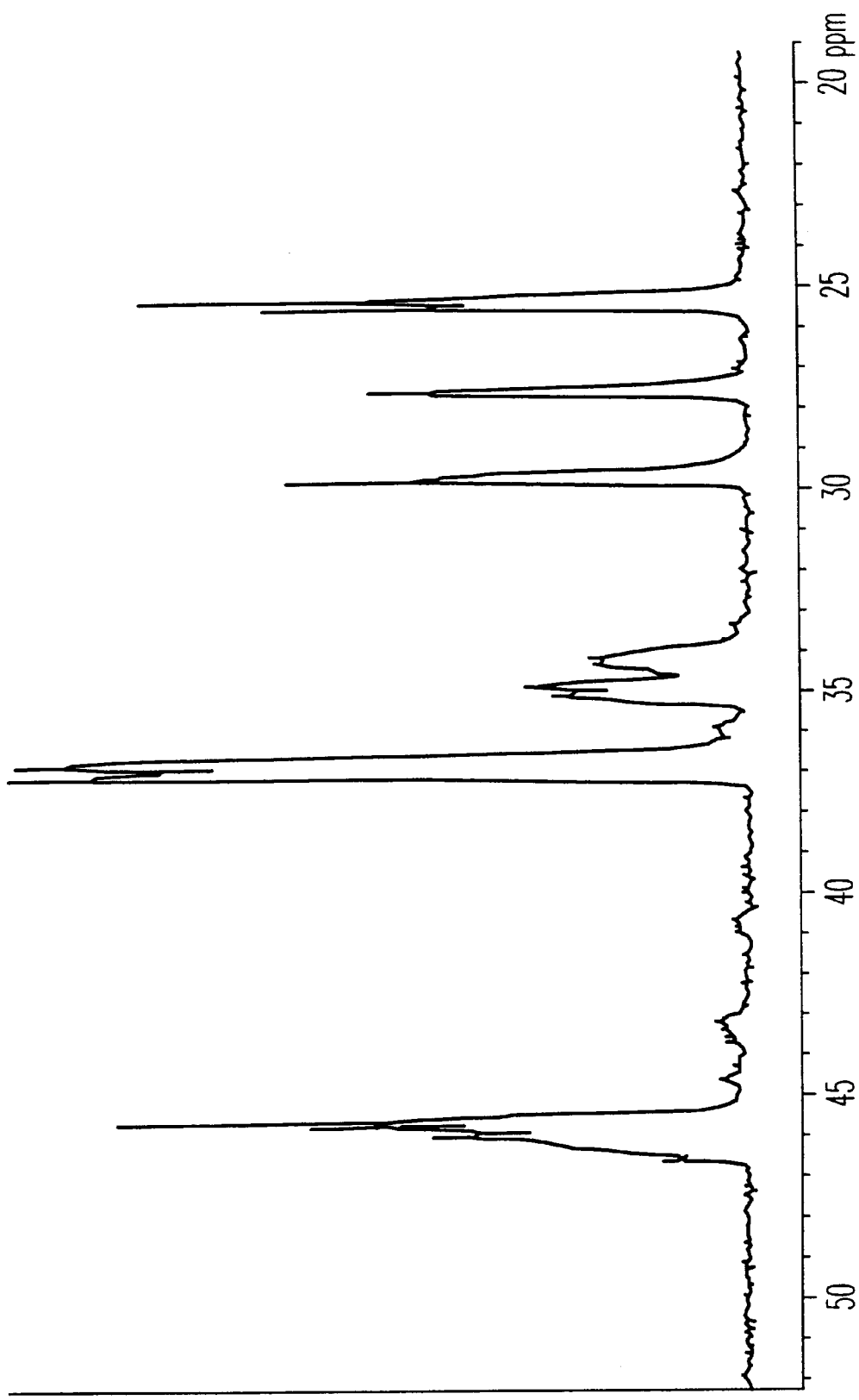
FIG. 36 is a 13C-NMR spectrum of the polymer (boiling THF soluble fraction) obtained in Comparative Example 4, measured by using chloroform-d as a solvent. Methine-methylene region.
Figure 37:
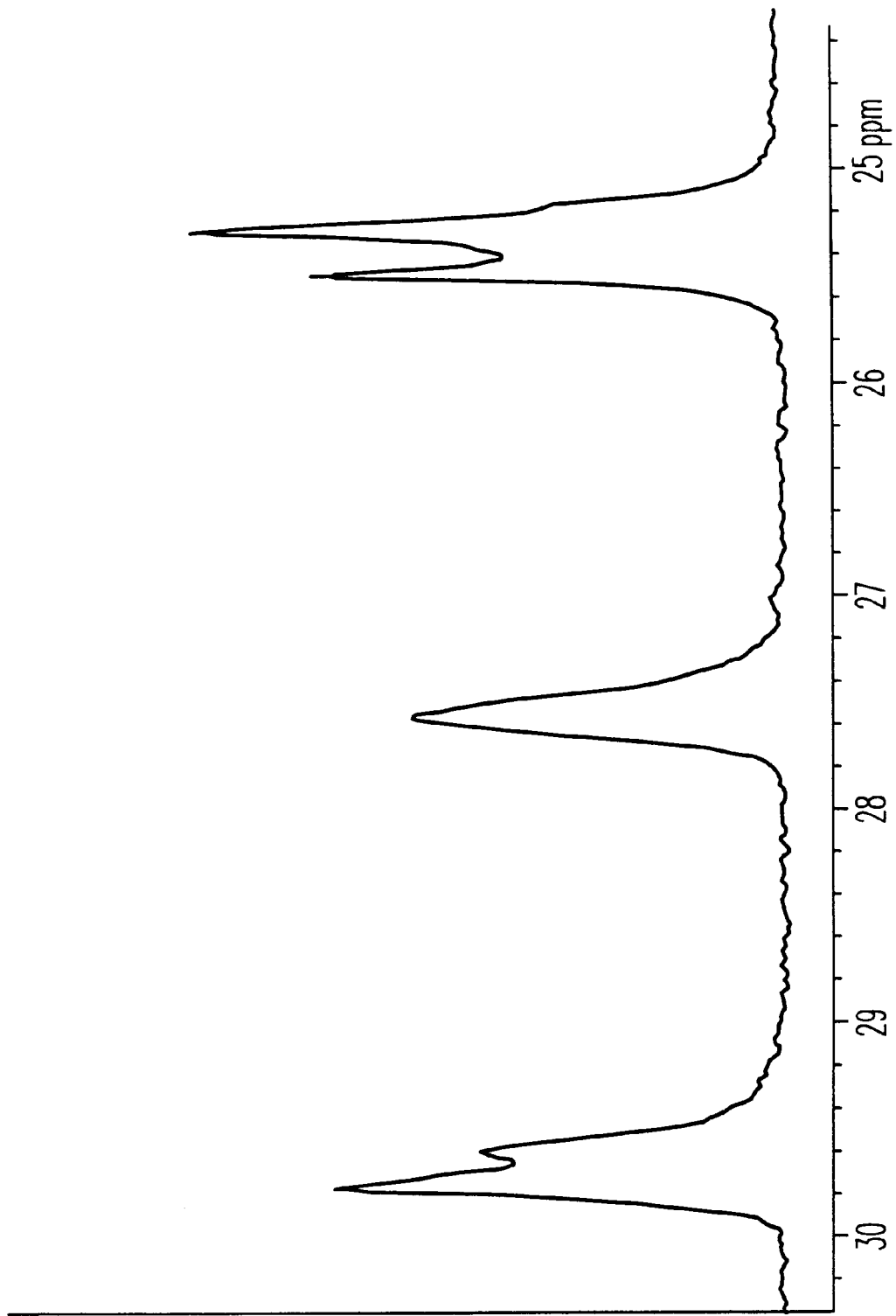
FIG. 37 is a 13C-NMR spectrum of the polymer (boiling THF soluble fraction) obtained in Comparative Example 4, measured by using chloroform-d as a solvent. In the vicinity of 25 ppm.
Figure 38:
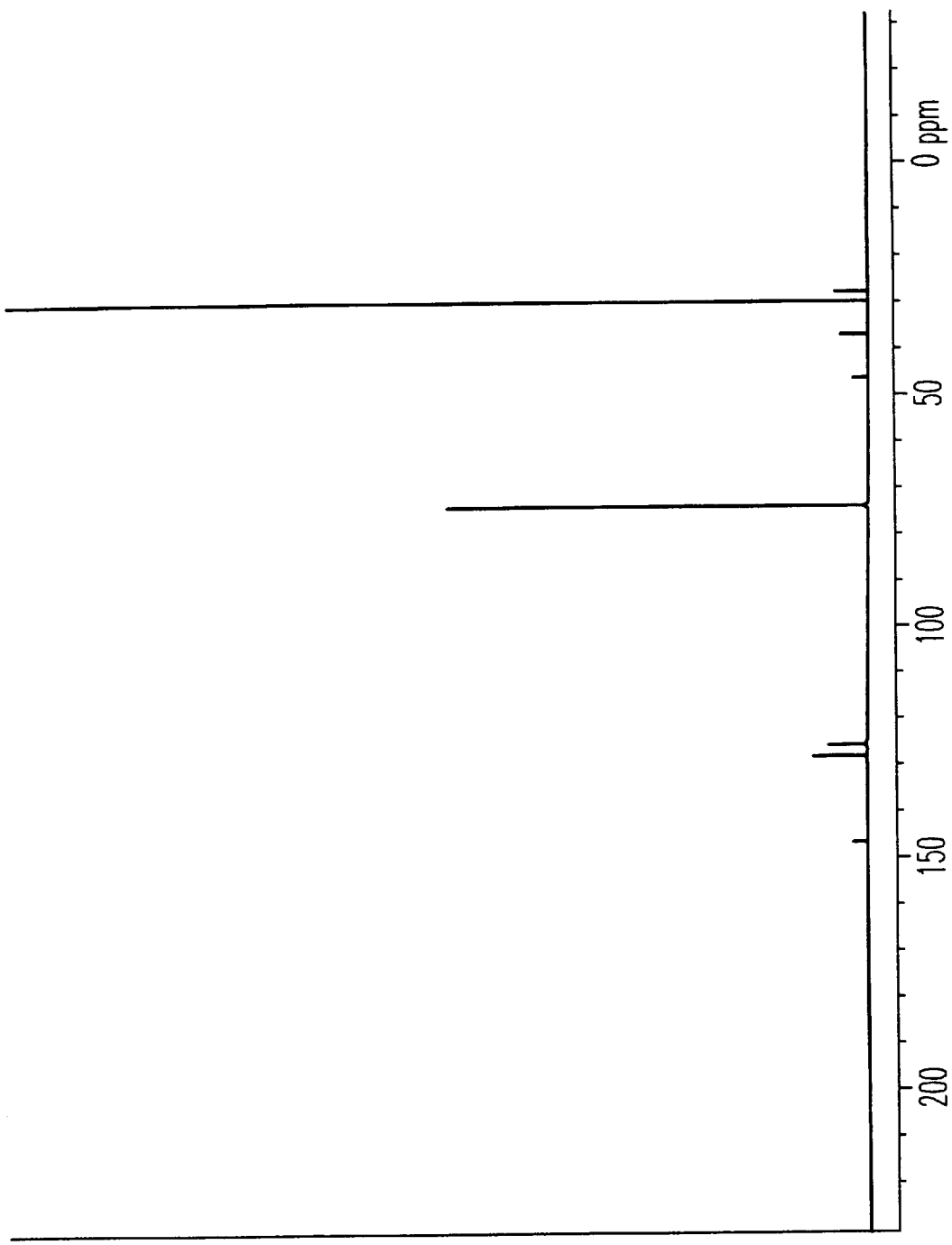
FIG. 38 is a 13C-NMR spectrum of the polymer obtained in Comparative Example 5, measured by using 1,1,2,2-tetrachloroethane-d2 as a solvent. Entire spectrum.
Figure 39:
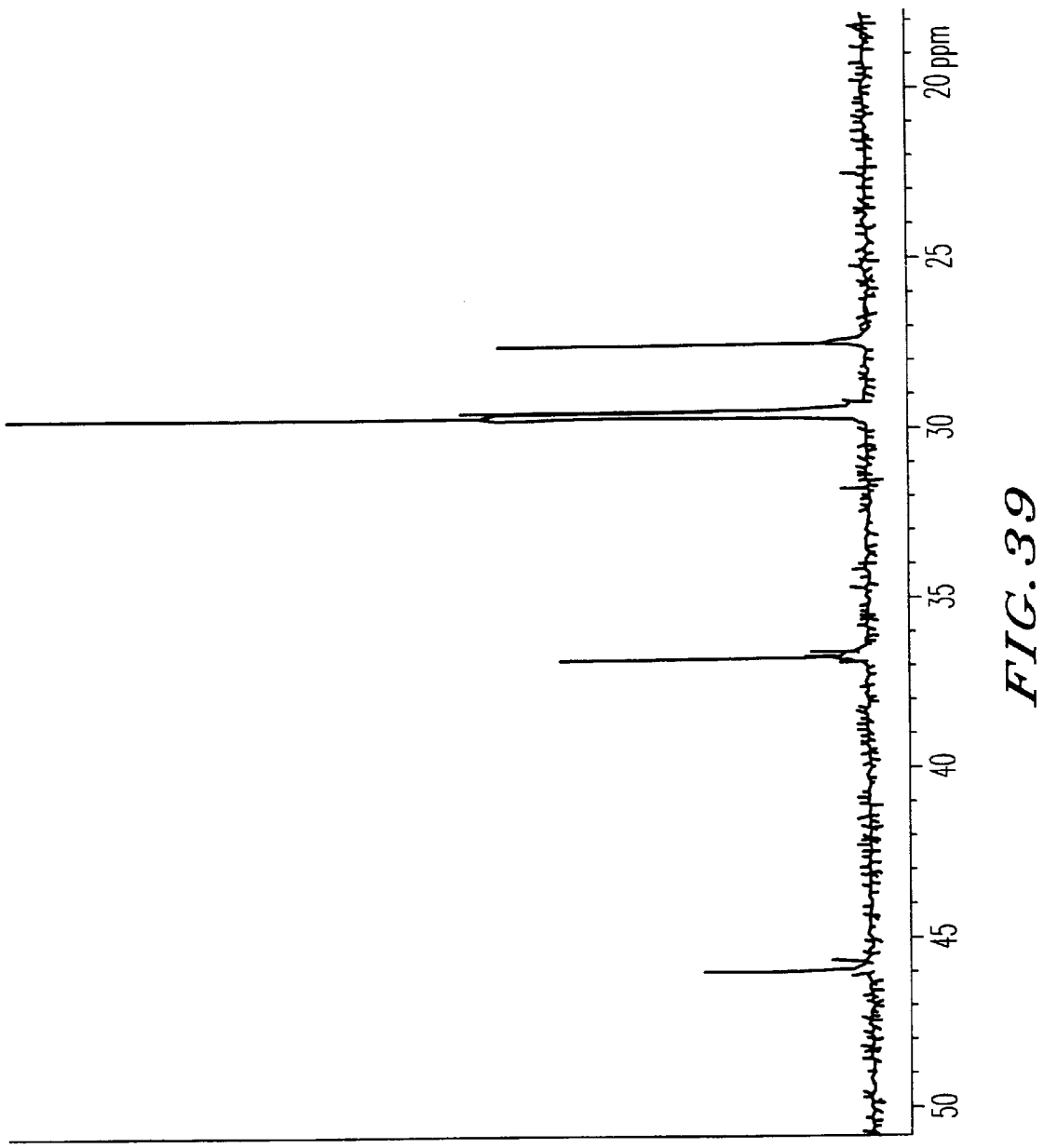
FIG. 39 is a 13C-NMR spectrum of the polymer obtained in Comparative Example 5, measured by using 1,1,2,2-tetrachloroethane-d2 as a solvent. Methine-methylene region.
Figure 40:
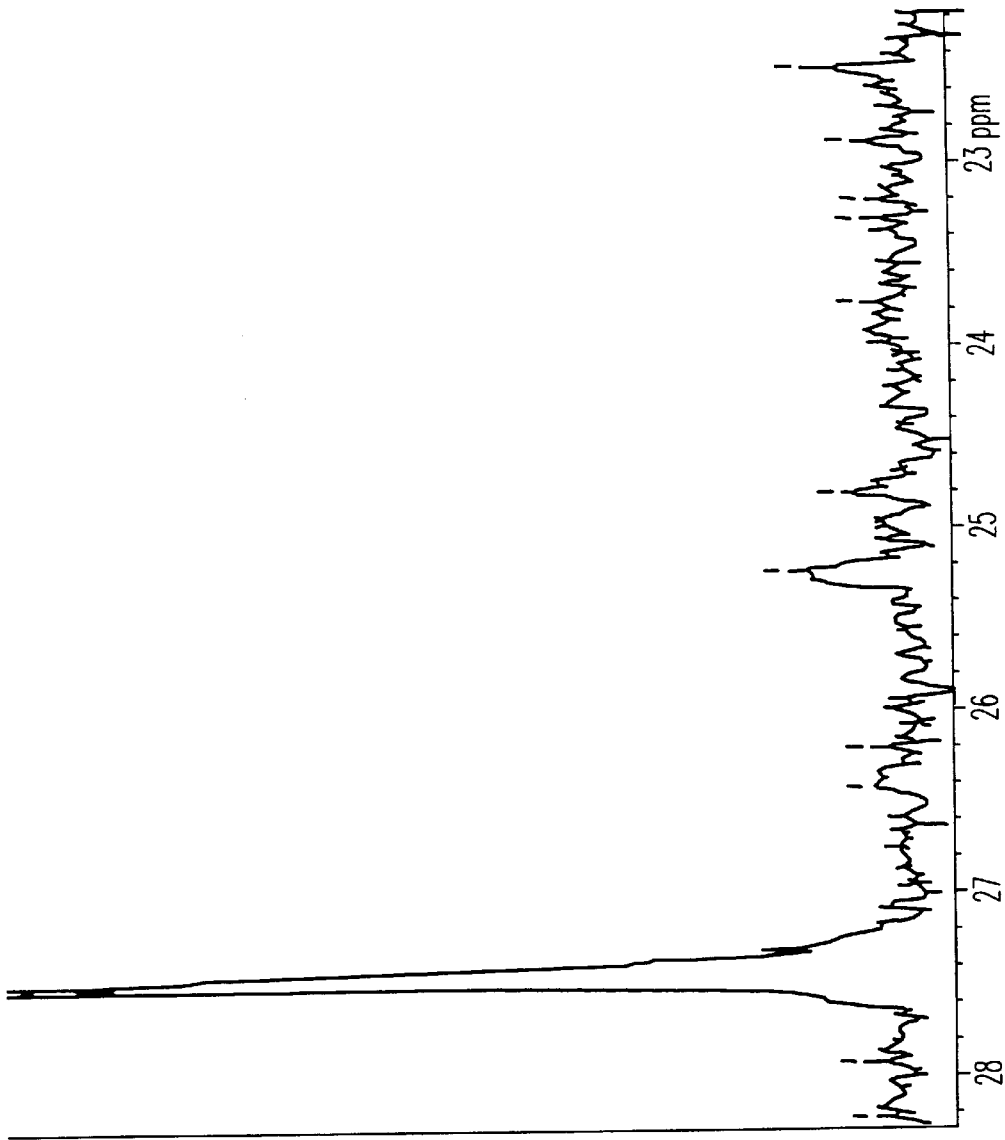
FIG. 40 is a 13C-NMR spectrum of the polymer obtained in Comparative Example 5, measured by using 1,1,2,2-tetrachloroethane-d2 as a solvent. In the vicinity of 25 ppm.

Now, the present invention will be described in detail. In the following description, Ph in chemical formulas represents an aromatic group such as a phenyl group.

The copolymer of the present invention is an ethylene-aromatic vinyl compound copolymer having an aromatic vinyl compound content of from 1 to less than 55 mol %, whereby the stereoregularity of phenyl groups in the alternating structure of ethylene and an aromatic vinyl compound represented by the formula (1) contained in its structure, is represented by an isotactic diad index m of more than 0.75 and the alternating structure index λ represented by the formula (i) is smaller than 70 and larger than 1.

Its structure can be determined by a nuclear magnetic resonance method (NMR).

Now, the present invention will be described with reference to an ethylene-styrene copolymer as a typical example of the copolymer of the present invention.

The 13C-NMR spectrum of this copolymer wherein the styrene content is from 1 to less than 55 mol % (from 3 to less than 82 wt %), shows peaks mainly at the following positions.

Namely, it shows peaks attributable to the main chain methylene and methine carbon in the vicinity of 25 ppm, 27 ppm, 30 ppm, 36 ppm and 45 ppm, peaks attributable to five carbon atoms of a phenyl groups not bonded to the polymer main chain in the vicinity of 126 ppm and 128 ppm, and a peak attributable to one carbon atom of a phenyl group bonded to the polymer main chain in the vicinity of 146 ppm.

The index λ showing the proportion of the ethylene-styrene alternating structure contained in the copolymer, is defined by the following formula (i):

$$\lambda = A3/A2 \times 100 \qquad (i)$$

where A3 is the sum of areas of three peaks a, b and c attributable to an ethylene-aromatic vinyl compound alternating structure represented by the following formula (1'), obtained by 13C-NMR, and A2 is the sum of areas of peaks attributable to the main chain methylene and methine carbon, as observed within a range of from 0 to 50 ppm by 13C-NMR using TMS as standard,

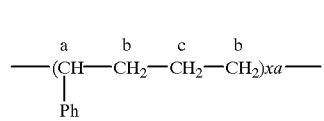

(1')

wherein Ph is an aromatic group such as a phenyl group, and xa is an integer of at least 2 representing the number of repeating units.

The copolymer of the present invention is characterized in that the alternating structure index λ is smaller than 70 and larger than 1, preferably smaller than 70 and larger than 5.

In the copolymer of the present invention, the stereoregularity of phenyl groups in the alternating copolymer structure of ethylene and styrene being an isotactic structure is meant for a structure wherein the isotactic diad index m (or a meso diad fraction) is more than 0.75, preferably more than 0.85, more preferably more than 0.95.

The isotactic diad index m can be obtained by the following formula (iii) from an area Ar of the peak attributable to the r structure of the methylene carbon peak and an area Am of the peak attributable to the m structure appearing in the vicinity of 25 ppm.

$$m = Am/(Ar+Am) \qquad (iii)$$

The positions of the peaks may sometimes shift more or less depending upon the measuring conditions or the solvent used.

For example, when chloroform-d is used as a solvent, and TMS is used as standard, the peak attributable to the r structure appears in the vicinity of from 25.4 to 25.5 ppm, and the peak attributable to the m structure appears in the vicinity of from 25.2 to 25.3 ppm.

When 1,1,2,2-tetrachloroethane-d2 is used as a solvent, and the center peak (73.89 ppm) of the triplet of 1,1,2,2-tetrachloroethane-d2 is used as standard, the peak attributable to the r structure appears in the vicinity of from 25.3 to 25.4 ppm, and the peak attributable to the m structure appears in the vicinity of from 25.1 to 25.2 ppm.

Here, the m structure presents a meso diad structure, and the r structure represents a racemic diad structure.

Further, the copolymer of the present invention includes a copolymer wherein an index θ represented by the following formula (ii) is larger than 70 when the St content is less than 45 mol % and larger than 50 when the St content is at least 45 mol %:

$$\theta = A1/A2 \times 100 \quad (ii)$$

where A1 is the sum of areas of peaks attributable to methine and methylene carbon α to ε in the following formula (2'), as observed within a range of from 0 to 50 ppm by 13C-NMR using TMS as standard, and A2 is the sum of areas of peaks attributable to the main chain methylene and methine carbon, as observed within a range of from 0 to 50 ppm by 13C-NMR using TMS as standard:

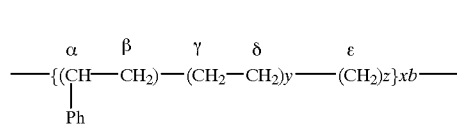

(2')

wherein Ph is an aromatic group such as a phenyl groups xb is an integer of at least 2 representing the number of repeating units, y is an integer of at least 1, which may be the same or different in the respective units, and z is 0 or 1, which may the same or different in the respective repeating units. When z is 0, the direction for insertion of styrene to the polymer chain is the same, whereas when z is 1, the direction for insertion of styrene to the polymer chain is not the same direction, thus indicating a case where a head to head or tail to tail bond is contained.

Further, the copolymer of the present invention may sometimes contain a head to head or tail to tail bond structure derived from styrene, as shown by the following formula (7) depending upon the polymerization conditions, etc.:

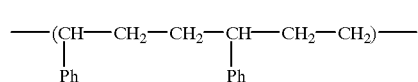

(7)

Peaks of methylene carbon of the structure derived from a head to head or tail to tail bond of styrene in a conventional pseudo random copolymer having no stereoregularity, are known to be observed within two regions of from 34.0 to 34.5 ppm and from 34.5 to 35.2 ppm (Polymer Preprints, Japan 42, 2292 (1993)). Whereas, with the ethylene-styrene copolymer of the present invention, a peak attributable to methylene carbon of a head to head or tail to tail bond structure derived from styrene, is observed in a region of from 34.5 to 35.2 ppm, but no substantial peak is observed within a region of from 34.0 to 34.5 ppm.

This is one of the characteristics of the copolymer of the present invention and indicates that a high level of stereoregularity of phenyl groups is maintained even in the head to head or tail to tail bond structure derived from styrene.

Further, when the St content is at least 20 mol %, the copolymer of the present invention may contain a head-to-tail bond structure comprising two styrene units, represented by the following formula (8) (hereinafter sometimes referred to as a limited head to tail styrene structure).

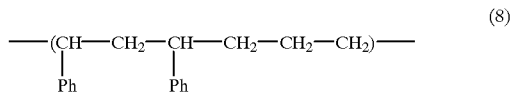

(8)

In any case, the ethylene-styrene copolymer of the present invention shows no distinct peak of syndiotactic polystyrene (40.8 to 41.0 ppm), atactic polystyrene (40.5 to 41.0 ppm) or isotactic polystyrene in the vicinity of from 40 to 41 ppm in the 13C-NMR spectrum using TMS as standard at any styrene content. Namely, a chain of an atactic, syndiotactic or isotactic polystyrene having a head-to-tail structure of the following formula (9), characterized by such a peak, is not substantially present.

(9)

wherein q is an integer of at least 3.

The ethylene-styrene copolymer of the present invention is characterized in that it has a highly stereoregular alternating structure of ethylene and styrene in combination with various structures such as ethylene chains having various lengths, head to head or tail to tail bonds of styrene and limited head to tail styrenes.

Further, with the ethylene-styrene copolymer of the present invention, the proportion of the alternating structure can be changed depending upon the styrene content in the copolymer. The changeable range is substantially such that the value λ obtainable by the above formula (i) is within a range of from 1 to less than 70.

The stereoregular alternating structure is a crystallizable structure. Accordingly, the copolymer of the present invention can be made to have various properties in the form of a polymer having a crystalline, non-crystalline, partially or microcrystalline structure, by controlling the St content or the crystallinity by a suitable method. The value λ being less than 70 is important in order to impart significant toughness and transparency to a crystalline polymer, or to obtain a partially crystalline polymer, or to obtain a non-crystalline polymer.

As compared with a conventional ethylene-styrene copolymer having no stereoregularity, the copolymer of the present invention is improved in various properties such as the initial tensile modulus, hardness, breaking strength, elongation and solvent resistance in various St content regions at various degrees of crystallinity and thus exhibits characteristic physical properties as a thermoplastic elastomer, a novel crystalline resin or a transparent soft resin.

To improve the crystallinity of the copolymer of the present invention, a common method used for other crystalline polymers (addition of a plasticizer or a nucleating agent such as a filler) can be employed as it is. Further, immersion into a poor solvent such as hexane, although such a method may be less practical or annealing at a temperature sufficiently higher than the glass transition temperature may, for example, be mentioned as a simple method for improving the crystallinity. Further, the presence of the head-to-tail bond comprising two styrene units (the limited head to tail styrene structure) contributes to the improvement particularly in the initial tensile modulus and breaking strength of the copolymer and to the control of the proportion of the alternating structure represented by the above value λ to a level not higher than a certain limit in a region where the St content is relatively high.

In the foregoing, the ethylene-aromatic vinyl compound copolymer of the present invention has been described with reference to styrene as a typical example of the aromatic vinyl compound. However, the aromatic vinyl compound to be used for the copolymer of the present invention may be styrene or varios substituted styrenes such as p-methylstyrene, m-methylstyrene, o-methylstyrene, o-t-butylstyrene, m-t-butylstyrene, p-t-butylstyrene, p-chlorostyrene, o-chlorostyrene, and α-methylstyrene. Further, a compound having a plurality of vinyl groups in one molecule, such as divinylbenzene, may also be mentioned.

Industrially preferably, styrene, p-methylstyrene or p-chlorostyrene is employed, and particularly preferred is styrene.

The copolymer of the present invention usually has a weight average molecular weight of at least 10,000, preferably at least 30,000, taking the physical properties of the copolymer into consideration.

The copolymer of the present invention is not necessarily a two component copolymer and may contain other structures or may have other monomers copolymerized, so long as the structure and the stereoregularity are within the above specified ranges. Copolymerizable other monomers include, for example, $C_{3-20}$ α-olefins such as propylene, and conjugated diene compounds such as butadiene. Further, it is possible to employ at least two components selected from the above-mentioned aromatic compounds such as p-chlorostyrene, p-t-butystyrene, p-methylstyrene and divinyl benzene.

Depending upon e.g. the polymerization conditions, an atactic homopolymer formed by thermal polymerization, radical polymerization or cationic polymerization of the aromatic vinyl compound may sometimes be contained in a small amount, but such an amount is not more than 10 wt % of the total amount. Such a homopolymer can be removed by extraction with a solvent, but may be left as included, so long as such an inclusion brings about no particular problems on the physical properties.

The copolymer of the present invention can be used as a thermoplastic elastomer, a crystalline resin or a transparent soft resin, depending upon its properties. Further, for the purpose of improving the physical properties, various additives or other polymers may be blended thereto. Further, a plurality of copolymers of the present invention differing in the styrene content may be blended.

Further, the copolymer of the present invention may be used also as a compatibilizing agent.

Now, a method for producing the ethylene-aromatic vinyl compound copolymer of the present invention will be described in detail.

A transition metal compound preferably used in the present invention is a transition metal compound of the following formula (3) or (4):

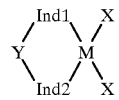
(3)

Here, each of Ind1 and Ind2 is an unsubstituted or substituted indenyl group and does not include an unsubstituted or substituted fluorenyl group, and Ind1 and Ind2 may be the same or different from each other, Y is carbon, silicon, germanium or boron having bonds to Ind1 and Ind2, and having suitable other substituents, such as a substituted alkylene group, a substituted silylene group, a substituted germilene group or a substituted boron, which is substituted by hydrogen, a halogen, a $C_{1-15}$ alkyl group, a $C_{6-10}$ aryl group, a $C_{7-40}$ alkylaryl group or a trialkylsilyl group, in which the substituents may be the same or different, or may have a cyclic structure such as a cyclohexylidene group.

Y is, for example, —$CH_2$—, —$CMe_2$—, —$CPh_2$—, —$SiH_2$—, —$SiMe_2$—, —$SiPh_2$—, a cyclohexylidene group or a cyclopentylidene group.

X is hydrogen, a halogen such as chlorine or bromine, an alkyl group such as a methyl group or an ethyl group, an aryl group such as a phenyl group, a silyl group such as a trimethysilyl group, or an alkoxy group such as a methoxy group, an ethoxy group or an isopropoxy group.

M is a Group IV metal such as Zr, Hf or Ti.

For each of Ind1 and Ind2, the unsubstituted indenyl group may, for example, be 1-indenyl, and the substituted indenyl group may, for example, be 2-alkyl-1-indenyl, 2,4-dialkyl-1-indenyl, 2,4,6-trialkyl-1-indenyl, 4,5-benzo-1-indenyl, 1-alkyl-4,5-benzo-1-indenyl, 2,5-dialkyl-1-indenyl, 2,5,6-trialkyl-1-indenyl, 2,4,5-trialkyl-1-indenyl, 2-alkyl-4-aryl-1-indenyl, 2,4-diaryl-1-indenyl, 2-aryl-1-indenyl, 2,6-dialkyl-4-aryl-1-indenyl, 2-alkyl-5-aryl-1-indenyl, 2-alkyl-5,6-diaryl-1-indenyl, 2-alkyl-4,5-diaryl-1-indenyl, or 2-alkyl-4,6 -diaryl-1-indenyl.

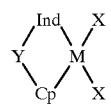
(4)

Here, Ind is an unsubstituted or substituted indenyl group and does not include an unsubstituted or substituted fluorenyl group.

Cp is an unsubstituted or substituted cyclopentadienyl group and does not include an unsubstituted or substituted indenyl group or fluorenyl group.

Y is carbon, silicon, germanium or boron having bonds to Ind and Cp, and having other suitable substituents, such as a substituted alkylene group, a substituted silylene group, a substituted germilene group or a substituted boron which is substituted by hydrogen, a halogen, a $C_{1-15}$ alkyl group, a $C_{6-10}$ aryl group, a $C_{7-40}$ alkylaryl group or a trialklysilyl group, wherein the substituents may be the same or different, or may have a cyclic structure such as a cyclohexylidene group.

Y is, for example, —$CH_2$—. —$CMe_2$—, —$CPh_2$—, —$SiH_2$—, —$SiMe_2$—, —$SiPh_2$—, a cyclohexylidene group or a cyclopentylidene group.

X is hydrogen, a halogen such as chlorine or bromine, an alkyl group such as a methyl group or an ethyl group, an aryl group such as a phenyl group, a silyl group such as a trimethylsilyl group, or an alkoxy group such as methoxy group, an ethoxy group or an isopropoxy group.

M is a Group IV metal, such as Zr, Hf or Ti.

For Ind, the above-mentioned specific examples useful for Ind1 or Ind2 of the above formula (3), can be used.

For Cp, the unsubstituted cyclopentadienyl group may, for example, be cyclopentadienyl, and the substituted cyclopentadienyl group may, for example, be 2-alkyl-4-aryl-1-cyclopentadienyl, 2-alkyl-4,5-diaryl-1-cyclopentadienyl, 2,5-dialkyl-4-aryl-1-cyclopentadienyl, 2,4-dialkyl-5-aryl-1-cyclopentadienyl, 2-aryl-1-cyclopentadienyl, 2-aryl-4-alkyl-1-cyclopentadienyl, 2-aryl-4,5-dialkyl-1-cyclopentadienyl, 2,3,4,5-tetraalkylcyclopentadienyl, 2,3,4,5-tetraarylcyclopentadienyl, 2-alkyl-1-cyclopentadienyl, 2,4-dialkyl-1-cyclopentadienyl, 2,4,5-trialkyl-1-cyclopentadienyl, 2-trialkylsilyl-1-cyclopentadienyl, 2-trialkylsilyl-4-alkyl-1-cyclopentadineyl, or 2-trialkylsilyl-4,5-dialkyl-1-cyclopentadienyl.

In the transition metal compounds of the above formulas (3) and (4), Y is a group having bonds to Ind1 and Ind2, or to Ind and Cp, i.e. a group of bridging them, and it plays a role of fixing the ligand structure and making the angle between metal M and the centroid of the cyclopentadienyl ring of the ligand, i.e. the so-called bite angle, in a case where no bridge group is present, smaller than the non-bridged state.

The following compounds may be mentioned as specific examples of such transition metal compounds.

Dialkylmethylenebis(1-indenyl)zirconium dichlorides, such as dimethylmethylenebis(1-indenyl)zirconium dichloride, diethylmethylenebis(1-indenyl)zirconium dichloride, di-n-propylmethylenebis(1-indenyl)zirconium dichloride, di-i-propylmethylenebis(1-indenyl)zirconium dichloride, methylethylmethylenebis(1-indenyl)zirconium dichloride, methyl n-propylmethylenebis(1-indenyl) zirconium dichloride, methyl i-propylmethylenebis(1-indenyl)zirconium dichloride, ethyl n-propylmethylenebis(1-indenyl)zirconium dichloride, and ethyl i-propylmethylenebis(1-indenyl)zirconium dichloride.

Cyclic alkylidenebis(1-indenyl)zirconium dichlorides, such as cyclohexylidenebis(1-indenyl)zirconium dichloride, and cyclopentylidenebis(1-indenyl)zirconium dichloride.

Diarylmethylenebis(1-indenyl)zirconium dichlorides, such as diphenylmethylenebis(1-indenyl)zirconium dichloride.

Dialkylmethylene (1-indenyl) (substituted-1-indenyl) zirconium dichlorides, such as dimethylmethylene (1-indenyl){(2-methyl-1-indenyl)} zirconium dichloride, dimethylmethylene (1-indenyl){(2-ethyl-1-indenyl)}zirconium dichloride, dimethylmethylene (1-indenyl){(2-phenyl-1-indenyl)}zirconium dichloride, dimethylmethylene (1-indenyl){(2-methyl-4-phenyl-1-indenyl)}zirconium dichloride, dimethylmethylene (1-indenyl){(4-phenyl-1-indenyl)}zirconium dichloride, dimethylmethylene (1-indenyl){(4-(1-naphthyl)-1-indenyl)}zirconium dichloride, dimethylmethylene (1-indenyl){(2,4-dimethyl-1-indenyl)}zirconium dichloride, dimethylmethylene (1-indenyl){(2-methyl-4-(1-naphthyl)-1-indenyl)} zirconium dichloride, and dimethylmethylene (1-indenyl){(2,4-diphenyl-1-indenyl)}zirconium dichloride.

Dialkylmethylene (substituted-1-indenyl)(substituted-1-indenyl)zirconium dichlorides, such as dimethylmethylenebis{(2-methyl-1-indenyl)}zirconium dichloride, dimethylmethylenebis{(2-ethyl-1-indenyl)} zirconium dichloride, dimethylmethylenebis{(2-phenyl-1-indenyl)}zirconium dichloride, dimethylmethylenebis{(2-methyl-4-phenyl-1-indenyl)}zirconium dichloride, dimethylmethylenebis{(2,4-dimethyl-1-indenyl)}zirconium dichloride, dimethylmethylenebis{(2-methyl-4-(1-naphthyl)-1-indenyl)}zirconium dichloride, dimethylmethylenebis{(2,4-diphenyl-1-indenyl)}zirconium dichloride, dimethylmethylenebis{(4-diphenyl-1-indenyl)}zirconium dichloride, dimethylmethylenebis{(4-(1-naphthyl)-1-indenyl)}zirconium dichloride, dimethylmethylene{(2-methyl-1-indenyl)}{(2-ethyl-1-indenyl)}zirconium dichloride, dimethylmethylene{(2-methyl-1-indenyl)}{(2-phenyl-1-indenyl)}zirconium dichloride, dimethylmethylene{(2-methyl-1-indenyl)}{(4-phenyl-1-indenyl)}zirconium dichloride, dimethylmethylene{(2-phenyl-1-indenyl)}{(4-phenyl-1-indenyl)}zirconium dichloride, dimethylmethylene{(4-methyl-1-indenyl)}{(4-phenyl-1-indenyl)}zirconium dichloride, and dimethylmethylene{(4-phenyl-1-indenyl)}{(4-(1-naphthyl)-1-indenyl)}zirconium dichloride.

Dialkylsilylene bis(1-indenyl)zirconium dichlorides, such as dimethylsilylene bis(1-indenyl)zirconium dichloride, diethylsilylene bis(1-indenyl)zirconium dichloride, di-n-propylsilylene bis(1-indenyl)zirconium dichloride, di-i-propylsilylene bis(1-indenyl)zirconium dichloride, methylethylsilylene bis(1-indenyl)zirconium dichloride, methyl n-propylsilylene bis(1-indenyl)zirconium dichloride, methyl i-propylsilylene bis(1-indenyl)zirconium dichloride, ethyl n-propylsilylene bis(1-indenyl)zirconium chloride, and ethyl i-propylsilylene bis(1-indenyl)zirconium dichloride.

Diarylsilylene bis(1-indenyl)zirconium dichlorides, such as diphenylsilylene bis(1-indenyl)zirconium dichloride.

Dialkylsilylene (1-indenyl)(substituted-1-indenyl) zirconium dichlorides, such as dimethylsilylene (1-indenyl){(2-methyl-1-indenyl)}zirconium dichloride, dimethylsilylene(1-indenyl){(2-ethyl-1-indenyl)}zirconium dichloride, dimethylsilylene(1-indenyl){(2-phenyl-1-indenyl)}zirconium dichloride, dimethylsilylene(1-indenyl){(2-methyl-4-phenyl-1-indenyl)}zirconium dichloride, dimethylsilylene(1-indenyl){(4-phenyl-1-indenyl)}zirconium dichloride, dimethylsilylene(1-indenyl){(4-(1-naphthyl)-1-indenyl)}zirconium dichloride, dimethylsilylene(1-indenyl){(2,4-dimethyl-1-indenyl)}zirconium dichloride, dimethylsilylene(1-indenyl){(2-methyl-4-(1-naphthyl)-1-indenyl)}zirconium dichloride, and dimethylsilylene(1-indenyl){(2,4-diphenyl-1-indenyl)}zirconium dichloride.

Dialkylsilylene (substituted-1-indenyl)(substituted-1-indenyl)zirconium dichlorides, such as dimethylsilylene bis{(2-methyl-1-indenyl)}zirconium dichloride, dimethylsilylene bis{(2-ethyl-1-indenyl)}zirconium dichloride, dimethylsilylene bis{(2-phenyl-1-indenyl)}zirconium dichloride, dimethylsilylene bis({(2-methyl-4-phenyl-1-indenyl)}zirconium dichloride, dimethylsilylene bis{(2,4-dimethyl-1-indenyl)}zirconium dichloride, dimethylsilylene bis{(2-methyl-4-(1-naphthyl)-1-indenyl)}zirconium dichloride, dimethylsilylene bis{(2,4-diphenyl-1-indenyl)} zirconium dichloride, dimethylsilylene bis{(4-diphenyl-1-indenyl)}zirconium dichloride, dimethylsilylene bis{(4-(1-naphthyl)-1-indenyl)}zirconium dichloride, dimethylsilylene{(2-methyl-1-indenyl)}{(2-ethyl-1-indenyl)}zirconium dichloride, dimethylsilylene{(2-methyl-1-indenyl)}{(2-phenyl-1-indenyl)}zirconium dichloride, dimethylsilylene{(2-methyl-1-indenyl)}{(4-phenyl-1-indenyl)}zirconium dichloride, dimethylsilylene{(2-phenyl-1-indenyl)}{(4-phenyl-1-indenyl)}zirconium dichloride, dimethylsilylene{(4-methyl-1-indenyl)}{(4-phenyl-1-indenyl)}zirconium dichloride, and dimethylsilylene{(4-phenyl-1-indenyl)}{(4-(1-naphtyl)-1-indenyl)}zirconium dichloride.

Dialkylmethylene(1-indenyl)(cyclopentadienyl) zirconium dichlorides, such as dimethylmethylene(1-indenyl) (cyclopentadienyl)zirconium dichloride.

Cyclic alkylidene(1-indenyl)(cyclopentadienyl) zirconium dichlorides, such as cyclohexylidene(1-indenyl) (cyclopentadienyl)zirconium dichloride.

Diarylmethylene(1-indenyl)(cyclopentadienyl)zirconium dichlorides, such as diphenylmethylene(1-indenyl) (cyclopentadienyl)zirconium dichloride.

Dialkylmethylene (substituted-1-indenyl) (cyclopentadienyl)zirconium dichlorides, such as dimethylmethylene{(2-methyl-1-indenyl)} (cyclopentadienyl)zirconium dichloride, and dimethylmethylene{(4-methyl-1-indenyl)} (cyclopentadienyl)zirconium dichloride.

Dialkylmethylene (1-indenyl)(substituted-cyclopentadienyl)zirconium dichlorides, such as dimethylmethylene{(1-indenyl)}(2-methyl-1-cyclopentadienyl)zirconium dichloride, and dimethylmethylene{(1-indenyl)}(2,4-dimethyl-1-cyclopentadienyl)zirconium dichloride.

In the foregoing, Zr complexes were exemplified. However, with respect to Ti complexes and Hf complexes, compounds similar to the above are preferably employed. The foregoing complexes are used as racemic modifications. However, D-isomers or L-isomers may also be employed.

In the present invention, an organoaluminum compound and/or a boron compound is used as a cocatalyst together with the above transition metal compound.

As the organoaluminum compound to be used as a cocatalyst, an aluminoxane (or an alumoxane) is preferred. The aluminoxane is a cyclic or chain compound of the following formula (5) or (6):

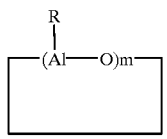

(5)

In the above formula (5), R is a $C_{1-5}$ alkyl group, a $C_{6-10}$ aryl group or hydrogen, and m is an integer of from 2 to 100 wherein each R may be the same of different from one another.

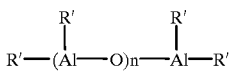

(6)

In the above formula (6), each R' is a $C_{1-5}$ alkyl group, a $C_{6-10}$ aryl group or hydrogen, and n is an integer of from 2 to 100, wherein each R' may be the same or different from one another.

As the aluminoxane, methylalumoxane, ethylalumoxane or triisobutylalumoxane is preferably employed. Particularly preferred is methylalumoxane. If necessary, a mixture of these different types of alumoxanes may be employed. Further, such an alumoxane may be used in combination with an alkylaluminum such as trimethylaluminum, triethylaluminum, triisobutylaluminum or a halogen-containing alkylaluminun such as dimethylaluminum chloride.

The boron compound to be used as a cocatalyst may, for example, be N,N-dimethylanilinium tetra (pentafluorophenyl) borate, trityltetra(pentafluorophenyl) borate, lithium tetra(pentafluorophenyl) borate or tri (pentafluorophenyl) borane.

Such a boron compound may be used in combination with the above-mentioned organoaluminum compound.

Especially when a boron compound is used as a cocatalyst, it is effective to add an alkylaluminum compound such as triisobutylaluminum to remove impurities, such as water, contained in the polymerization system, which adversely affect the polymerization.

By the method of the present invention, the ethylene-styrene copolymer can be produced with high catalytic activities and high productivity per unit catalyst, which has not be attained heretofore.

For the production of the copolymer of the present invention, ethylene, the above-mentioned aromatic vinyl compound, the transition metal compound as a metal complex and the cocatalyst, are contacted. It is possible to employ a method for carrying out the polymerization in a liquid monomer without using any solvent, or a method of using a single solvent or a mixed solvent selected from saturated aliphatic or aromatic hydrocarbons or halogenated hydrocarbons, such as pentane, hexane, heptane, cyclohexane, benzene, toluene, xylene, chlorobenzene, chlorotoluene, methylene chloride or chloroform. If necessary, batch polymerization, continuous polymerization, stepwise polymerization or preliminary polymerization may be employed.

The polymerization temperature is usually from -78° C. to 200° C., preferably from 0° C. to 160° C.

A polymerization temperature of -78° C. or lower is industrially disadvantageous and a temperature higher than 200° C. is not suitable, since decomposition of the metal complex will take place.

When an organoaluminum compound is used as a cocatalyst, it is used relative to the metal of the complex in an atomic ratio of aluminum/complex metal of from 0.1 to 100,000, preferably from 10 to 10,000. If this atomic ratio is smaller than 0.1, it tends to be difficult to effectively activate the metal complex, and if it exceeds 100,000, such is economically disadvantageous.

When a boron compound is used as a cocatalyst, it is employed in an atomic ratio of boron/complex metal of from 0.01 to 100, preferably from 0.1 to 10, particularly preferably 1. If this atomic ratio is less than 0.01, it tends to be difficult to effectively activate the metal complex, and if it exceeds 100, such is economically disadvantageous.

The metal complex and the cocatalyst may be mixed or formulated outside the polymerization tank or may be mixed in the tank during the polymerization.

To the copolymer of the present invention, additives or adjuvants which are commonly used for polymers, may be incorporated within a range not to adversely affect the effects of the present invention. Preferred additives or adjuvants include, for example, an antioxidant, a lubricant, a plasticizer, an ultraviolet ray absorber, a stabilizer, a pigment, a colorant, a filler and a blowing agent.

Now, the present invention will be described in further detail with reference to Examples. However, it should be understood that the present invention is by no means restricted to such specific Examples.

In the following description, Me represents a methyl group, Ind a 1-indenyl group, Cp a cyclopentadienyl group, Flu a 9-fluorenyl group, Ph a phenyl group, and tBu a tertiary butyl group.

The analyses of copolymers obtained in Examples and Comparative Examples were carried out as follows.

The 13C-NMR spectrum was measured using TMS as standard, by using a chloroform-d solvent or a 1,1,2,2-tetrachloroethane-d2 solvent, by JNM GX-270 or α-500, manufactured by Nippon Denshi Kabushiki Kaisha.

The 13C-NMR spectrum measurement for quantitative analysis of peak areas, was carried out by a proton gate decoupling method having NOE erased, by using pulses with a pulse width of 45° and a repeating time of 5 seconds as standard.

When the measurement was carried out under the same conditions except that the repeating time was changed to 1.5 seconds, the measured values of peak areas of the copolymer agreed to the values obtained in the case where the repeating time was 5 seconds, within measurement error.

The styrene content in the copolymer was determined by 1H-NMR. JNM GX-270 or α-500, manufactured by Nippon Denshi Kabushiki Kaisha was used as the apparatus. The determination was carried out by comparing the intensity of the proton peak attributable to a phenyl group (6.5 to 7.5 ppm) and the proton peak attributable to an alkyl group (0.8 to 3 ppm), measured by using TMS as standard and chloroform-d or heavy 1,1,2,2-tetrachloroethane-d2 as a solvent.

The molecular weights in Examples are obtained by GPC (gel permeation chromatography) as calculated as standard polystyrene.

A copolymer soluble in THF at room temperature, was measured by means of HLC-8020, manufactured by Tosoh Corporation using THF as a solvent. A copolymer insoluble in THF at room temperature, was measured by means of GPC-7100, manufactured by Senshu Kagaku K.K. using 1,2,4-trichlorobenzene as a solvent.

The DSC measurement was carried out by using DSC 200, manufactured by Seiko Denshi K.K. in a nitrogen stream at a temperature raising rate of 10° C./min.

The X-ray diffraction was measured by means of MXP-18 model high power X-ray diffraction apparatus, source Cu rotating anode (wavelength: 1.5405 Å), manufactured by Mac Science Company.

TEST EXAMPLES

Preparation of Transition Metal Compounds

Rac-dimethylmethylenebis(1-indenyl)zirconium dichloride of the following formula (another name: rac-isopropylidenebis(1-indenyl)zirconium dichloride, hereinafter referred to as rac{Ind—C(Me)$_2$—Ind}ZrCl$_2$) was prepared by the following two methods.

The first method is a synthesis as disclosed in New J. Chem., 14, 499 (1990) or JP-A-3-100004. The second method is the following method.

Ligand 2,2-isopropylidene bis(1-indene) was prepared by the first method.

In an argon atmosphere, 5 mmol of the ligand and 5 mmol of Zr(NMe$_2$)$_4$ were dissolved in 30 ml of toluene, and the solution was heated and stirred at 140° C. for 15 hours under reflux. The solvent was distilled off under reduced pressure, and 80 ml of dichloromethane was added. Then, 9 mmol of Me$_2$NH.HCl was added at −78° C., and the mixture was stirred for one hour. The solvent was distilled off under reduced pressure, and then the residue was washed with pentane. The residual solid was extracted with 200 ml of dichloromethane. After filtration, the liquid was concentrated under reduced pressure to obtain reddish orange crystals. The yield was 20%.

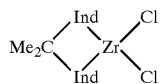

In the 1H-NMR spectrum measurement, the same complex obtained by either method shows peaks at 6.92 to 7.80 ppm (m, 8H), 6.70 ppm (dd, 2H), 6.15 ppm (d, 2H) and 2.37 ppm (s, 6H). In the following Examples, the complex obtained by the first method was used in Examples 1 to 7, and the complex obtained in the second method was used in Examples 8 to 11. Further, styrene and toluene used, were dehydrated ones.

Preparation of Copolymers

Example 1

Into an autoclave having a capacity of 120 ml and equipped with a stirrer, which was substituted by nitrogen and then by ethylene, 10 ml of styrene and 8.4 mmol, based on Al atom, of methylalumoxane (MMAO-3A, manufactured by Tosoh-Akuzo K.K.) were charged. While supplying ethylene under an atmospheric pressure, 26 ml of a toluene solution containing 8.4 μmol of the above-mentioned rac{Ind—C(Me)$_2$—Ind}ZrCl$_2$, was added by a syringe. Then, the pressure was immediately raised to 5 kg/cm$^2$G by ethylene, and the temperature was raised to 50° C. in about one minute. Thereafter, polymerization was carried out at 50° C. for one hour while maintaining the ethylene pressure at 5 kg/cm$^2$G. After completion of the polymerization, ethylene was slowly released, and the liquid was put into a large excess amount of a mixed solution of dilute hydrochloric acid/methanol, whereupon a polymer was recovered. The recovered product was dried at 60° C. for 10 hours under reduced pressure to obtain 7.5 g of the polymer.

Example 2

Into an autoclave having a capacity of 300 ml and equipped with a stirrer, which was substituted by nitrogen and then by ethylene, 20 ml of styrene, 60 ml of toluene and 8.4 mmol, based on Al atom, of methylalumoxane (MMOA-3A, manufactured by Tosoh Akzo K.K.) were charged. Ethylene was introduced at about 10° C. to raise the pressure to 9 kg/cm$^2$G, whereupon a catalyst solution having 8.4 μmol of the above-mentioned rac{Ind—C(Me)$_2$—Ind}ZrCl$_2$ dissolved in 40 ml of toluene, was introduced into the autoclave from a pressure resistant tank provided on an upper portion of the polymerization reactor. Thereafter, polymerization was carried out for one hour while maintaining the ethylene pressure at 10 kg/cm$^2$G. During the polymerization, the temperature of the reaction solution increased to the maximum of 52° C. due to heat generation. After completion of the polymerization, ethylene was slowly released, and post treatment was carried out in the same manner as in Example 1 to obtain 18.2 g of a polymer.

Example 3

Polymerization and post treatment were carried out in the same manner as in Example 2 except that styrene was changed to 2 ml, and toluene was changed to 78 ml. The liquid temperature increased to the maximum of 26° C. due to the polymerization heat. As a result, 3.1 g of a polymer was obtained.

Example 4

Polymerization and post treatment were carried out in the same manner as in Example 2 except that styrene was changed to 60 ml, toluene was changed to 20 ml, the ethylene pressure was changed to 1 kg/cm²G, and the autoclave was heated to maintain the reaction solution at 50° C. during the polymerization, whereby 3.4 g of a polymer was obtained.

Example 5

Polymerization and post treatment were carried out in the same manner as in Example 4 except that the polymerization temperature was changed to 12° C., and the ethylene pressure during the polymerization was changed to 0.5 kg/cm²G, whereby 3.0 g of a polymer was obtained.

Example 6

Into an autoclave having a capacity of 1 l and equipped with a stirrer, which was substituted by nitrogen and then by ethylene, 80 ml of styrene, 360 ml of toluene and 8.4 mmol, based on Al atom, of methylalumoxane (MMAO-3A, manufactured by Tosoh-Akuzo K.K.) were charged. Ethylene was introduced at about 10° C. to raise the pressure to 9 kg/cm²G, whereupon a catalyst solution having 8.4 μmol of the above-mentioned rac{Ind—C(Me)₂—Ind}ZrCl₂ dissolved in 40 ml of toluene, was introduced into the autoclave from a pressure resistant tank provided at an upper portion of the polymerization reactor. Thereafter, polymerization was carried out for one hour while maintaining the ethylene pressure at 10 kg/cm²G. During the polymerization, the temperature of the reaction solution increased to the maximum of 70° C. due to heat generation. After completion of the polymerization, ethylene was slowly released, and post treatment was carried out in the same manner as in Example 1 to recover 97 g of a polymer.

Example 7

Polymerization and post treatment were carried out in the same manner as in Example 6 except that the amount of the complex used, was changed to 2.1 μmol, and the temperature at the time of introducing ethylene was changed to 17° C. During the polymerization, the temperature of the reaction solution increased to the maximum of 93° C. due to heat generation. 58 g of a polymer was obtained.

Example 8

Polymerization was carried out by using an autoclave having a capacity of 10 l and equipped with a stirrer and a jacket for heating and cooling.

4,000 ml of toluene and 800 ml of styrene were charged, and the internal temperature was raised to 50° C. and stirring was initiated. The interior of the system was purged by bubbling about 100 l of dry nitrogen, and 8.4 mmol of triisobutylaluminum and 84 mmol, based on Al atom, of methylalumoxane (MMAO-3A, manufactured by Tosoh-Akuzo K.K.) were added thereto. Immediately, ethylene was introduced, and the pressure was stabilized at 10 kg/cm²G, whereupon about 50 ml of a toluene solution containing 8.4 μmol of catalyst rac{Ind—C(Me)₂—Ind}ZrCl₂ and 0.84 mmol of triisobutylaluminum, was added to the autoclave from a catalyst tank provided on the autoclave. Polymerization was carried out for 3 hours while maintaining the internal temperature at 50° C. and the ethylene pressure at 10 kg/cm²G. After completion of the polymerization, the obtained polymerization solution was gradually put into vigorously stirred excess methanol to let the formed polymer precipitate. The product was dried under reduced pressure at 60° C. until a weight change was no longer observed, whereby 816 g of a polymer was obtained.

Example 9

Polymerization and post treatment were carried out in the same manner as in Example 8 except that the charged amounts into the autoclave were changed to 1,800 ml of styrene and 3,000 ml of toluene, the ethylene pressure was changed to 5 Kg/cm²G, the amount of the catalyst used, was changed to 21 μmol, and the polymerization time was changed to 4.25 hours. As a result, 800 g of a polymer was obtained.

Example 10

Polymerization and post treatment were carried out in the same manner as in Example 8 except that the charged amounts into the autoclave were changed to 4,000 ml of styrene and 800 ml of toluene, the ethylene pressure was changed to 5 Kg/cm²G, the amount of the catalyst used, was changed to 84 μmol, and the polymerization time was changed to 4 hours. As a result, 1,660 g of a polymer was obtained.

Example 11

Polymerization and post treatment were carried out in the same manner as in Example 8 except that the charged amounts into the autoclave were changed to 4,000 ml of styrene and 800 ml of toluene, the ethylene pressure was changed to 1 Kg/cm²G, the amount of the catalyst used, was changed to 84 μmol, and the polymerization time was changed to 7 hours. As a result, 1,220 g of a polymer was obtained.

Preparation of Transition Metal Compounds and Copolymers

Example 12

Rac-isopropylidene (1-indenyl)(cyclopentadienyl) zirconium dichloride of the following formula (hereinafter referred to as rac-{Ind—C(Me)₂—Cp}ZrCl₂) was prepared with reference to New J. Chem., 14, 499 (1990).

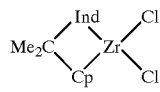

Polymerization and post treatment were carried out in the same manner as in Example 1 except that 16 ml of a toluene solution containing 8.4 μmol of the above-mentioned rac-{Ind—C(Me)₂—Cp}ZrCl₂ as a transition metal compound, was used. As a result, 8.2 g of a polymer was obtained.

COMPARATIVE EXAMPLE 1

Diphenylmethylene (fluorenyl)(cyclopentadienyl) zirconium dichloride of the following formula (hereinafter referred to as {Flu-CPh₂-Cp}ZrCl₂), as an EWEN type Zr complex, was prepared with reference to J. Am. Chem. Soc., 110, 6255 (1988).

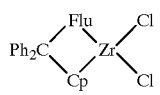

Into an autoclave having an capacity of 120 ml and equipped with a stirrer, which was substituted by nitrogen and then by ethylene, 20 ml of styrene and 4.6 mmol of MAO were charged and heated to 40° C. While maintaining the ethylene pressure at an atmospheric pressure, 46 μmol of the above-mentioned {Flu-CPh$_2$-Cp}ZrCl$_2$ dissolved in 20 ml of toluene, was added, and polymerization was carried out for one hour. During the polymerization, the temperature was maintained at 40° C., and the pressure was maintained at atmospheric pressure (0 Kg/cm$^2$G). After the polymerization, post treatment was carried out in the same manner as in Example 1 to obtain 2.2 g of a polymer.

COMPARATIVE EXAMPLE 2

Polymerization and post treatment were carried out in the same manner as in Example 8 except that the charged amounts into the autoclave were changed to 4,000 ml of styrene and 800 ml of toluene, the ethylene pressure was changed to 3 Kg/cm$^2$G, 168 μmol of {Flu-CPh$_2$-Cp}ZrCl$_2$ was used as the catalyst, the amount of MAO was changed to 168 mmol based on Al, and the polymerization time was changed to 4 hours. As a result, 286 g of a polymer was obtained.

COMPARATIVE EXAMPLE 3

A CGCT (constrained geometrical structure) type Ti complex (tertiary butylamide)dimethyl(tetramethyl-η5-cyclopentadienyl)silane titanium dichloride of the following formula (hereinafter referred to as {CpMe$_4$—SiMe$_2$—NtBu}TiCl$_2$) was prepared with reference to JP-A-7-053618.

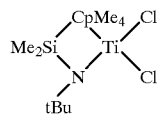

Polymerization was carried out in the same manner as in Example 2 except that the above-mentioned {CpMe$_4$—SiMe$_2$—NtBu}TiCl$_2$ was used as a transition metal compound, whereby 11.5 g of a white polymer was obtained.

COMPARATIVE EXAMPLE 4

Polymerization and post treatment were carried out in the same manner as in Example 1 except that 16 ml of a toluene solution containing 23 μmol of the above-mentioned {CpMe$_4$—SiMe$_2$—NtBu}TiCl$_2$, was used, and 23 mmol of MAO was used. As a result, 1.6 g of a polymer was obtained.

As a result of the analysis, the obtained polymer was found to be a mixture of polyethylene, syndiotactic polystyrene and a copolymer. Therefore, it was fractionated into a boiling THF soluble fraction and insoluble fraction by means of a Soxhlet extractor.

COMPARATIVE EXAMPLE 5

Polymerization and post treatment were carried out in the same manner as in Example 8 except that the charged amounts into the autoclave were changed to 800 ml of styrene and 4,000 ml of toluene, the polymerization temperature was changed to 90° C., 84 μmol of {CpMe$_4$—SiMe$_2$—NtBu}TiCl$_2$ was used as the catalyst, and the polymerization time was changed to one hour.

Consumption of ethylene was monitored, whereby it was found that polymerization substantially completed in one hour. As a result, 350 g of a polymer was obtained.

COMPARATIVE EXAMPLE 6

Polymerization and post treatment were carried out in the same manner as in Example 8 except that 21 μmol of {CpMe$_4$—SiMe$_2$—NtBu}TiCl$_2$ was used as the catalyst, the charged amounts into the autoclave were changed to 1,500 ml of styrene and 3,300 ml of toluene, the polymerization temperature was changed to 50° C., and the polymerization time was changed to 2.5 hours.

Consumption of ethylene was monitored, whereby it was found that polymerization substantially completed in 2.5 hours. As a result, 550 g of a polymer was obtained.

COMPARATIVE EXAMPLE 7

Polymerization and post treatment were carried out in the same manner as in Example 1 except that 50 μmol of CpTiCl$_3$ was used as the catalyst, MMAO was changed to 5 mmol, the charged amounts into the autoclave were changed to 20 ml of styrene and 20 ml of toluene, the polymerization temperature was changed to 40° C., and the ethylene pressure was changed to 1 Kg/cm$^2$G. As a result, 0.5 g of a polymer was obtained. As a result of the 13C-NMR and DSC analyses, the product was a mixture of mainly syndiotactic polystyrene and polyethylene. By 13C-NMR, no peak was observed at 25.1 to 25.5 ppm.

The polymerization conditions and the polymerization results in the respective Examples and Comparative Examples are shown in Table 1.

TABLE 1

|  | Amount of catalyst (μmol) | Amount of toluene (ml) | Amount of styrene (ml) | Ethylene pressure (kg/cm$^2$G) | Polymerization temp. (° C.) | Polymerization time (hr) | Amount obtained (g) | Productivity (g/mol · catalyst)/10$^6$ | St content (mol %) |
|---|---|---|---|---|---|---|---|---|---|
| Example 1 | 8.4 | 26 | 10 | 5 | 50 | 1 | 7.5 | 0.89 | 39.1 |
| Example 2 | 8.4 | 60 | 20 | 10 | 10–52 | 1 | 18.2 | 2.2 | 31.7 |
| Example 3 | 8.4 | 78 | 2 | 10 | 10–26 | 1 | 3.1 | 0.37 | 7.2 |
| Example 4 | 8.4 | 20 | 60 | 1 | 50 | 1 | 3.4 | 0.40 | 49.4 |
| Example 5 | 8.4 | 20 | 60 | 0.5 | 12 | 1 | 3.0 | 0.36 | 52.0 |
| Example 6 | 8.4 | 360 | 80 | 10 | 10–70 | 1 | 97 | 12 | 17.7 |
| Example 7 | 2.1 | 360 | 80 | 10 | 16–93 | 1 | 58 | 28 | 7.3 |
| Example 8 | 8.4 | 4000 | 800 | 10 | 50 | 3 | 816 | 97 | 12.8 |
| Example 9 | 21 | 3000 | 1800 | 5 | 50 | 4.25 | 800 | 38 | 28.0 |
| Example 10 | 84 | 800 | 4000 | 5 | 50 | 4 | 1660 | 20 | 43.5 |
| Example 11 | 84 | 800 | 4000 | 1 | 50 | 7 | 1220 | 15 | 49.3 |
| Example 12 | 8.4 | 16 | 10 | 5 | 50 | 1 | 8.2 | 1.0 | 37.9 |

TABLE 1-continued

|  | Amount of catalyst ($\mu$mol) | Amount of toluene (ml) | Amount of styrene (ml) | Ethylene pressure (kg/cm$^2$G) | Polymerization temp. (° C.) | Polymerization time (hr) | Amount obtained (g) | Productivity (g/mol · catalyst)/10$^6$ | St content (mol %) |
|---|---|---|---|---|---|---|---|---|---|
| Comparative Example 1 | 46 | 20 | 20 | 0 (atmospheric pressure) | 40 | 1 | 2.2 | 0.05 | 43.0 |
| Comparative Example 2 | 164 | 4000 | 800 | 3 | 50 | 4 | 286 | 1.7 | 21.1 |
| Comparative Example 3 | 8.4 | 60 | 20 | 10 | 18–57 | 1 | 11.5 | 1.4 | 19.6 |
| Comparative Example 4 | 23 | 16 | 10 | 5 | 50 | 1 | 1.6 | 0.07 | — |
| (THF insoluble fraction) |  |  |  |  |  |  | about 0.3 | — | — |
| (THF soluble fraction) |  |  |  |  |  |  | about 1.3 | — | 45.0 |
| Comparative Example 5 | 84 | 4000 | 800 | 10 | 90 | 1 | 350 | 4.2 | 7.8 |
| Comparative Example 6 | 21 | 3300 | 1500 | 10 | 50 | 1 | 550 | 26.2 | 13.0 |

1H-NMR spectrum of the polymer obtained in Example 10 was shown in FIG. 1.

The 13C-NMR measurement was carried out by using TMS (tetramethylsilane) as standard and chloroform-d as a solvent. These polymers are substantially soluble in chloroform-d at room temperature. The copolymer of the present invention is substantially soluble in chloroform at room temperature when the styrene content is substantially at least 20 mol %.

Further, using 1,1,2,2-tetrachloroethane-d2 as a solvent, the 13C-NMR was measured under heating to about 100° C. In this case, the center peak of the triplet of 1,1,2,2-tetrachloroethane-d2 was used as standard, and on the basis that the shift value of this peak was 73.89 ppm, shift values of peaks of the copolymer were determined.

In the methine and methylene carbon regions, peaks attributable to the following, are shown. Symbols a to m are symbols representing carbon atoms shown in the chemical structures of the formulas (10) to (14).

Attribution of peaks was made by a literature (Macromolecules 13, 849, (1980)) and by 13C-NMR (two dimensional Inadequate method, DEPT method).

In a case where chloroform-d was used as a solvent, and TMS was used as standard:

25.2 to 25.3 ppm (c)
36.6 to 36.7 ppm (b)
45.4 to 45.5 ppm (a)
27.5 to 27.7 ppm (f)
29.6 to 29.8 ppm (g)
36.7 to 37.0 ppm (e)
45.7 to 46.6 ppm (d, h)
34.8 to 35.0 ppm (i)
43.0 ppm (j)
44.0 to 46.0 ppm (k)
36.0 ppm (l)
25.0 ppm (m)

In a case where the center peak (73.89 ppm) of the triplet of 1,1,2,2-tetrachloroethane-d2 was used as standard:

25.1 to 25.2 ppm (c)
36.4 to 36.5 ppm (b)
45.0 to 45.3 ppm (a)
27.2 to 27.6 ppm (f)
29.4 to 29.9 ppm (g)
36.5 to 36.8 ppm (e)
45.4 to 46.1 ppm (d, h)
34.5 to 34.9 ppm (i)
42.5 to 43.0 ppm (j)
44.0 to 46.0 ppm (k)
35.6 to 36.1 ppm (l)
24.8 to 24.9 ppm (m)

The above positions of peaks may shift more or less depending upon the measuring conditions, the solvent used, etc.

$$\begin{array}{c} a \quad b \quad c \quad b \\ -(CH-CH_2-CH_2-CH_2)_{xa}- \\ | \\ Ph \end{array} \tag{1'}$$

wherein xa is an integer of at least 2 representing the number of repeating units.

Namely, $$\begin{array}{c} \quad\quad\quad\quad\quad a \quad b \quad c \quad b \quad a \\ -CH_2-CH_2-CH_2-CH-CH_2-CH_2-CH_2-CH-CH_2-CH_2-CH_2- \\ \quad\quad\quad\quad\quad\quad\quad\quad | \quad\quad\quad\quad\quad\quad\quad\quad | \\ \quad\quad\quad\quad\quad\quad\quad\quad Ph \quad\quad\quad\quad\quad\quad\quad\quad Ph \end{array} \tag{10}$$

$$\begin{array}{c} \quad\quad\quad\quad\quad a \quad b \quad c \quad b \quad a \quad\quad\quad\quad f \quad e \quad d \\ -CH_2-CH_2-CH_2-CH-CH_2-CH_2-CH_2-(CH_2-CH_2)_{y-2}-CH_2-CH_2-CH-CH_2-CH_2-CH_2- \\ \quad\quad\quad\quad\quad\quad\quad\quad | \quad\quad\quad\quad\quad\quad\quad\quad\quad\quad\quad\quad\quad\quad\quad\quad\quad\quad\quad\quad | \\ \quad\quad\quad\quad\quad\quad\quad\quad Ph \quad\quad\quad\quad\quad\quad\quad\quad\quad\quad\quad\quad\quad\quad\quad\quad\quad\quad\quad\quad Ph \end{array} \tag{11}$$

wherein y is an integer of at least 2 representing the number of repeating units.

(12)

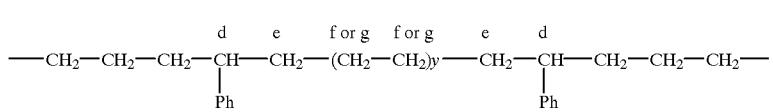

wherein y is an integer of at least 1.

(13)

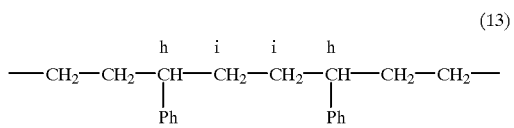

(14)

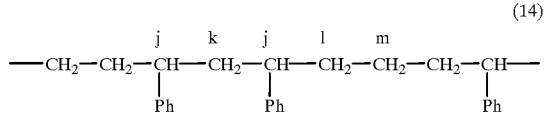

Figure 42A:
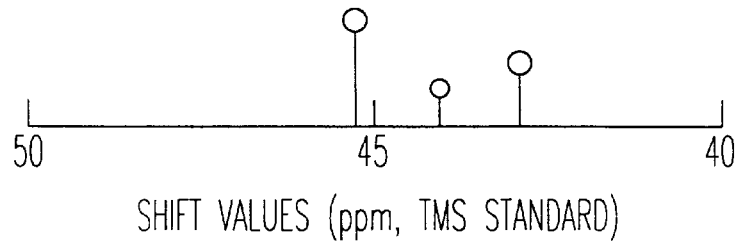
FIG. 42 shows the peak prediction results by 13C-NMR data base STN SPECINFO.
Figure 42B:
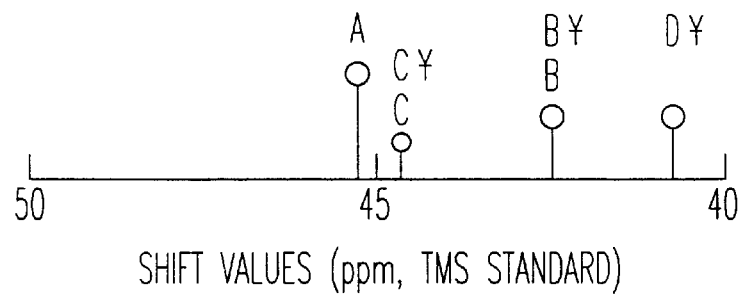

Attribution of peaks j to m was made by literatures such as Stud. Surf. Sci. Catal., 517, 1990, J. Appl. Polymer Sci., 53, 1453 (1994), J. C. Randall, J. Polymer Phys. Ed., 13, 901 (1975), G. J. Ray et al., Macromolecules, 10, 773 (1977), EP-416815, JP-A-4-130114, and by the peak shift prediction (FIGS. 41 and 42) by the 13C-NMR data base STN (Specinfo).

As a result, the peak in the vicinity of 43.0 ppm observed with the copolymer of the present invention wherein the St content is substantially at least 20 mol % when measured by using a chloroform-d solvent, is attributable to methine carbon j of a structure in which two styrene units are chained, and the peak in the vicinity of 36.0 ppm is attributable to methylene carbon 1 and the peak in the vicinity of 25.0 ppm is attributable to methylene carbon m. Likewise, k is attributable to any one of peaks within a range of from 44 to 46 ppm.

Figure 43:
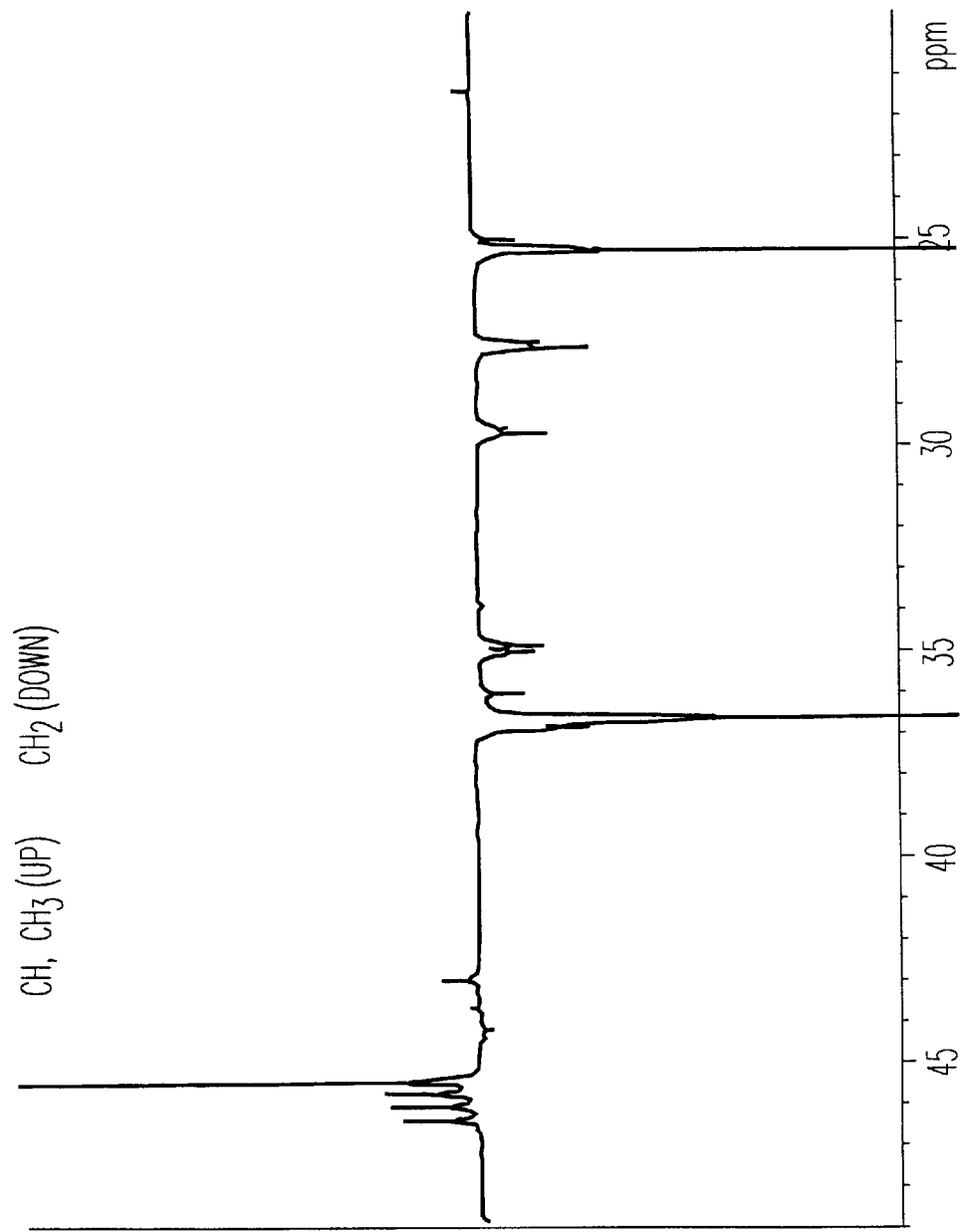
FIG. 43 is a spectrum of the copolymer obtained in Example 11, measured by a 13C-NMR DEPT method.

The results (FIG. 43) of measurement of the copolymer of the present invention by a 13C-NMR DEPT method show that the peak in the vicinity of 43.0 ppm is attributable to methine carbon, and the peaks in the vicinity of 36.0 and 25.0 ppm, are attributable to methylene carbon. This supports the above-mentioned results.

The shift values of Examples and Comparative Examples measured by 13C-NMR using chloroform-d as a solvent and TMS as standard, are shown in Table 2. The literature values in Table 2 were taken from Macromolecules, 13, 849 (1980).

The shift values of Examples and Comparative Examples measured by 13C-NMR using 1,1,2,2-tetrachloroethane-d2 as a solvent, are shown in Tables 3 and 4. The peak of the isotactic diad structure (m structure) observed at 25.26 to 25.30 ppm when chloroform-d was used as a solvent, is observed at 25.11 to 25.22 ppm when 1,1,2,2-tetrachloroethane-d2 is used as a solvent.

Except for Example 12, with copolymers obtained in Examples of the present invention, a peak attributable to the syndiotactic diad structure (r structure) was not substantially observed.

Typical 13C-NMR charts are shown in FIGS. 2 to 40.

The positions of peaks by the 13C-NMR measurement may shift more or less depending upon the measuring conditions, the solvent used, the standard peaks, etc.

Further, the positions of peaks are influenced more or less by the adjacent structures on both sides of the structure shown in the formulas (10) to (14). For example, in the case of a styrene-ethylene alternating structure, a certain peak shift, or a microstructure or shoulder of the peak, will form by a long distance effect, depending upon whether or not the adjacent structures are also similar alternating structures, styrene chain structures, ethylene chain structures, or head to head or tail to tail bonds.

TABLE 2

Peak shift values (ppm) measured by 13C-NMR using TMS as standard by using chloroform-d as a solvent

| Attribution | | Literature values *1 | Example 1 | Example 2 | Example 4 | Example 5 | Example 12 | Comparative Example 1 | Comparative Example 4 THF soluble fraction |
|---|---|---|---|---|---|---|---|---|---|
| c | m | 25.2 | 25.26 | 25.26 | 25.26 | 25.26 | 25.30 | 25.30 | 25.25 |
|   | r | 25.4 | — | — | (25.47)*2 | — | 25.47 | 25.47 | 25.46 |
| a | mm | 45.4 | 45.44 | 45.44 | 45.44 | 45.45 | 45.45 | 45.45 | 45.43 |
|   | mr | 45.5 | — | — | — | — | 45.55 | 45.56 | 45.55 |
|   | rr | 45.6 | — | — | — | — | — | 45.78 | 45.68 |
| b | m(m) | 36.6 | 36.62 | 36.62 | 36.62 | 36.61 | 36.64 | 36.63 | 36.64 |
|   | m(r) | 36.7 | — | Not analyzable | — | — | 36.70 | 36.74 | 36.73 |
|   | r(m) | 36.9 | — | as peaks | — | — | — | 36.95 | 36.94 |
|   | r(r) | 37.0 | — | overlapped with Et block peaks. | — | — | — | 37.02 | 37.04 |

(*1): Macromolecules, 13, 849–852 (1980)
(*2): A very small peak was observed.

TABLE 3

Peak shift values (ppm) measured by 13C-NMR using 1,1,2,2-tetrachloroethane-d2 as a solvent

| Attribution | | Example 1 | Example 2 | Example 3 | Example 6 | Example 7 | Example 8 | Example 9 | Example 10 | Example 11 |
|---|---|---|---|---|---|---|---|---|---|---|
| c | m | 25.12 | 25.12 | 25.18 | 25.12–25.17 | 25.17–25.22 | 25.12–25.21 | 25.11–25.16 | 25.12 | 25.12 |
|   | r | — | — | — | — | — | — | — | — | — |
| a | mm | 45.36 | 45.33 | 45.39 | 45.34 | 45.36 | 45.25 | 45.17 | 45.09 | 45.09 |
|   | mr | — | — | — | — | — | — | — | — | — |
|   | rr | — | — | — | — | — | — | — | — | — |
| b | m (m) | 36.46 | 36.46 | 36.48 | 36.46 | 36.48 | 36.46 | 36.43 | 36.41 | 36.41 |
|   | m (r) | — | — | Not analyzable as peaks overlapped with Et block peaks. | Not analyzable as peaks overlapped with Et block peaks. | Not analyzable as peaks overlapped with Et block peaks. | Not analyzable as peaks overlapped with Et block peaks. | Not analyzable as peaks overlapped with Et block peaks. | — | — |
|   | r (m) | — | — |  |  |  |  |  | — | — |
|   | r (r) | — | — |  |  |  |  |  | — | — |

Note: Using 1,1,2,2-tetrachloroethane-d2 as a solvent, the sample was heated and dissolved at 100° C. and then subjected to the measurement. The center peak of the triplet of tetrachloroethane by 13C-NMR had a shift value of 73.89 ppm relative to TMS. Each peak shift value of a copolymer was calculated relative to the center peak value of the triplet of tetrachloroethane being 73.89 ppm.

TABLE 4

Peak shift values (ppm) measured by 13C-NMR using 1,1,2,2-tetrachloroethane-d2 as a solvent

| Attribution | | Comparative Example 1 | Comparative Example 2 | Comparative Example 3 | Comparative Example 4 THF soluble fraction | Comparative Example 5 | Comparative Example 6 |
|---|---|---|---|---|---|---|---|
| c | m | 25.16 | 25.1–25.4 Broad or multiplet peaks | 25.1–25.4 Broad or multiplet peaks | 25.11 | 25.1–25.4 Broad or multiplet peaks | 25.1–25.4 Broad or multiplet peaks |
|   | r | 25.30 | | | 25.29 | | |
| a | mm | 45.25 | 45.2–45.9 Broad or multiplet peaks | 45.2–45.9 Broad or multiplet peaks | 45.15 | 45.2–45.9 Broad or multiplet peaks | 45.2–45.9 Broad or multiplet peaks |
|   | mr | 45.32 | | | 45.25 | | |
|   | rr | 45.41 | | | 45.37 | | |
| b | m (m) | 36.4–36.8 Broad or multiplet peaks | 36.4–36.8 Broad or multiplet peaks | 36.4–36.8 Broad or multiplet peaks | 36.44 | 36.5–36.9 Broad or multiplet peaks | 36.5–36.9 Broad or multiplet peaks |
|   | m (r) | | | | 36.54 | | |
|   | r (m) | | | | 36.70 | | |
|   | r (r) | | | | 36.83 | | |

Note: using 1,1,2,2-tetrachloroethane-d2 as a solvent, the sample was heated and dissolved at 100° C. and then subjected to the measurement. The center peak of the triplet of tetrachloroethane by 13C-NMR had a shift value of 73.89 ppm relative to TMS. Each peak shift value of a copolymer was calculated relative to the center peak value of the triplet of tetrachloroethane being 73.89 ppm.

The index $\lambda$ representing the proportion of the ethylene-styrene alternating structure contained in the copolymer obtained in each Example, was obtained by the following formula (i):

$$\lambda = A3/A2 \times 100 \tag{i}$$

Here, A3 is the sum of areas of three peaks a, b and c attributable to an ethylene-aromatic vinyl compound alternating structure represented by the following formula (1') obtained by 13C-NMR.

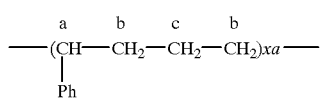

$$-(\underset{|}{\overset{a}{CH}}-\overset{b}{CH_2}-\overset{c}{CH_2}-\overset{b}{CH_2})xa- \tag{1'}$$
$$\phantom{-(}Ph$$

wherein Ph is an aromatic group such as a phenyl group, and xa is an integer of at least 2 representing the number of repeating units.

Further, A2 in the formula (i), is the sum of areas of peaks attributable to the main chain methylene and methine carbon, as observed within a range of from 0 to 50 ppm by 13C-NMR using TMS as standard.

It is also the sum of all peaks a to m in the formulas (10) to (14) and other peaks attributable to the main chain structure.

The copolymer of the present invention will have a value $\lambda$ of at most 60, since an ethylene chain structure, a styrene head to head or tail to tail bond and a limited styrene head to tail chain structure are contained in a substantial amount, even when the styrene content is substantially 50 mol %.

The value $\theta$ of the copolymer obtained in each Example was determined by the following formula (ii):

$$\theta = A1/A2 \times 100 \tag{ii}$$

Here, A1 is the sum of areas of peaks attributable to methine and methylene carbon $\alpha$ to $\epsilon$ in the following formula (2'), as observed within a range of from 0 to 50 ppm by 13C-NMR using TMS as standard. Further, A2 is the sum of areas of peaks attributable to the main chain methylene and methine carbon, as observed within a range of from 0 to 50 ppm by 13C-NMR using TMS as standard.

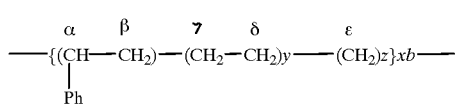

(2')

wherein Ph is an aromatic group such as a phenyl group, xb is an integer of at least 2 representing the number of repeating units, y is an integer of at least 1, which may be the same or different in the respective repeating units, and z is 0 or 1, which may be the same or different in the respective repeating units.

The carbon atoms α to ε in the structure of the above formula (2') corresponds to carbon atoms a to g in the structures of the above formula (10), (11) and (12).

Values λ and θ obtained in the respective Examples are shown in Table 5.

The isotactic diad index m of the copolymer obtained in each Example was determined by the above formula (iii). Values m obtained in the respective Examples and Comparative Examples are shown in Table 6.

TABLE 5

|  | St content (mol %) | Value λ | Value θ |
| --- | --- | --- | --- |
| Example 1 | 39.1 | 43 | 91 |
| Example 2 | 31.7 | 37 | 96 |
| Example 3 | 7.2 | 4.4 | 100 |
| Example 4 | 49.4 | 58 | 78 |
| Example 5 | 52.0 | 55 | 77 |
| Example 6 | 17.7 | 10 | 98 |
| Example 7 | 7.3 | 3.2 | 100 |
| Example 8 | 12.8 | 6.1 | 99 |
| Example 9 | 28.0 | 22 | 96 |
| Example 10 | 43.5 | 51 | 91 |
| Example 11 | 49.3 | 59 | 83 |
| Example 12 | 37.9 | 21 | 89 |

TABLE 6

|  | Mw (/10⁴) | Mn (/10⁴) | Mw/Mn | Isotactic diad fraction (m) | Melting point (° C.) |
| --- | --- | --- | --- | --- | --- |
| Example 1 | 14.0 | 6.3 | 2.2 | >0.95 | 82, 98 |
| Example 2 | 21.7 | 11.4 | 1.9 | >0.95 | 98 |
| Example 3 | 12.3 | 7.3 | 1.7 | >0.95 | 96 |
| Example 4 | 8.1 | 4.3 | 1.9 | >0.95 | 93 |
| Example 5 | 16.6 | 7.8 | 2.1 | >0.95 | 90 |
| Example 6 | 14.8 | 5.2 | 2.8 | >0.95 | 79 |
| Example 7 | — | — | — | >0.95 | 88 |
| Example 8 | 17.2 | 8.4 | 2.0 | >0.95 | 82 |
| Example 9 | 16.0 | 9.0 | 1.8 | >0.95 | 98 |
| Example 10 | 14.8 | 7.5 | 2.0 | >0.95 | 94, 107 |
| Example 11 | 15.5 | 8.8 | 1.8 | >0.95 | 91 |
| Example 12 | 1.1 | 0.5 | 2.2 | 0.85 | Not observed |
| Comparative Example 1 | 14.6 | 8.4 | 1.7 | 0.65 | Not observed |
| Comparative Example 2 | 50.2 | 18.6 | 2.7 | 0.7 | 25 |
| Comparative Example 3 | 26.0 | 16.0 | 1.6 | 0.5 | 41 |
| Comparative Example 4 THF insoluble fraction | — | — | — | — | 127, 274 Polyethylene and S-polystyrene |
| Comparative | 16.6 | 5.5 | 3.0 | 0.5 | (127) |

TABLE 6-continued

|  | Mw (/10⁴) | Mn (/10⁴) | Mw/Mn | Isotactic diad fraction (m) | Melting point (° C.) |
| --- | --- | --- | --- | --- | --- |
| Example 4 THF soluble fraction |  |  |  |  | Polyethylene |
| Comparative Example 5 | 5.9 | 1.9 | 3.1 | 0.5 | 86 |
| Comparative Example 6 | 19.0 | 12.0 | 1.6 | 0.5 | 63 |

Figure 44A:
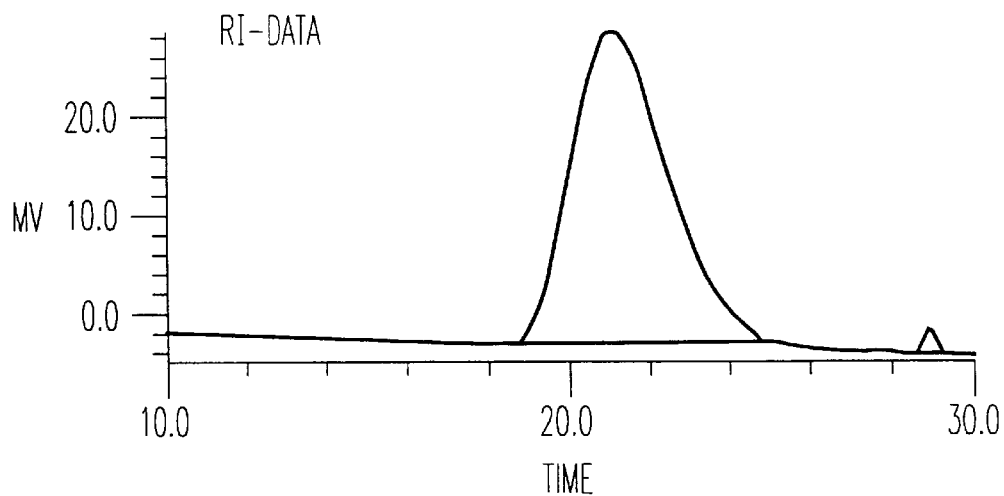
FIG. 44 is a GPC chart of the copolymer obtained in Example 11.
Figure 44B:
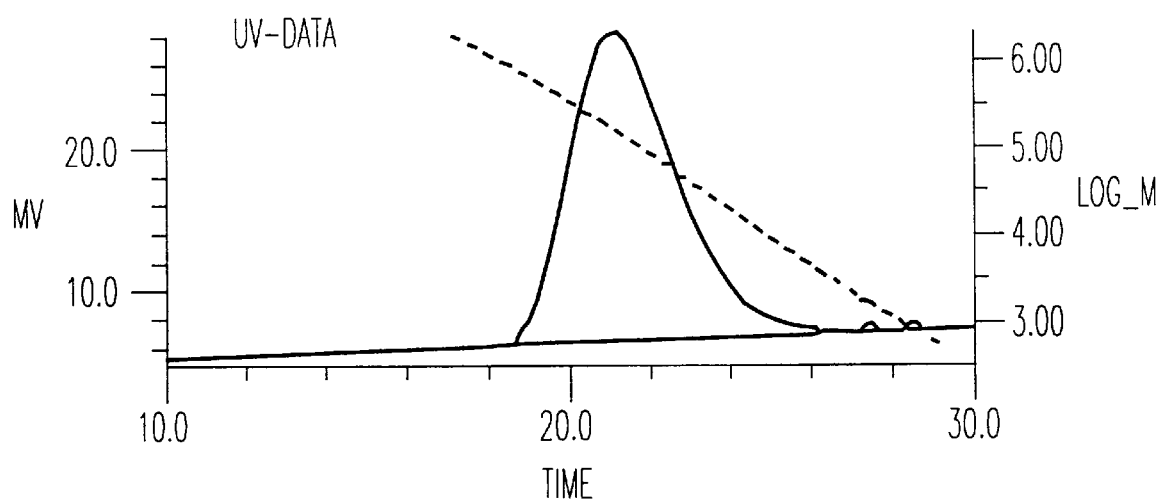

A GPC chart of the copolymer obtained in Example 11 is shown in FIG. 44. The copolymer completely dissolved in THF as a solvent.

Further, the obtained copolymer was dissolved in a small amount of toluene and then put into methylethylketone (MEK) in an amount of about 1,000 times by volume of the toluene and further cooled to −60° C. to fractionate into a cold MEK insoluble fraction (at least about 95 wt % of the entire polymer) and a cold MEK soluble fraction.

Figure 45A:
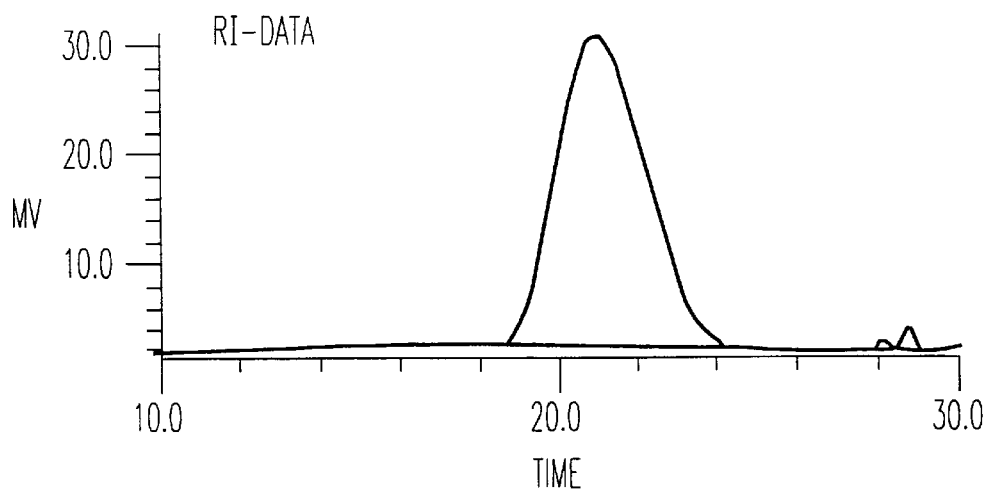
FIG. 45 is a GPC chart of a cold MEK insoluble fraction of the copolymer obtained in Example 11.
Figure 45B:
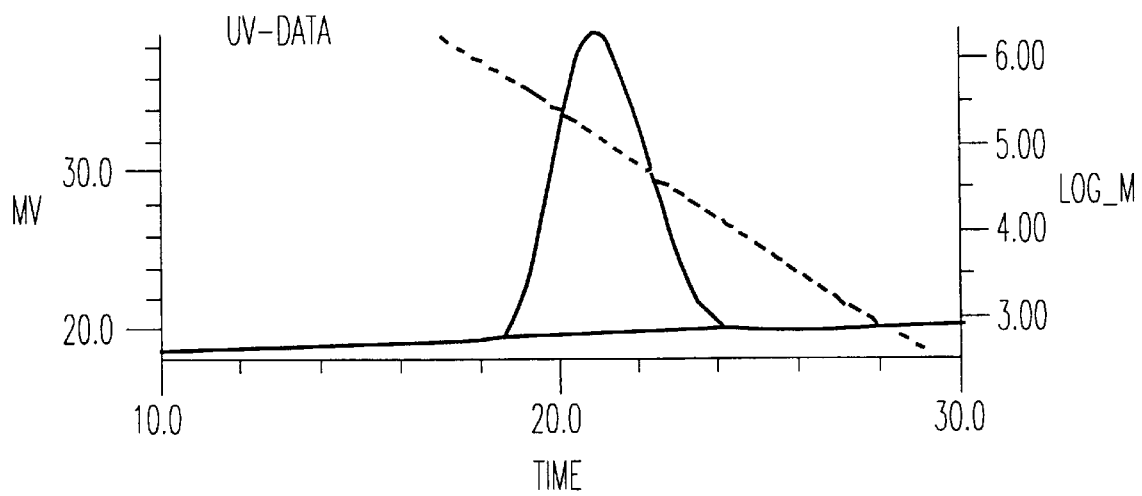

A GPC chart of the cold MEK insoluble fraction is shown in FIG. 45. Each of the GPC curves showed a monodispersed single peak. The weight average molecular weights Mw, the number average molecular weights Mn and the molecular weight distribution Mw/Mn, obtained from a IR detector and an UV detector are as shown in Tables 7 and 8.

TABLE 7

| Results of Example 11 (dissolved in THF) | | | |
| --- | --- | --- | --- |
| | Average molecular weight | | Molecular |
| GPC detector | Weight average | Number average | weight distribution |
| RI | 155000 | 88000 | 1.76 |
| UV | 139000 | 55000 | 2.52 |

TABLE 8

| Results of Example 11 (cold MEK insoluble fraction) | | | |
| --- | --- | --- | --- |
| | Average molecular weight | | Molecular |
| GPC detector | Weight average | Number average | weight distribution |
| RI | 139000 | 85000 | 1.63 |
| UV | 132000 | 78000 | 1.70 |

Although there may be measurement errors, the molecular weights and the molecular weight distributions obtained from the IR detector and the UV detector show good agreement especially with the cold MEK insoluble fraction (at least 95% of the entirety), because atactic polystyrene or the like derived from radical polymerization or cationic polymerization, which was contained in a small amount, was removed. Further, the molecular weight distribution is not higher than 1.7, thus indicating that the copolymer of the present invention is a polymer having a high level of uniformity in both the molecular weight and the composition.

A 13C-NMR chart of the cold MEK insoluble fraction is shown in FIG. 46. The peak attributable to the atactic polystyrene slightly observed in the vicinity of 41 ppm before the fractionation, has completely disappeared with the cold MEK insoluble fraction. However, the peak attributable to the chain of two styrene units observed in the vicinity of 43 ppm, is still present, and its intensity is not substantially changed from prior to the fractionation. Further, even with the MEK insoluble fractions obtained by changing the temperature of MEK at the time of the fractionation (about 30% and 50% of the entirety), the peak at 43 ppm is present with substantially the same intensity. That is, the limited head to tail styrene is uniformly present in the copolymer.

The DSC measurement of the polymer obtained in each example was carried out, whereby the melting point was observed. The measurement was conducted under such a condition that the temperature raising rate was 10° C. per minute from −100° C.

Figure 47:
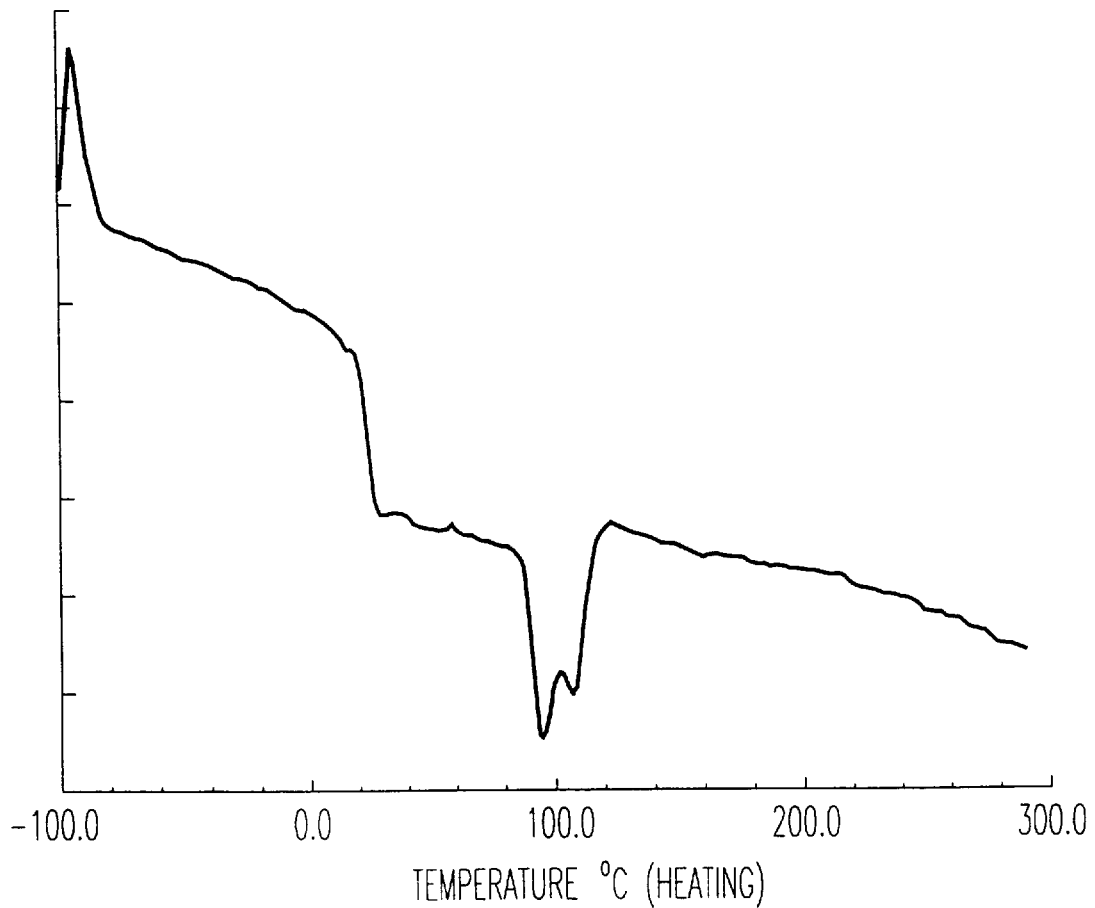
FIG. 47 is a DSC chart of the copolymer obtained in Example 10.

As an example of the results of the DSC measurement, a chart of Example 10 is shown in FIG. 47. The melting points of the respective Examples are shown in Table 6.

Figure 48:
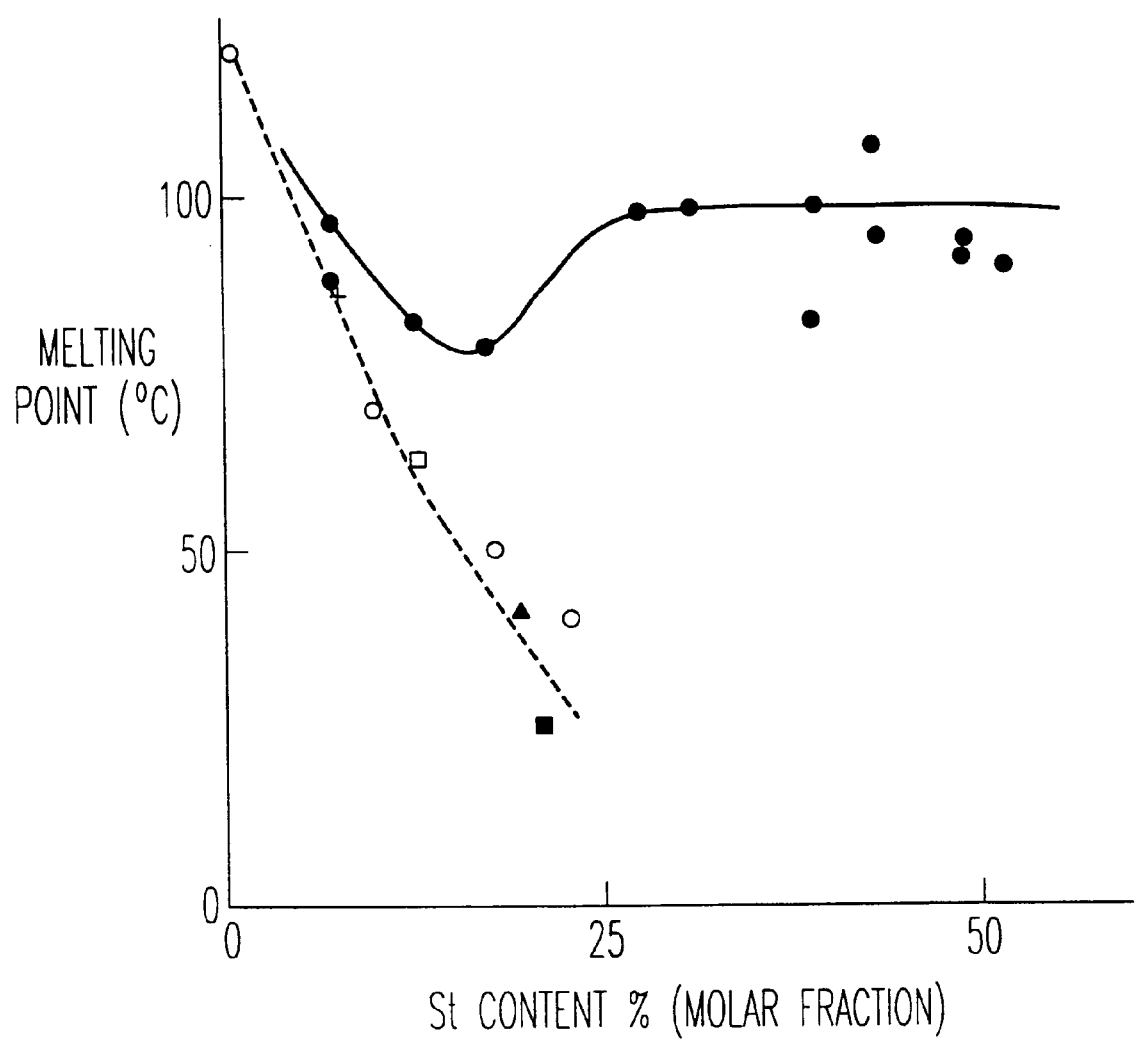
FIG. 48 is a graph showing the styrene contents and the melting points of the copolymers in Examples, Comparative Examples and in literatures.
Figure 49A:
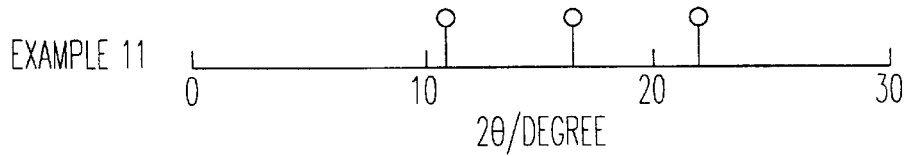
FIG. 49 is X-ray diffraction peaks of the copolymers obtained Examples and Comparative Examples.
Figure 49B:
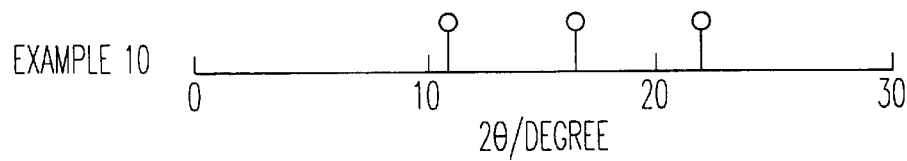
Figure 49C:
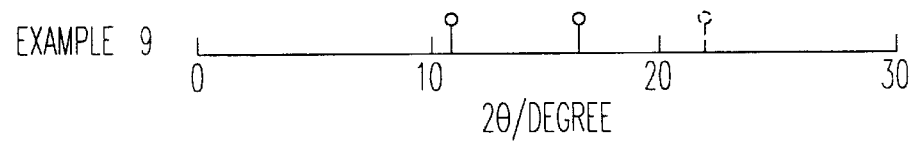
Figure 49D:
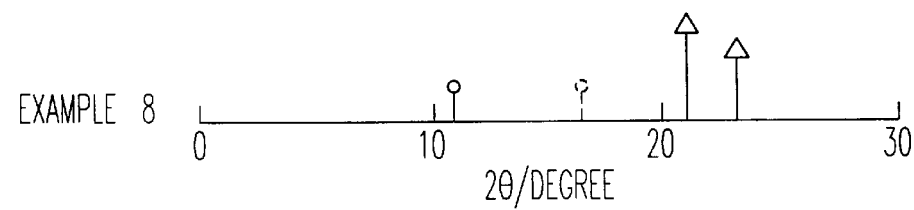
Figure 49E:
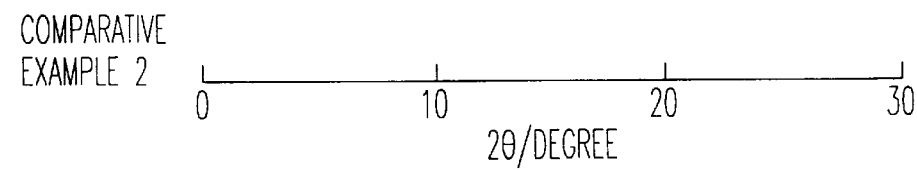
Figure 49F:
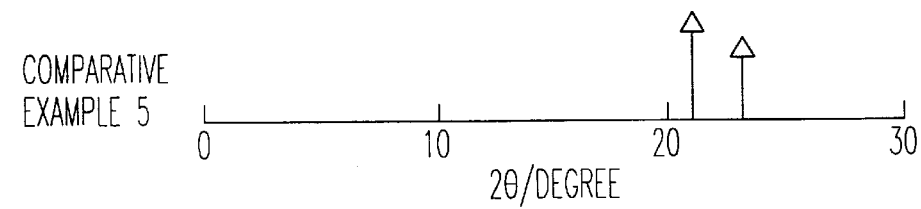
Figure 50:
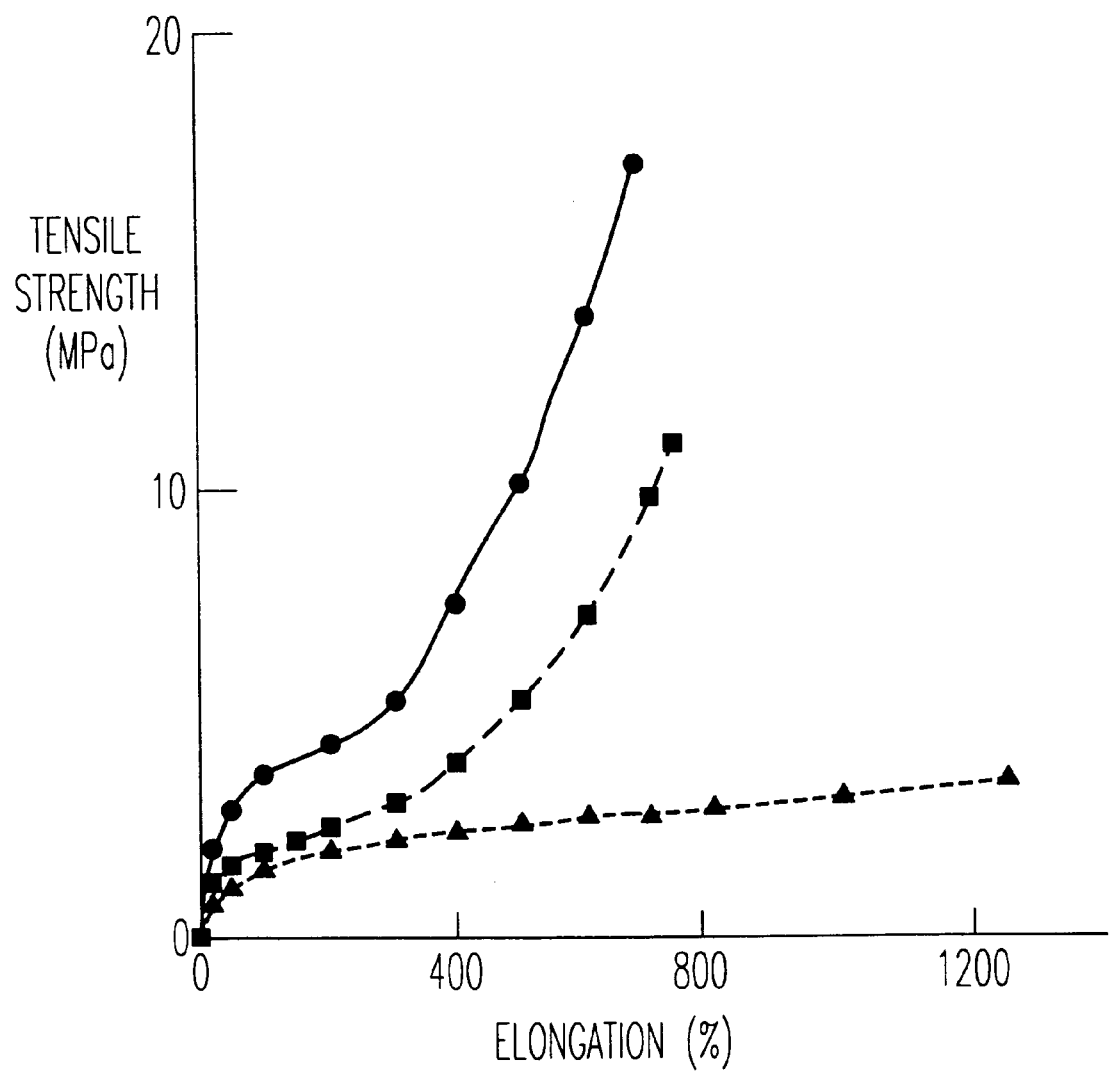
FIG. 50 is a S—S curve of the copolymer in the vicinity of a styrene content of 40 mol %.
Figure 51:
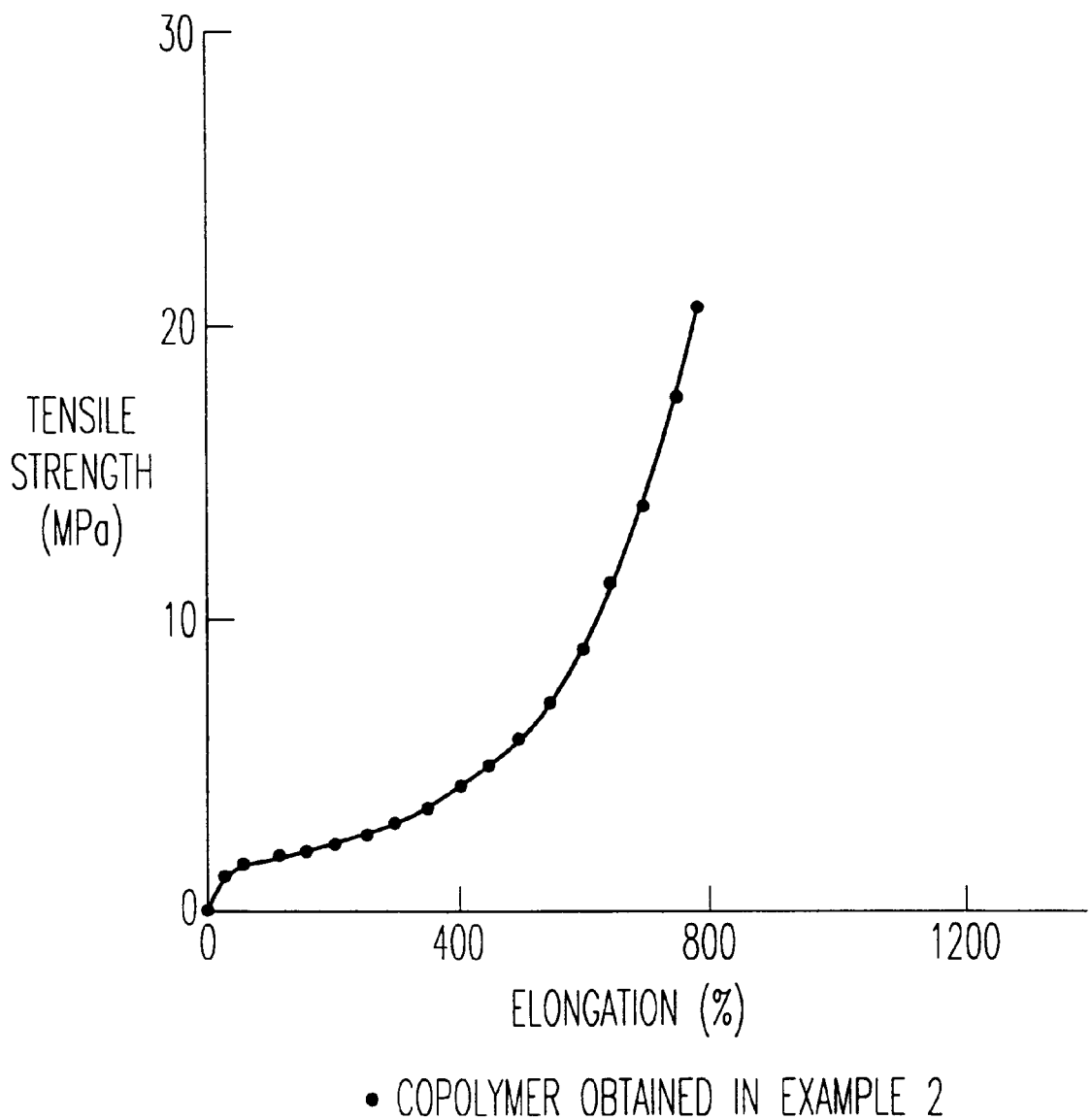
FIG. 51 is a S—S curve of the copolymer in the vicinity of a styrene content of 30 mol %.
Figure 52:
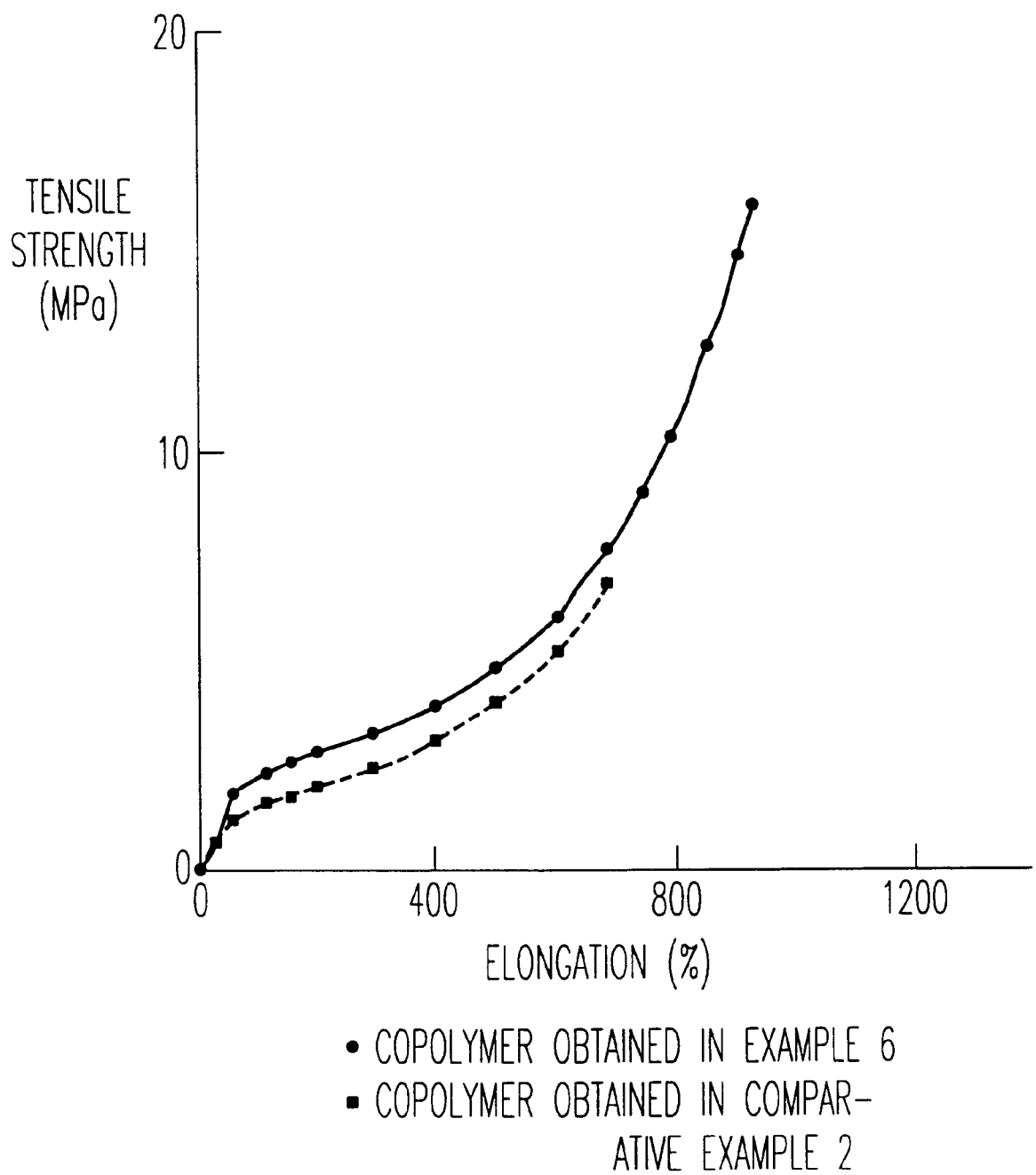
FIG. 52 is a S—S curve of the copolymer in the vicinity of a styrene content of 20 mol %.
Figure 53:
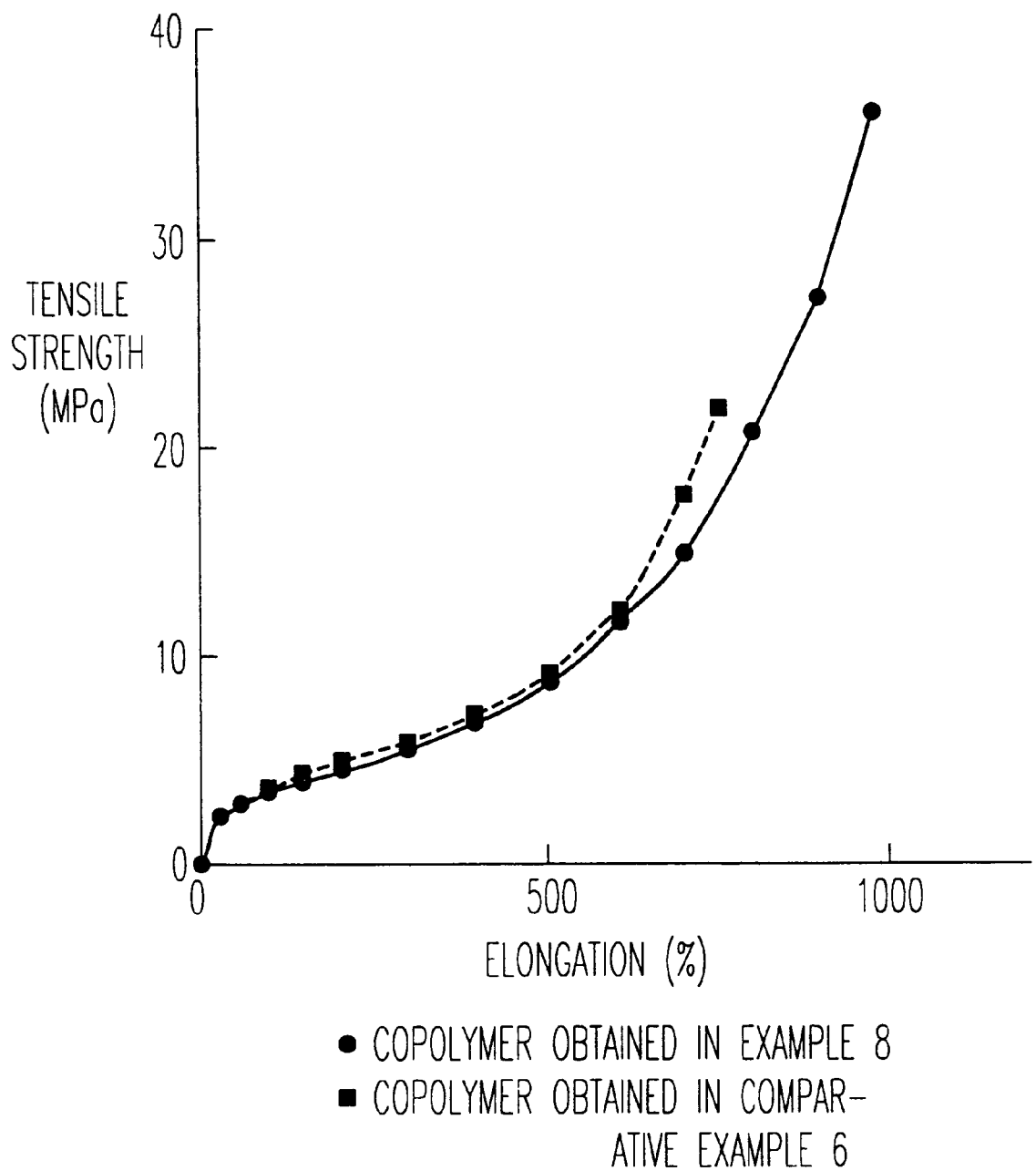
FIG. 53 is a S—S curve of the copolymer in the vicinity of a styrene content of 13 mol %.
Figure 54:
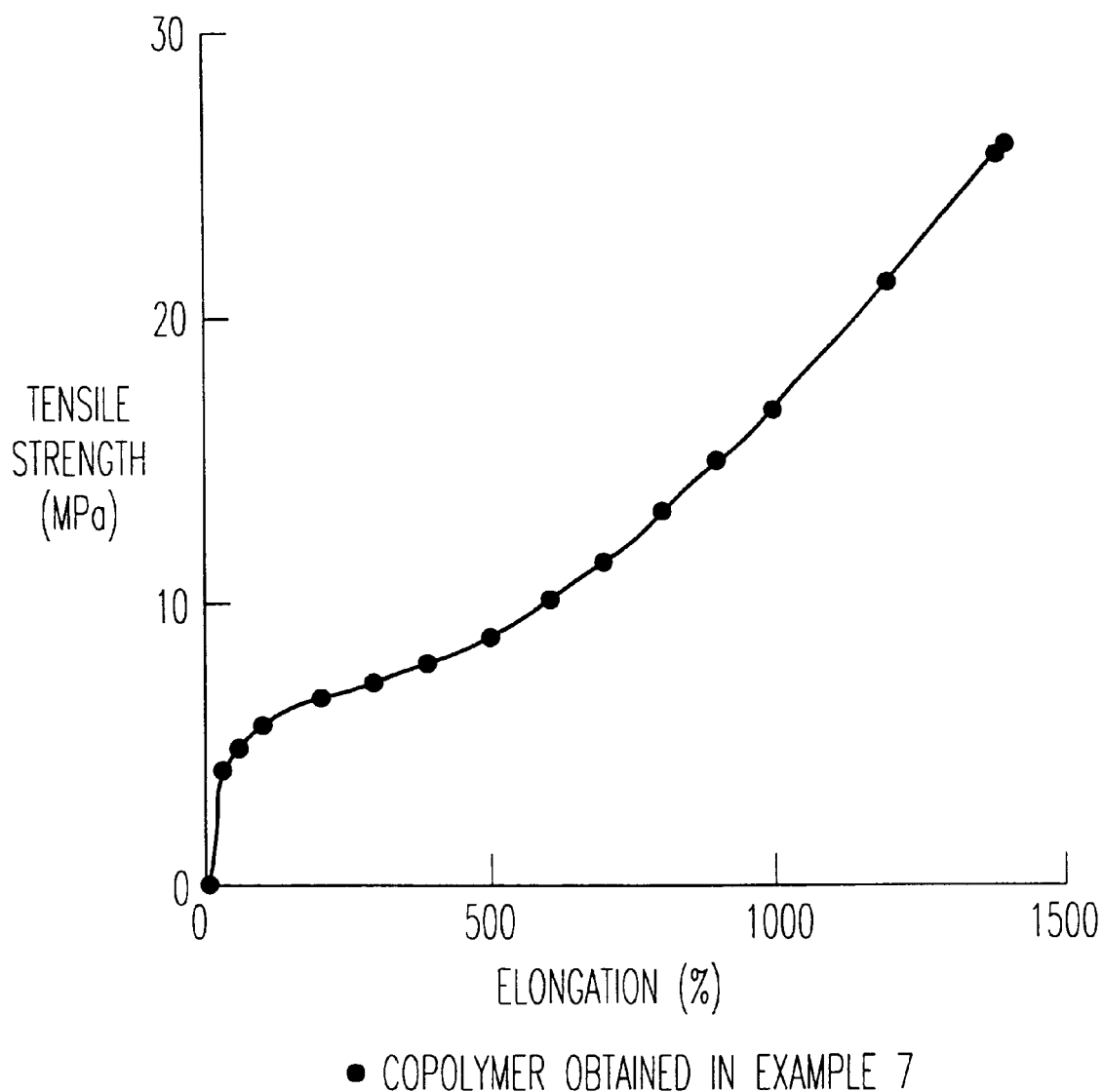
FIG. 54 is a S—S curve of the copolymer in the vicinity of a styrene content of 7 mol %.

Further, the relation between the styrene content and the melting point is shown in FIG. 48.

The styrene-ethylene copolymers obtained in Comparative Examples 1 and 4 (THF soluble) did not show a melting point.

The melting points of polymers obtained in Comparative Examples 2, 3 and 5 are shown in Table 6 and also in FIG. 48.

ANTEC, 1634 (1996), discloses a relation between the styrene content and the melting point of an ethylene-styrene copolymer obtained by using a so-called CGCT complex. This relation is shown in the same Figure for comparison with the copolymer of the present invention. The styrene content was indicated as calculated as a molar fraction.

The copolymer of the present invention has a characteristics such that it shows a melting point of from about 55 to 130° C. at a styrene content of from 1 to 55 mol %, particularly from 70° C. to 120° C. at a styrene content of from 10 to 55 mol %. This indicates that the copolymer of the present invention is a crystallizable polymer within the entire range of this styrene content.

Whereas, copolymers obtained by using a CGCT complex or an EWEN type complex, exhibit melting points only within a range where the styrene content is not higher than 20 mol %. Besides, such melting points rapidly decrease as the styrene content increases, and it will be 70° C. or lower at a styrene content of at least 10 mol % and will be a level of room temperature at a styrene content of 20 mol %. As disclosed in ANTEC, 1634 (1996), the melting point of the copolymer derives from the polyethylene crystalline structure, and it is a non-crystalline polymer at a styrene content of 20 mol % or higher.

To more clearly show that the copolymer of the present invention is a crystalline polymer, the results of the X-ray diffraction of the copolymer are shown. FIG. 49 shows the results of the X-ray diffraction of copolymers obtained in Examples. Hollow peaks are omitted. With each polymer, the diffraction peaks specific to the copolymer of the present invention were observed, and the diffraction peak intensity increases as the styrene content increases. The positions of diffraction peaks of the copolymer of the present invention are different from the positions of diffraction peaks of polyethylene, syndiotactic polystyrene and isotactic polystyrene. When the styrene content is lower than about 15 mol %, a diffraction peak of polyethylene is additionally observed.

The copolymer obtained in Comparative Example 2 was subjected to the X-ray diffraction measurement, whereby no diffraction peak was observed.

With the copolymer obtained in Comparative Example 5, only the diffraction peak attributable to polyethylene was observed.

The copolymer of the present invention has a crystalline structure derived from the stereoregularity of the styrene-ethylene alternating region, in a case where the styrene content is at least 10 mol %.

At a styrene content of from 10 to 55 mol %, the copolymer of the present invention exhibits excellent physical properties as a thermoplastic elastomer i.e. high strength, low permanent elongation, solvent resistance and transparency. At a styrene content of from 1 to less than 10 mol %, it shows excellent properties as a transparent soft resin.

The polymers obtained in Examples and Comparative Examples are subjected to heat pressing at 160° C. to obtain dumbbell specimens, whereby the stress-strain curves (hereinafter referred to as S—S curves) were measured. The S—S curve was measured by means of TMI, RTM-1T testing machine, manufactured by Toyo Baldwin Company, at 23° C. at a crosshead speed of 10 mm/min.

S—S curves at a styrene content of about 40 mol %, 30 mol %, 20 mol %, 13 mol % and 7 mol %, are shown in FIGS. 50 to 54, respectively. Each Figure shows that the copolymer of the present invention has excellent physical properties as compared with copolymers of Comparative Examples.

The permanent elongation ratio π was obtained by the following formula from the ratio of the permanent elongation which is the elongation remaining after a broken dumbbell specimen is left to stand sufficiently at room temperature, to the maximum elongation at breakage, and the results are shown in Table 9.

$$\pi = L1/L2 \times 100$$

where L1 is the permanent elongation, and L2 is the maximum elongation at breakage.

The copolymer of the present invention shows a value π of not higher than about 10% at a styrene content of from 20 to 55 mol % and a value π of from about 10 to 30% at a styrene content of from 10 to 20 mol %, thus indicating a high elastomer property. At a styrene content of not higher than 10%, it shows a value π of at least 30%, thus indicating a physical property similar to LLDPE.

Figure 55:
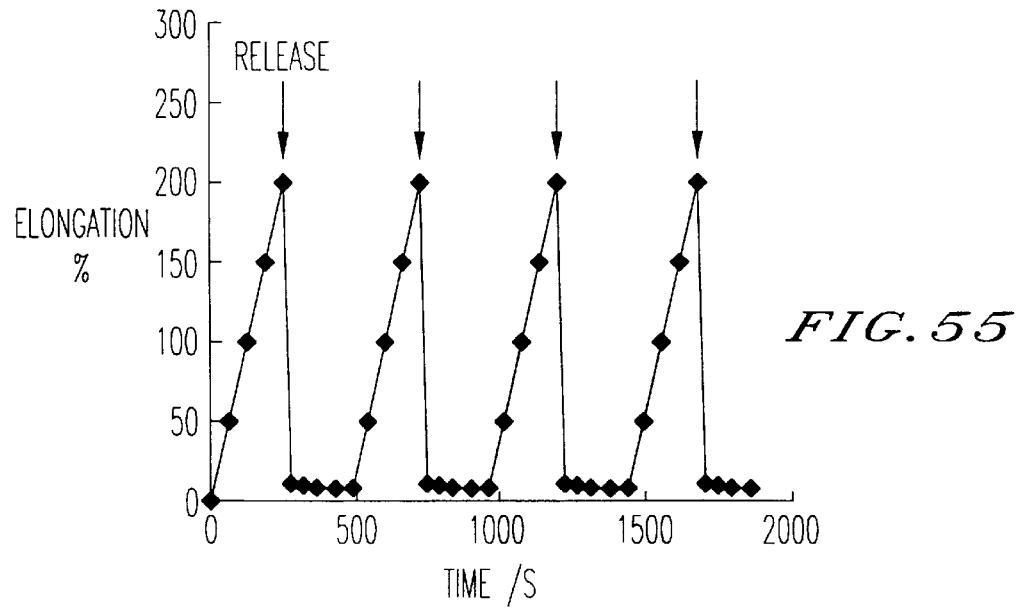
FIG. 55 is a Time Course of the Relaxation of a sample of the copolymer obtained in Example 6.

FIG. 55 shows the change with time, when the operation of stretching a dumbbell specimen to 200%, followed by releasing, was repeated. This indicates a high level of elastic recovery of the copolymer of the present invention.

Figure 56:
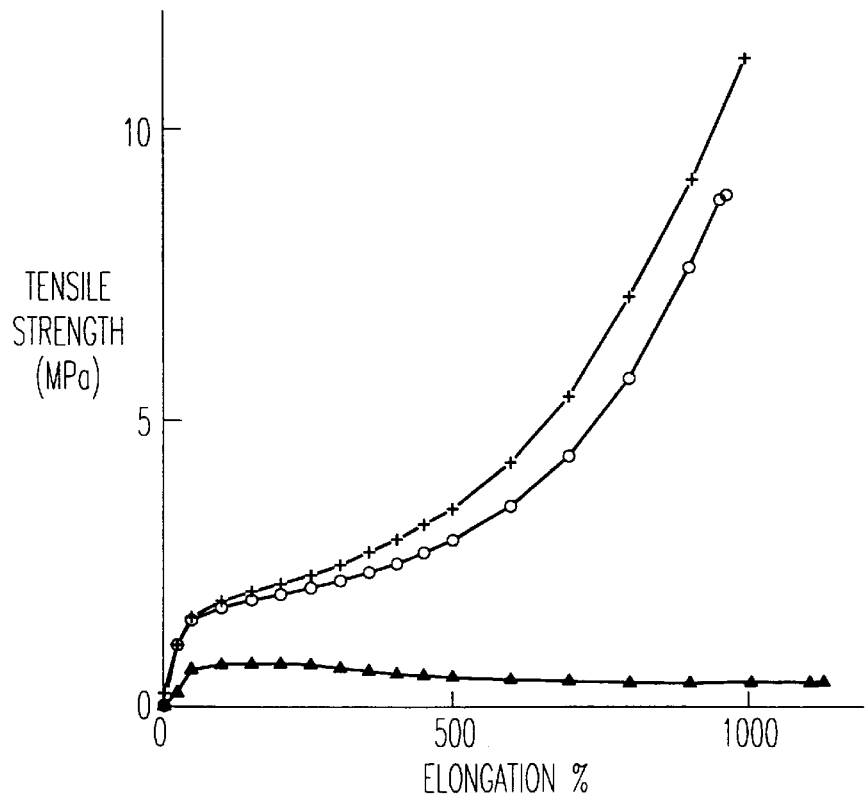
FIG. 56 is a S—S curve of a sample of the copolymer obtained in Example 9 having its crystallinity changed.

To show the effects of the crystallinity of the copolymer of the present invention on the physical properties, evaluation was carried out by changing the crystallinity of the copolymer. S—S curves of the copolymer of the present invention obtained by changing the crystallinity, are shown in FIGS. 55 and 56.

Improvement of the crystallinity may be made by an addition of a filler or the like. However, in order to eliminate the effects of the filler itself on the physical properties, a simple method of dipping in a solvent was carried out. The copolymer obtained in Example 9 was subjected to heat pressing to form dumbbell specimens, which were immersed in hexane and acetone, respectively, for one week, and then the solvents were removed at room temperature for one day and further at 40° C. for one day under vacuum, to improve the crystallinity.

The heat of crystal fusion calculated from the area of the melting point peak by DSC, was about 30 J/g.

On the other, the same copolymer obtained in Example 9 was subjected to heat pressing, and then put into liquid nitrogen for quenching to obtain an amorphous copolymer. No melting point was observed by DSC.

It is evident that the breaking strength remarkably increases by introducing the crystal structure (FIG. 56).

Figure 57:
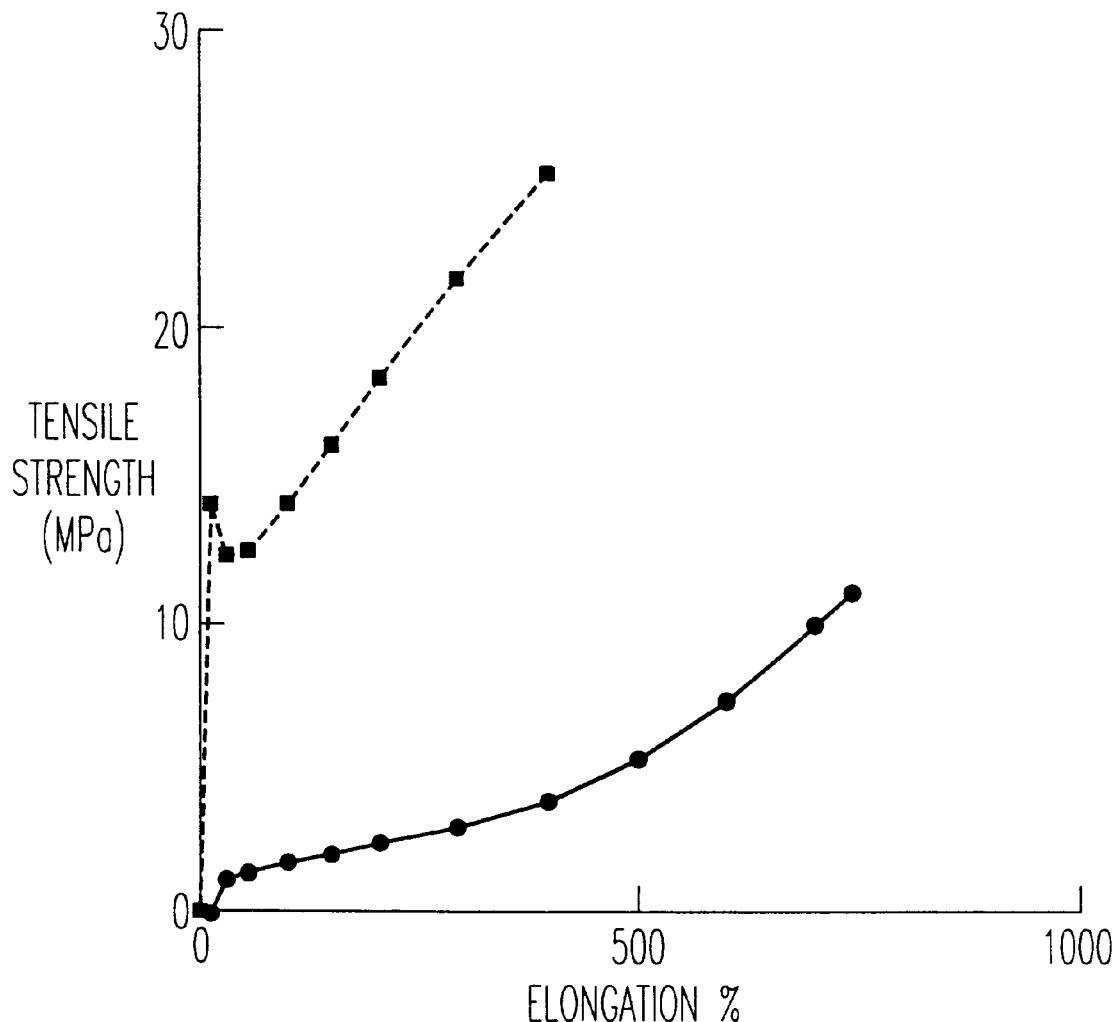
FIG. 57 is a S—S curve of a sample of the copolymer obtained in Example 10 having its crystallinity changed.

The copolymer obtained in Example 10 was subjected to heat pressing to form dumbbell specimens, which were subjected to annealing at 78° C. for 5 days. The heat of crystal fusion calculated from the area of the melting point peak by DSC, was about 20 J/g. When no annealing was carried out, the heat of crystal fusion was not higher than about 10 J/g. It is evident that the breaking strength and the initial tensile modulus can be remarkably increased by increasing the crystallinity (FIG. 57).

Further, the copolymer obtained in Example 11 (styrene content: about 50 mol %) was also subjected to a method of dipping in a solvent to increase the crystallinity. The initial tensile modulus was about 800 MPa and shows physical properties similar to plastics. The heat of crystal fusion calculated from the area of the melting point peak by DSC was about 20 J/g. On the other hand, without such treatment for crystallization, the same copolymer was subjected to heat pressing to form dumbbell specimens, whereupon the S—S curve was measured, whereby the initial tensile modulus was about 500 MPa, and the heat of crystal fusion was not higher than 10 J/g.

As described in the foregoing, the copolymer with a styrene content of about 50 mol % shows physical properties similar to plastics, and becomes closer to plastics as the crystallinity increases.

The copolymer of the present invention also shows excellent solvent resistance. In Table 10, the results of dipping the copolymers of Examples and other resins in hexane and acetone, are shown. The dipping tests were carried out by dipping dumbbell specimens in the respective solvents for one week, and the degree of swelling was obtained from the weight change between before and after the dipping. The copolymer of the present invention shows excellent solvent resistance at various styrene contents.

The transparency (Haze, total light transmittance) of the copolymer obtained in each Example was measured. The copolymer of the present invention has transparency equivalent to usual transparent elastomers. The results are shown in Table 11.

TABLE 9

|  | Styrene content (mol %) | Permanent elongation ratio π (%) |
|---|---|---|
| Example 1 | 39.1 | 10 |
| Example 2 | 31.7 | 5 |
| Example 6 | 17.7 | 27 |
| Example 7 | 7.3 | 63 |
| Example 8 | 12.8 | 30 |
| Example 10 | 43.5 | 5 |
| Example 11 | 49.3 | 10 |
| Comparative Example 1 | 43.0 | 10 |
| Comparative Example 2 | 21.1 | 10 |
| Comparative Example 6 | 13.0 | 30 |

TABLE 10

|  | Dipping in hexane | Dipping in acetone |
|---|---|---|
| Example 1 | ⊚ | ⊚ |
| Example 2 | ○ | ⊚ |
| Example 6 | ○ | ⊚ |
| Example 7 | — | — |
| Example 8 | ○ | ⊚ |
| Example 9 | ○ | ⊚ |
| Example 10 | ⊚ | ○ |
| Example 11 | ⊚ | ○ |
| SEBS (H1041) | X | ○ |
| PVC (SK-05253) | Δ*1 | X |
| ENGAGE (Ethylene-octene copolymer) (EG-8150) | X | ⊚ |
| SBS (STR1602) | X | X |
| Hydrogenated SBR (DR1910P) | X | X |

⊚: No change, Degree of swelling: Less than 25%
○: Swelled, Degree of swelling: 25 to 50%
Δ: Solidified
X: Gelled or dissolved
Degree of swelling = Weight increase/Original weight before dipping × 100
*1: Plasticizer eluted and the sample became brittle.

TABLE 11

|  | Thickness of specimen | Haze | Total light transmittance |
|---|---|---|---|
| Example 6 | 0.76 mm | 24.3 | 77.2 |
| Example 7 | 0.60 mm | 15.5 | 87.3 |
| Example 8 | 0.83 mm | 22.6 | 83.5 |
| Example 9 | 0.63 mm | 20.8 | 82.7 |
| Example 10 | 0.80 mm | 41.5 | 87.5 |
| Example 11 | 0.62 mm | 24.3 | 87.9 |
| SEBS (H1041) | 0.91 mm | 11.1 | 84.1 |
| SBS (STR1602) | 0.87 mm | 26.0 | 89.0 |
| PVC (SK-05253) | 0.70 mm | 8.9 | 88.4 |

As described in the foregoing, according to the present invention, it is possible to provide an ethylene-aromatic vinyl compound copolymer which has not been available heretofore, wherein the alternating structure of ethylene and an aromatic vinyl compound contained in the ethylene-aromatic vinyl compound copolymer is lower than a certain proportion, and the aromatic groups in the alternating structure have stereoregularity and thus present an isotactic structure, and a method for its production.

What is claimed is:

1. An ethylene-aromatic vinyl compound copolymer having an aromatic vinyl compound content of from 1 to less than 55% by molar fraction which comprises an isotactic structure and a head-to-tail bond structure comprising two aromatic vinyl compound units represented by the following formula (1)

(1)

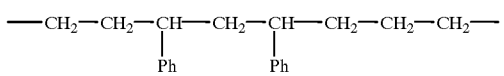

wherein Ph is an aromatic group.

2. An ethylene-aromatic vinyl compound copolymer according to claim 1, wherein the stereoregularity of the aromatic groups in the alternating structure of ethylene and an aromatic vinyl compound represented by the formula (1)

contained in its structure, is represented by an isotactic diad index m of more than 0.75, and the alternating structure index λ represented by the formula (i) is smaller than 70 and larger than 1:

$$\lambda = A3/A2 \times 100 \tag{i}$$

where A3 is the sum of areas of three peaks a, b and c attributable to an ethylene-aromatic vinyl compound alternating structure obtained by 13C-NMR, and A2 is the sum of areas of peaks attributable to the main chain methylene and methine carbon, as observed within a range of from 0 to 50 ppm by 13C-NMR using TMS as standard.

3. The ethylene-aromatic vinyl compound copolymer according to claim 1, wherein the index θ represented by the following formula (ii), is larger than 70 when the aromatic vinyl compound content is smaller than 45% by molar fraction, or larger than 50 when the aromatic vinyl compound content is at least 45% by molar fraction:

$$\theta = A1/A2 \times 100 \tag{ii}$$

where A1 is the sum of areas of peaks attributable to methine and methylene carbon α to ε in the following formula (2') as observed within the range of from 0 to 50 ppm by 13C-NMR using TMS as standard, and A2 is the sum of areas of peaks attributable to the main chain methylene and methine carbon, as observed within a range of from 0 to 50 ppm by 13C-NMR using TMS as standard:

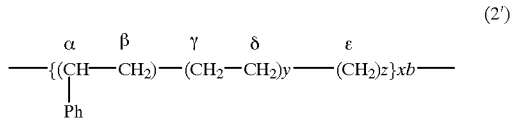

(2')

wherein Ph is an aromatic group, xb is an integer of at least 2 representing the number of repeating units, y is an integer of at least 1, which may be the same or different in the respective repeating units, and z is 0 or 1, which may be the same or different in the respective repeating units.

4. The ethylene-aromatic vinyl compound copolymer according to claim 2, which shows no peak from 40 to 41 ppm by 13C-NMR using TMS as standard.

5. The ethylene-aromatic vinyl compound copolymer according to claim 2, wherein the aromatic vinyl compound content in the copolymer is from 10 to less than 55% by molar fraction.

6. The ethylene-aromatic vinyl compound copolymer according to claim 2, wherein the alternating structure index λ is smaller than 70 and larger than 5.

7. The ethylene-aromatic vinyl compound copolymer according to claim 2, which has a melting point within a range of from 55° C. to 130° C.

8. The ethylene-aromatic vinyl compound copolymer according to claim 2, wherein the stereoregularity of phenyl groups in the alternating structure of ethylene and an aromatic vinyl compound, is represented by an isotactic diad index m of more than 0.85.

9. The ethylene-aromatic vinyl compound copolymer according to claim 2, wherein the stereoregularity of phenyl groups in the alternating structure of ethylene and an aromatic vinyl group, is represented by an isotactic diad index m is at least 0.95.

10. The ethylene-aromatic vinyl compound copolymer according to claim 1, which has a weight average molecular weight of at least 30,000.

11. The ethylene-aromatic vinyl compound copolymer according to claim 1 which has a structure represented by the following formula (2) and a head-to-tail bond structure comprising two aromatic vinyl compound units represented by the formula (1):

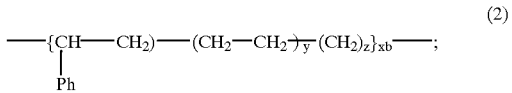

(2)

wherein Ph is an aromatic group, xb is an integer of at least 2 representing the number of repeating units, y is an integer of at least 1, which may be the same or different among the respective repeating units, and z is 0 or 1, which may be the same or different in the respective repeating units.

12. The ethylene-aromatic vinyl compound copolymer according to claim 1, having no head-to-tail bond structure of at least three aromatic vinyl compound units.

13. The ethylene-aromatic vinyl compound copolymer according to claim 11, having no head-to-tail bond structure of at least three aromatic vinyl compound units.

14. The ethylene-aromatic vinyl compound copolymer according to claim 1, wherein the aromatic vinyl compound is styrene.

15. The ethylene-aromatic vinyl compound copolymer according to claim 11, wherein the aromatic vinyl compound is styrene.

16. A method for producing an ethylene-aromatic vinyl compound copolymer having an aromatic vinyl compound content of from 1 to less than 50% by molar fraction comprising polymerizing ethylene with from 1 to less than 55% by molar fraction of an aromatic vinyl compound in the presence of a catalyst of a transition metal compound of the following formula (3) or (4) and a cocatalyst:

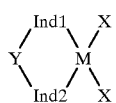

(3)

wherein each of Ind1 and Ind2 is an unsubstituted or substituted indenyl group, and Ind1 and Ind2 may be the same or different from each other, Y is a carbon, a silicon, a germanium or a boron atom, which has bonds to Ind1 and Ind2 and which also has substituents, wherein the substituents may be the same or different, or may have a cyclic structure, X is hydrogen, a halogen, an alkyl group, an aryl group, a silyl group or an alkoxy group, and M is Zr, Hf or Ti,

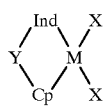

(4)

wherein Ind is an unsubstituted or substituted indenyl group, Cp is an unsubstituted or substituted cyclopentadienyl group, Y is carbon, a silicon, a germanium or a boron atom, which has bonds to Ind and Cp and which also has substituents, wherein the substituents may be the same or different, or may have a cyclic structure, X is hydrogen, a halogen, an alkyl group, an aryl group, a silyl group, or an alkoxy group, and M is Zr, Hf or Ti.

17. The method for producing the ethylene-aromatic vinyl compound copolymer according to claim 16, wherein the cocatalyst is an aluminoxane (alumoxane) of the following formula (5) or (6):

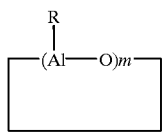
(5)

wherein R is a $C_{1-5}$ alkyl group, a $C_{6-10}$ aryl group or a hydrogen, m is an integer of from 2 to 100, wherein each R may be the same or different from one another

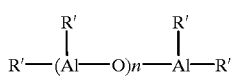
(6)

wherein each R' is a $C_{1-5}$ alkyl group, a $C_{6-10}$ aryl group or hydrogen, and n is an integer of from 2 to 100, wherein each R' may the same or different from one another.

18. The process according to claim 16, wherein the catalyst is of formula (3).

19. The process according to claim 16, wherein the catalyst is of formula (4).

20. The process according to claim 16, wherein the aromatic vinyl compound is styrene.

21. The process according to claim 17, wherein polymerization is carried out at from 0 to 160° C.

22. An ethylene-aromatic vinyl compound copolymer produced by the method of claim 16.

23. An ethylene-aromatic vinyl compound copolymer produced by the method of claim 16, wherein the aromatic compound is styrene.

24. A transparent ethylene-aromatic vinyl compound copolymer produced by the method of claim 16, which has a haze of at most 41.5%.

25. A transparent ethylene-aromatic vinyl compound copolymer produced by the method of claim 16, which has an aromatic vinyl compound content of at least 1% and less than 10% and a haze of at most 15.5%.

26. The transparent ethylene-aromatic vinyl compound copolymer according to claim 24, wherein the aromatic vinyl compound is styrene.

27. The transparent ethylene-aromatic vinyl compound copolymer according to claim 25, wherein the aromatic vinyl compound is styrene.

28. A molded product produced by molding the transparent ethylene-aromatic vinyl compound copolymer of claim 24.

29. A molded product produced by molding the transparent ethylene-aromatic vinyl compound copolymer of claim 25.

* * * * *